United States Patent
Yu et al.

(10) Patent No.: US 12,236,609 B2
(45) Date of Patent: *Feb. 25, 2025

(54) METHOD AND COMPUTING SYSTEM FOR PROCESSING CANDIDATE EDGES

(71) Applicant: MUJIN, INC., Tokyo (JP)

(72) Inventors: Jinze Yu, Tokyo (JP); Jose Jeronimo Moreira Rodrigues, Tokyo (JP)

(73) Assignee: MUJIN, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/863,013

(22) Filed: Jul. 12, 2022

(65) Prior Publication Data

US 2022/0351389 A1    Nov. 3, 2022

Related U.S. Application Data

(63) Continuation of application No. 16/791,024, filed on Feb. 14, 2020, now Pat. No. 11,403,764.

(51) Int. Cl.
*G06K 9/00* (2022.01)
*G06F 17/16* (2006.01)
(Continued)

(52) U.S. Cl.
CPC ............... *G06T 7/13* (2017.01); *G06F 17/16* (2013.01); *G06T 7/12* (2017.01); *G06V 10/44* (2022.01)

(58) Field of Classification Search
CPC .. G06T 7/13; G06T 7/12; G06T 7/593; G06T 7/40; G06T 2207/30204; G06F 17/16;
(Continued)

(56) References Cited

U.S. PATENT DOCUMENTS 9,102,055 B1 *   8/2015   Konolige ............... B25J 9/1612
9,333,649 B1 *   5/2016   Bradski .................... B25J 19/00
(Continued)

FOREIGN PATENT DOCUMENTS

CN    104504684 A  *  4/2015  ............... G06T 7/13
CN    109214256 A      1/2019
(Continued)

OTHER PUBLICATIONS

RGB-D Edge Detection and Edge-based Registration, Changyun Choi et al., IEEE, Nov. 3-7, 2013, pp. 1568-1575 (Year: 2013).*
(Continued)

*Primary Examiner* — Jayesh A Patel
(74) *Attorney, Agent, or Firm* — MEDLER FERRO WOODHOUSE & MILLS PLLC

(57) ABSTRACT

A system and method for processing candidate edges are presented. The method may be performed when spatial structure information and 2D image information are stored. The method may include identifying, based on the spatial structure information, a 3D location that represents a corner of an object structure; identifying, based on the spatial structure information, a 3D vector that extends from the 3D location and is parallel with an edge; determining a 2D location within the 2D image information that corresponds to the 3D location; determining a 2D vector within the 2D image information that corresponds to the 3D vector; determining an edge detection region; identifying a cluster of candidate edges within the edge detection region that does not represent any object edge; identifying, as a 2D object edge, a candidate edge that is not part of the identified cluster; and performing segmentation based on the 2D object edge.

15 Claims, 37 Drawing Sheets

(51) Int. Cl.
*G06T 7/12* (2017.01)
*G06T 7/13* (2017.01)
*G06V 10/44* (2022.01)

(58) Field of Classification Search
CPC ........ G06K 9/6218; G06K 9/00; G06V 10/44; G06V 30/1823; G06V 30/1826; G06V 30/1829; G06V 30/1831; G06V 30/1834; G06V 30/1837
See application file for complete search history.

(56) References Cited

U.S. PATENT DOCUMENTS

| | | | | |
|---|---|---|---|---|
| 10,089,750 | B2 * | 10/2018 | Ho | G06T 7/593 |
| 10,176,403 | B2 * | 1/2019 | Martin | G06V 30/414 |
| 10,614,340 | B1 * | 4/2020 | Yu | G06T 7/64 |
| 11,062,457 | B2 * | 7/2021 | Yu | B65G 61/00 |
| 11,403,764 | B2 * | 8/2022 | Yu | G06T 7/593 |
| 2002/0024598 | A1 * | 2/2002 | Kunimitsu | H04N 7/181 348/E7.086 |
| 2008/0089577 | A1 * | 4/2008 | Wang | G06V 10/10 382/154 |
| 2009/0290758 | A1 | 11/2009 | Ng-Thow-Hing et al. | |
| 2012/0011119 | A1 * | 1/2012 | Baheti | G06F 16/583 707/E17.014 |
| 2013/0230235 | A1 * | 9/2013 | Tateno | G06T 19/003 382/154 |
| 2016/0259993 | A1 * | 9/2016 | Ulbricht | G06T 7/33 |
| 2016/0364853 | A1 * | 12/2016 | Yamaguchi | G06V 20/20 |
| 2018/0218513 | A1 * | 8/2018 | Ho | G06T 7/579 |
| 2019/0188856 | A1 * | 6/2019 | Qiu | G06V 20/64 |
| 2021/0089808 | A1 * | 3/2021 | Yu | G06T 7/64 |

FOREIGN PATENT DOCUMENTS

| | | | | |
|---|---|---|---|---|
| CN | 110176075 | A | 8/2019 | |
| CN | 110322457 | A * | 10/2019 | ............ G06T 5/002 |
| CN | 110580725 | A * | 12/2019 | |
| CN | 112734783 | A | 4/2021 | |
| CN | 113269801 | A | 8/2021 | |
| JP | H05-052729 | A | 3/1993 | |
| JP | 2011161622 | A | 8/2011 | |
| JP | 2012021958 | A | 2/2012 | |
| JP | 2014179016 | A1 | 9/2014 | |
| JP | 20140195148 | A | 10/2014 | |
| JP | 2015043175 | A * | 3/2015 | |
| JP | 2018051728 | A * | 4/2018 | ........... G01B 11/005 |
| JP | 2019517079 | A1 | 6/2019 | |
| JP | 20190211981 | A | 12/2019 | |
| JP | 2020113526 | A | 7/2020 | |
| WO | WO-2009018538 | A2 * | 2/2009 | ............ B25J 9/1697 |
| WO | WO-2009068641 | A1 * | 6/2009 | ............ G06T 7/0075 |
| WO | WO-2014053703 | A1 * | 4/2014 | ............ B66C 13/00 |
| WO | WO-2016053067 | A1 * | 4/2016 | ............ G06T 15/10 |

OTHER PUBLICATIONS

DoraPicker: An Autonomous Picking System for General Objects, Hao Zhang et al., IEEE, Aug. 2016, pp. 721-726 (Year: 2016).*
Decision to Grant mailed Jun. 9, 2020 in corresponding Japanese Patent Application No. 2020- 084861.
Chinese Office Action dated Aug. 20, 2021 issued in corresponding Chinese Patent Application No. 202110114859.5.
German Office Action dated Mar. 11, 2021 issued in corresponding German Patent Application No. 10 2020 206 387.7.
Wei et al.; "Classification and Positioning Algorithm for Parts Based on Edge Extraction," Measurement and Testing Technology; vol. 45, Issue 9; pp. 52-55 (2018).
Office Action issued Oct. 8, 2024 issued in Japanese Appl. No. 2023-195182.

* cited by examiner

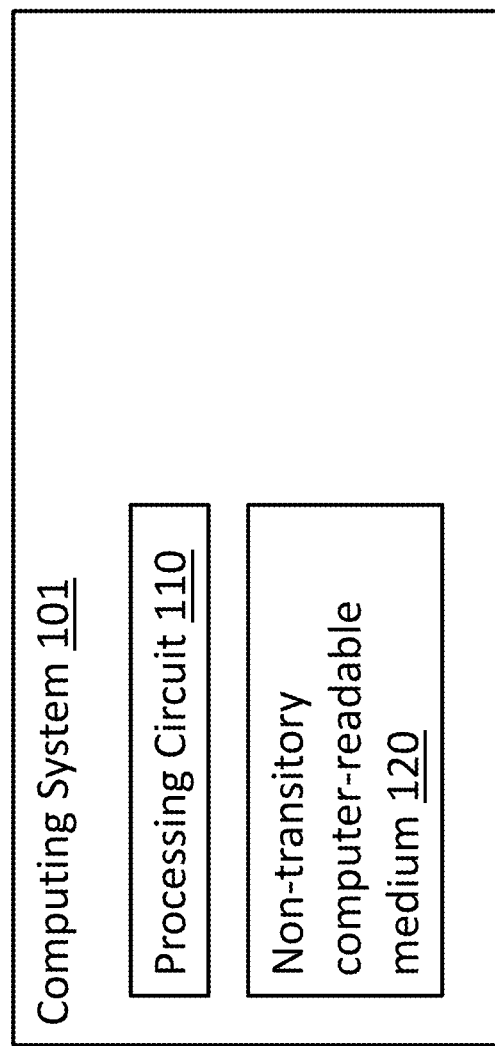

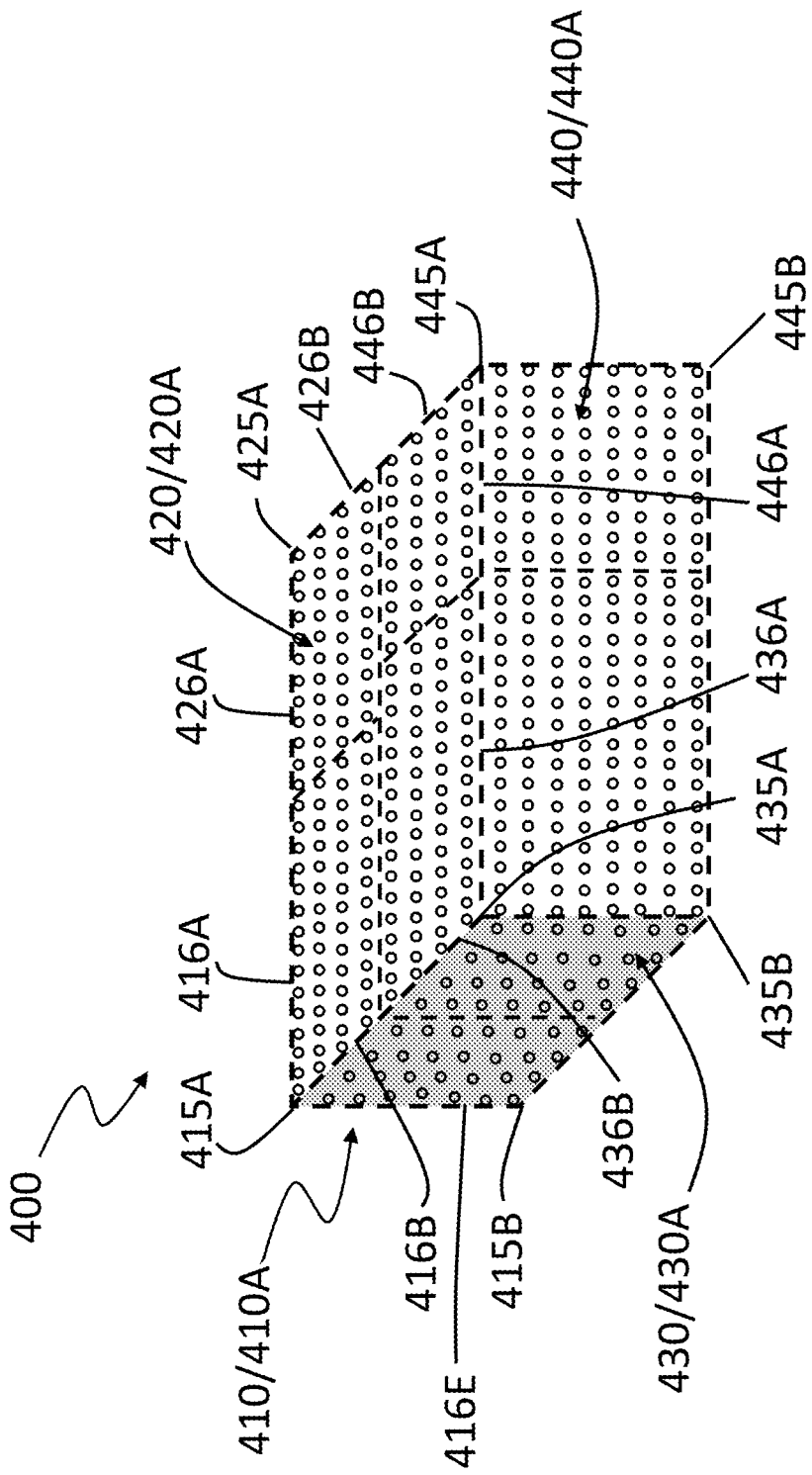

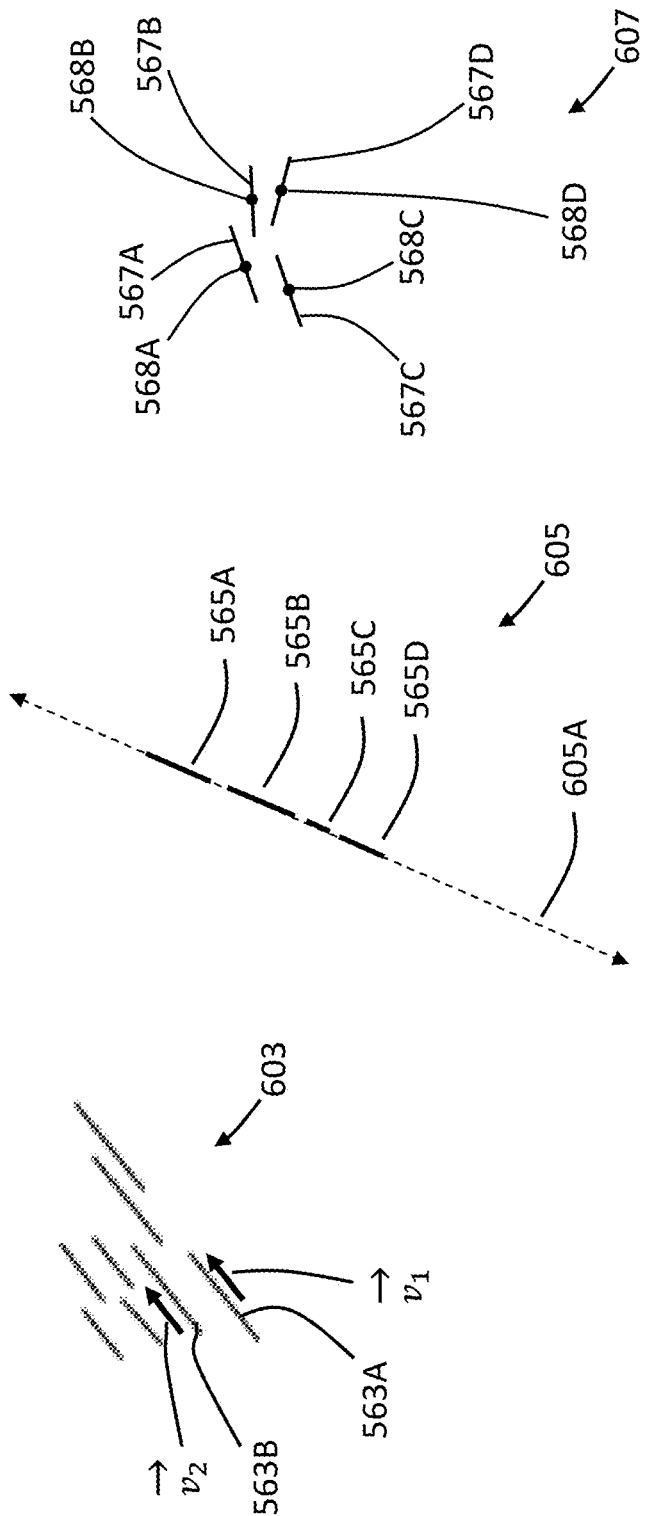

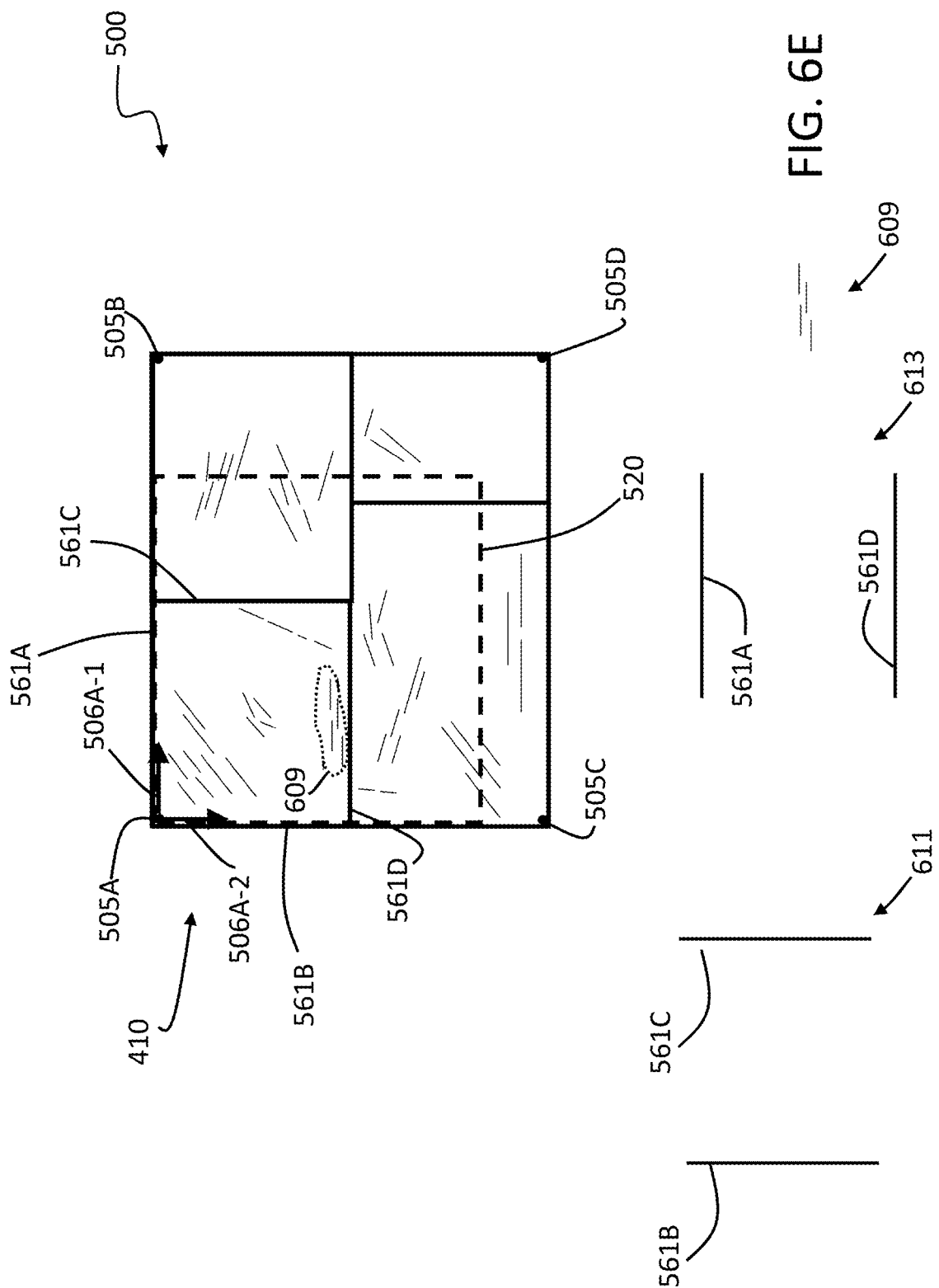

METHOD AND COMPUTING SYSTEM FOR PROCESSING CANDIDATE EDGES

FIELD OF THE INVENTION

The present disclosure is related to computing systems and methods for processing candidate edges and/or spatial structure information. For instance, embodiments hereof are related to texture filtering and edge detection.

BACKGROUND OF THE INVENTION

As automation becomes more common, robots are being used in more environments, such as in warehousing and manufacturing environments. For instance, robots may be used to load items onto or off of a pallet in a warehouse, or to pick up objects from a conveyor belt in a factory. The movement of the robot may be fixed, or may be based on an input, such as spatial structure information obtained by one or more sensors in a warehouse or factory. Robot guidance may be assisted via object recognition performed according to the spatial structure data. Methods and techniques that improve object recognition are thus valuable.

SUMMARY

One aspect of the present disclosure relates to a computing system, method, and/or non-transitory computer-readable medium having instructions for processing candidate edges. In some instances, the computing system may include a processing circuit for performing the method, such as by executing the instructions. In an embodiment, the method may be performed when spatial structure information which describes respective one or more object structures for one or more objects is stored on the non-transitory computer-readable medium, and when 2D image information describing the one or more objects is stored on the non-transitory computer-readable medium. In an embodiment, the method may include identifying, based on the spatial structure information, a 3D location that represents a corner of an object structure of the one or more object structures; identifying, based on the spatial structure information, a 3D vector that extends from the 3D location and is parallel with an edge of the object structure; determining a 2D location within the 2D image information that corresponds to the 3D location; determining a 2D vector within the 2D image information that corresponds to the 3D vector; determining an edge detection region within the 2D image information based on the 2D location; identifying a cluster of candidate edges within the edge detection region that does not represent any object edge of the one or more object structures according to a comparison between the candidate edges and the 2D vector; identifying, as a 2D object edge, a candidate edge that is not part of the identified cluster of candidate edges; and performing segmentation of the spatial structure information based on the 2D object edge.

BRIEF DESCRIPTION OF THE FIGURES

FIGS. 2A-2C provide block diagrams that illustrate a computing system configured to process spatial structure information and 2D image information consistent with embodiments hereof.

FIGS. 4D-4G illustrate examples of spatial structure information consistent with embodiments hereof.

FIGS. 6A-6F illustrate examples of clusters of candidate edges consistent with embodiments hereof.

DETAILED DESCRIPTION OF THE FIGURES

Figure 1A:
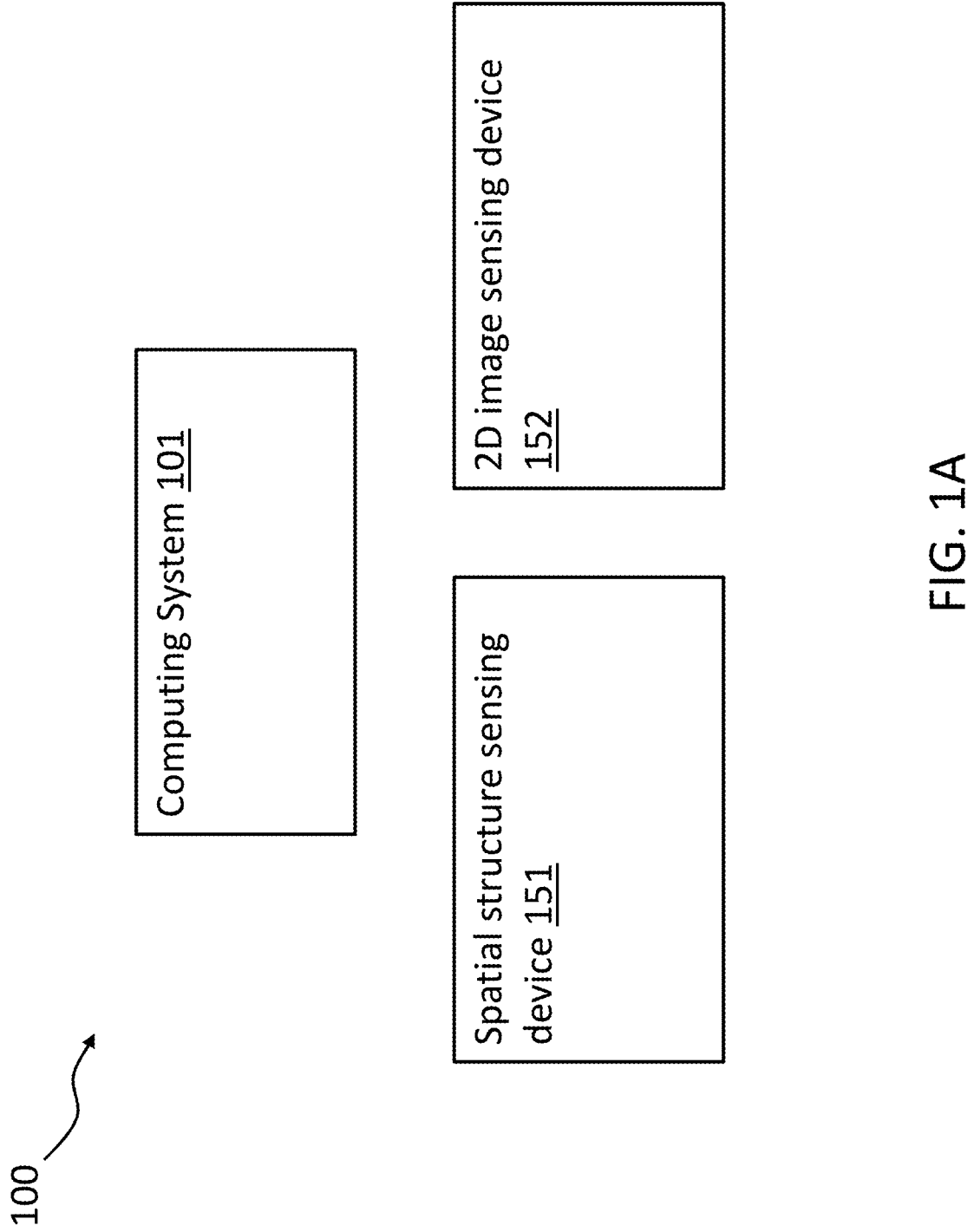
FIGS. 1A through 1F illustrate a spatial structure sensing device and a computing system configured for accessing and processing spatial structure information and 2D image information consistent with embodiments hereof.

The present disclosure provides systems and methods for processing spatial structure information (e.g., a point cloud generated by a spatial structure sensing device) and/or 2D image information (e.g., a 2D image generated by a 2D image sensing device). One aspect of the embodiments herein relates to segmenting spatial structure information. For example, the spatial structure information may represent a set of objects (e.g., a set of boxes), and may be segmented into separate portions that represent individual objects (e.g. individual boxes). In some cases, the 2D image information may be used to assist in segmenting the spatial structure information. For example, the 2D image information may include visual texture, which may refer to a visual pattern, visual marking, or other visual detail. In some cases, a visual marking may form a candidate edge, which may capture a physical feature of one of the objects, such as a physical edge or physical corner (which may also be referred to simply as an edge or corner of one of the objects). In some cases, a physical feature (e.g., an inner edge) may be difficult to detect solely from the spatial structure information. Thus, the candidate edge of the 2D image information may in some examples be used to provide information regarding the physical feature, which may assist in the segmentation of the spatial structure information.

One aspect of the embodiments herein relates to identifying candidate edges which may be false edges. A false edge may be, e.g., a candidate edge that does not actually represent a physical edge or other physical feature. For example, the false edge may have a resemblance to how a physical edge should appear in the 2D image information, but may actually represent some other feature (e.g., text or graphics disposed on an object) or may actually be an artifact caused by image noise. Thus, embodiments herein may involve identifying false edges, and filtering them from the 2D image information, or removing the false edges from consideration when searching for candidate edges which represent a physical edge.

In some cases, false edges may be identified by comparing their orientations to a corner orientation, such as a 2D corner orientation or a 3D corner orientation, which are discussed below in more detail. The 3D corner orientation may be defined by, e.g., one or more 3D vectors. In some instances, the one or more 3D vectors may represent one or more physical edges that extend from a particular physical corner of the object. The one or more 3D vectors may in some cases indicate one or more edge orientations. In an embodiment, the 2D corner orientation may be determined by projecting the 3D corner orientation from a reference frame of the spatial structure information (which may be referred to as 3D space) to a reference frame of the 2D image information (which may be referred to as 2D space). In such an embodiment, the false edges may be identified based on whether their orientations sufficiently match the 2D corner orientation and/or the 3D corner orientation.

One aspect of the embodiments herein relates to clustering candidate edges, which may refer to identifying which candidate edges of 2D image information should belong to a common cluster. Clustering the candidate edges may, e.g., lead to more efficient processing of the candidate edges. For instance, the clustering may allow candidate edges to be filtered out from 2D image information on a cluster-by-cluster basis, rather than on the basis of individual candidate edges. The clustering may be performed based on, e.g., similarity between respective orientations of the candidate edges, based on which of the candidate edges are co-linear, proximity between the candidate edges, based on any other criterion, or any combination thereof.

FIG. 1A illustrates a system 100 for segmenting or otherwise processing spatial structure information (spatial structure information is discussed below in more detail). In the embodiment of FIG. 1A, the system 100 may include a computing system 101, a spatial structure sensing device 151, and a 2D image sensing device 152. In an embodiment, the spatial structure sensing device 151 may be configured to generate spatial structure information (also referred to as spatial structure data) and may be configured to make the spatial structure information available to the computing system 101, which may be configured to process the spatial structure information. In some cases, the 2D image sensing device 152 may be configured to generate 2D image information (e.g., one or more 2D images), which is also discussed below in more detail. In some instances, the computing system 101, the spatial structure sensing device 151, and the 2D image sensing device 152 may be located in the same premises, such as a warehouse or factory. In some instances, the computing system 101, the 2D image sensing device 152, and/or the spatial structure sensing device 151 may be remote from each other.

Figure 1B:
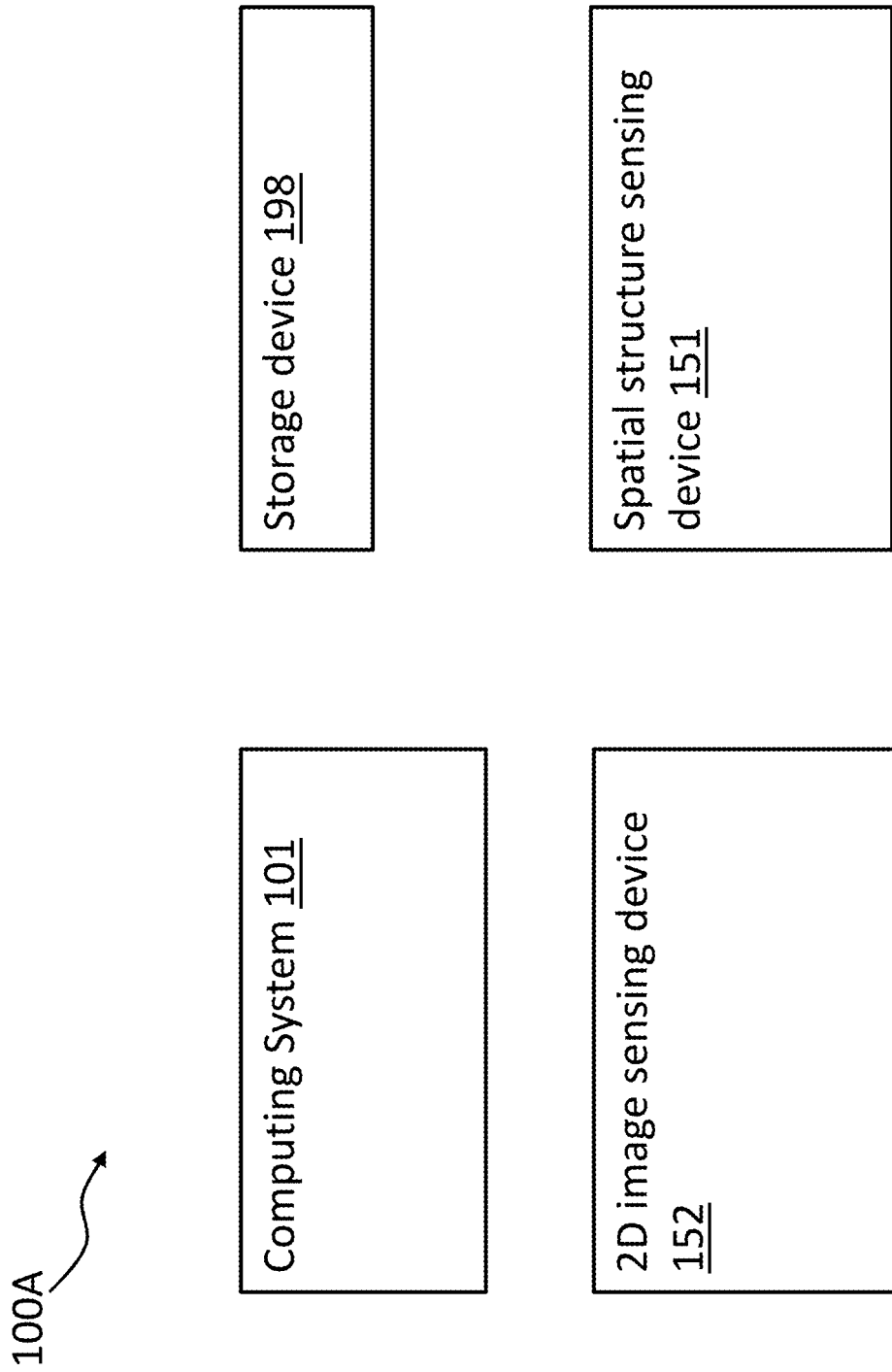

In an embodiment, the spatial structure sensing device 151 and/or the 2D image sensing device 152 may be configured to make the spatial structure information and the 2D image information available via a communication interface and/or a data storage device (which may also be referred to as a storage device). For instance, FIG. 1B depicts a system 100A that is an embodiment of the system 100 of FIG. 1A. The system 100A includes the computing system 101, the spatial structure sensing device 151, and further includes a data storage device 198 (or any other type of a non-transitory computer-readable medium). The data storage device 198 may be part of the spatial structure sensing device 151/2D image sensing device 152 or may be separate from the spatial structure sensing device 151/2D image sensing device 152. For instance, the storage device 198 may be located in a data center that is remote from the spatial structure sensing device 151 and from the 2D image sensing device 152, and may receive and store spatial structure information generated by the spatial structure sensing device 151 and/or 2D image information generated by the 2D image sensing device 152. In this embodiment, the computing system 101 may be configured to access the spatial structure information and/or the 2D image information by retrieving (or, more generally, receiving) the spatial structure information and/or the 2D image information from the data storage device 198.

In FIG. 1B, the storage device 198 may include any type of non-transitory computer-readable medium (or media), which may also be referred to as a non-transitory computer readable storage device. Such non-transitory computer-readable medium or storage device may be configured to store and provide access to stored information (also referred to as stored data). Examples of the non-transitory computer readable medium or storage device may include, but is not limited to, an electronic storage device, a magnetic storage device, an optical storage device, an electromagnetic storage device, a semiconductor storage device, or any suitable combination thereof, for example, such as a computer diskette, a hard disk, a random access memory (RAM), a read-only memory (ROM), an erasable programmable read-only memory (EPROM or Flash memory), a solid state drive, a static random access memory (SRAM), a portable compact disc read-only memory (CD-ROM), a digital versatile disk (DVD), and/or a memory stick.

Figure 1C:
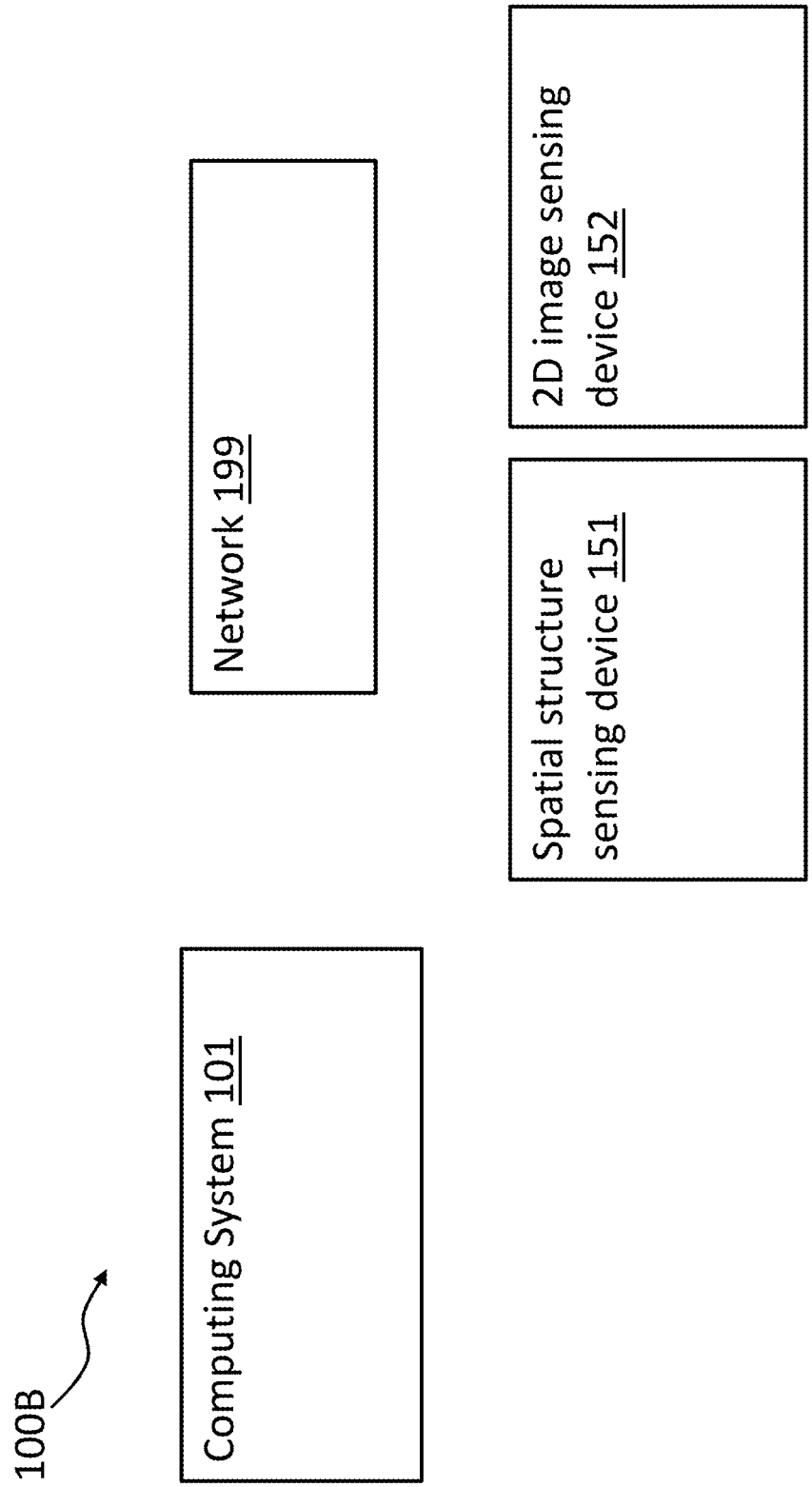

In an embodiment, the computing system 101 and the spatial structure sensing device 151 may be configured to communicate spatial structure information via a network. Similarly, the computing system 101 and the 2D image sensing device 152 may be configured to communicate 2D image information via the network. For instance, FIG. 1C depicts a system 100B that is an embodiment of system 100 of FIG. 1A and/or of the system 100A in FIG. 1B. In system 100B, the computing system 101 may be configured to receive spatial structure information from the spatial structure sensing device 151 via a network 199, and to receive 2D image information from the 2D image sensing device 152 via the network 199. The network 199 may provide an individual network connection or a series of network connections to permit the computing system 101 to receive spatial structure information and/or 2D image information consistent with the embodiments hereof.

In FIG. 1C, the network 199 may be connected via wired or wireless links. Wired links may include Digital Subscriber Line (DSL), coaxial cable lines, or optical fiber lines. Wireless links may include Bluetooth®, Bluetooth Low Energy (BLE), ANT/ANT+, ZigBee, Z-Wave, Thread, Wi-Fi®, Worldwide Interoperability for Microwave Access (WiMAX®), mobile WiMAX®, WiMAX®-Advanced, NFC, SigFox, LoRa, Random Phase Multiple Access (RPMA), Weightless-N/P/W, an infrared channel or a satellite band. The wireless links may also include any cellular network standards to communicate among mobile devices, including standards that qualify as 2G, 3G, 4G, or 5G. Wireless standards may use various channel access methods, e.g., FDMA, TDMA, CDMA, OFDM, or SDMA. In some embodiments, different types of information may be transmitted via different links and standards. In other embodiments, the same types of information may be transmitted via different links and standards. Network communications may be conducted via any suitable protocol, including, e.g., http, tcp/ip, udp, ethernet, ATM, etc.

The network 199 may be any type and/or form of network. The geographical scope of the network may vary widely and the network 199 can be a body area network (BAN), a personal area network (PAN), a local-area network (LAN), e.g., Intranet, a metropolitan area network (MAN), a wide area network (WAN), or the Internet. The topology of the network 199 may be of any form and may include, e.g., any of the following: point-to-point, bus, star, ring, mesh, or tree. The network 199 may be of any such network topology as known to those ordinarily skilled in the art capable of supporting the operations described herein. The network 199 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv4 and IPv4), or the link layer. The network 199 may be a type of broadcast network, a telecommunications network, a data communication network, or a computer network.

In an embodiment, the computing system 101, the 2D image sensing device 152, and the spatial structure sensing device 151 may be able to communicate via a direct connection rather than a network connection. For instance, the computing system 101 in such an embodiment may be configured to receive the spatial structure information and/or 2D image information via a dedicated communication interface, such as a RS-232 interface, a universal serial bus (USB) interface, and/or via a local computer bus, such as a peripheral component interconnect (PCI) bus.

Figure 1D:
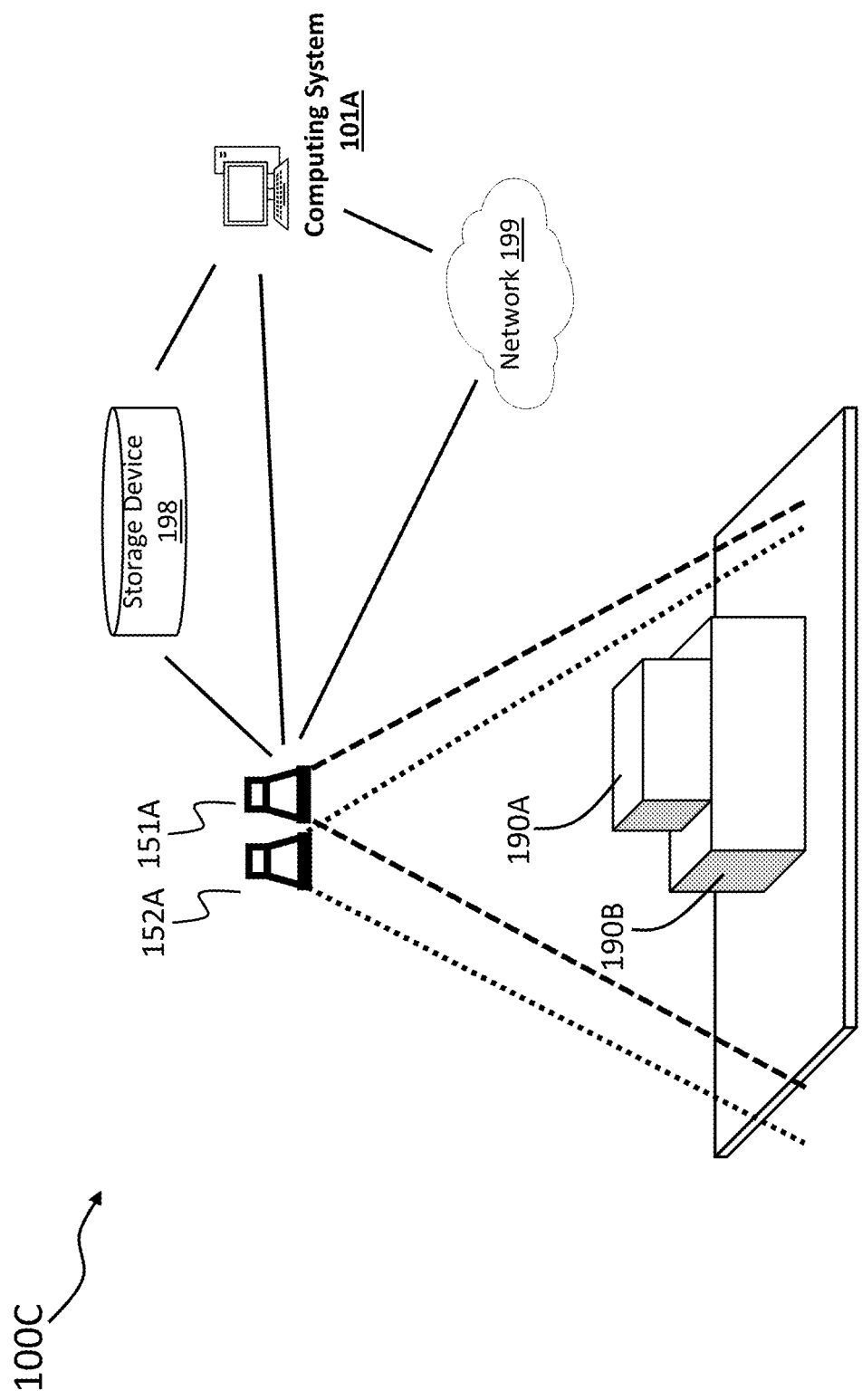

FIG. 1D illustrates a system 100C, which may be an embodiment of system 100, for generating and processing spatial structure information and 2D image information. The system 100C includes a computing system 101A, a spatial structure sensing device 151A, a 2D image sensing device 152A, the storage device 198, and the network 199. The spatial structure sensing device 151A is configured to capture or otherwise generate spatial structure information that describes a structure of one or more objects, such as a structure of object 190A and a structure of object 190B (also referred to as an object structure for object 190A and an object structure for object 190B). In an embodiment, the spatial structure information generated by the spatial structure sensing device 151/151A may be used to describe the structure of the one or more objects 190A, 190B in three dimensions (that is, to describe a 3D structure of the one or more objects 190A, 190B). Thus, the spatial structure sensing device 151/151A may also be referred to as a 3D sensing device (e.g., a 3D camera). The 2D image sensing device 152A is configured to capture or otherwise generate 2D image information which describes or otherwise represents an appearance of the one or more objects 190A, 190B, or more specifically one or more visual features (e.g., visual texture) appearing on the one or more objects 190A, 190B. If the 2D image sensing device 152/152A is specifically configured to generate one or more 2D images, it may also be referred to as a 2D camera. The computing system 101A is configured to access and process spatial structure information and the 2D image information. In the embodiment of FIG. 1D, the computing system 101A may be a desktop computer, which is an embodiment of the computing system 101 of FIG. 1A.

In an embodiment, the spatial structure sensing device 151A may be a depth-sensing camera (e.g., a time-of-flight camera or structured light camera), which is an embodiment of the spatial structure sensing device 151 of FIG. 1A, and the spatial structure information that is generated may include depth information. In an embodiment, the 2D image sensing device 152A may be a color camera, a grayscale camera, or other 2D camera. Further in this example, the computing system 101A may access the spatial structure information and 2D image information via any suitable means. For example, the computing system 101A may retrieve (or, more generally, receive) the spatial structure information from the spatial structure sensing device 151A via the storage device 198, over the network 199, and/or via a direct connection to the spatial structure sensing device 151A. Similarly, the 2D image information may be accessed from the 2D image sensing device 152A via the storage device 198, over the network 199, and/or via a direct connection to the 2D image sensing device 152A.

Figure 1E:
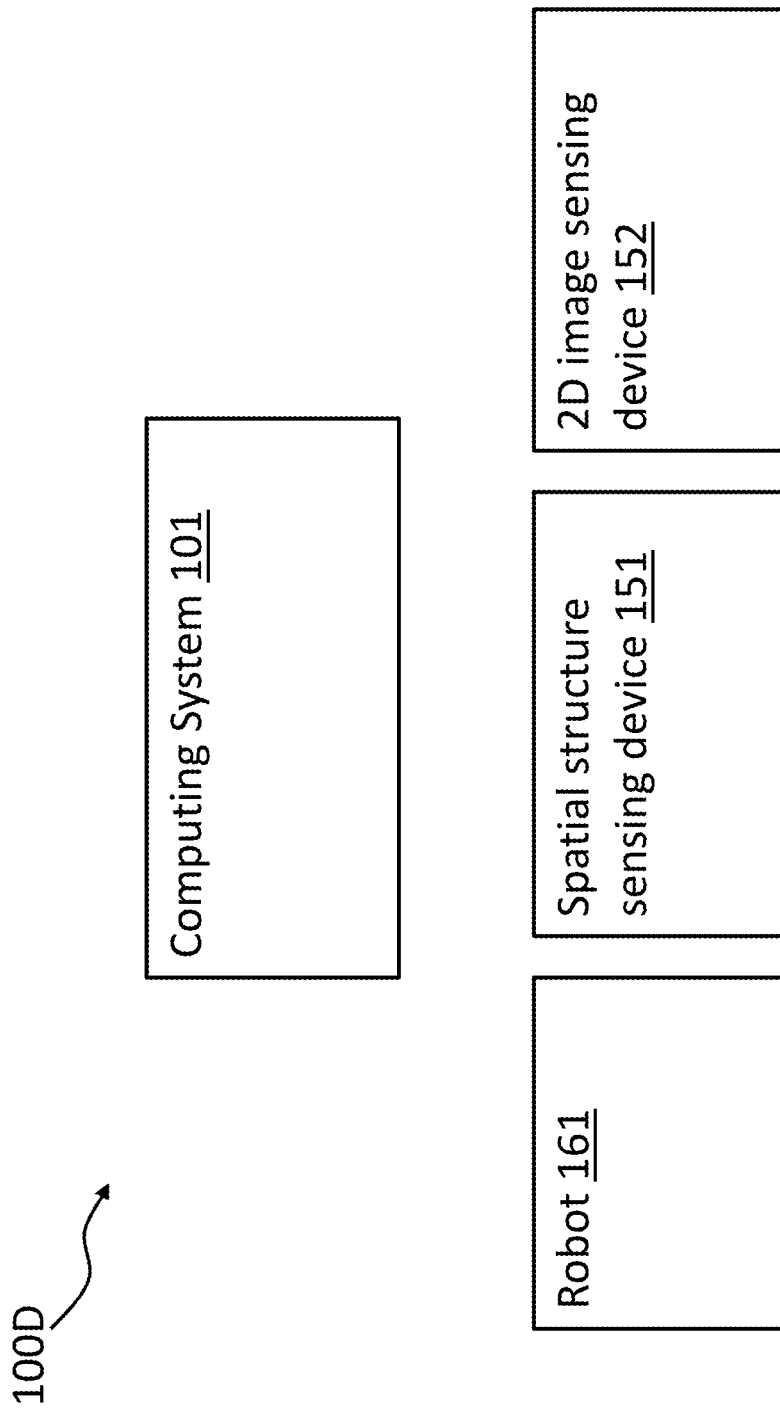

In an embodiment, as stated above, the spatial structure information may be generated to facilitate the control of a robot. For instance, FIG. 1E illustrates a robot operation system 100D (which is an embodiment of system 100) that is able to generate and process spatial structure information and/or 2D image information, and to control a robot 161 based on the processing. For instance, the spatial structure sensing device 151 may be a depth-sensing camera that is configured to generate spatial structure information (e.g., a point cloud) that describes a structure of one or more objects in a field of view of the depth-sensing camera. Further, the 2D image sensing device 152 may be a 2D camera that is configured to generate 2D image information that describes an appearance of the one or more objects in a field of view of the 2D camera. The computing system 101 may be configured, for example, to receive the spatial structure information and/or 2D image information and use the information to determine a size, shape, location, orientation, a corner, and/or an edge of the one or more objects. In these instances, movement of the robot 161 may be controlled to interact with the one or more objects based on their determined size, shape, location, orientation, corner, and/or edge.

In an embodiment, the computing system 101 may be configured to directly control the movement of the robot 161 based on information determined from processing the spatial structure information and/or the 2D image information. For example, the computing system 101 may be configured to generate one or more movement commands (e.g., motor commands) based on the determined information, and communicate the one or more movement commands to the robot 161. In such an example, the computing system 101 may act as a robot control system (also referred to as a robot controller).

Figure 1F:
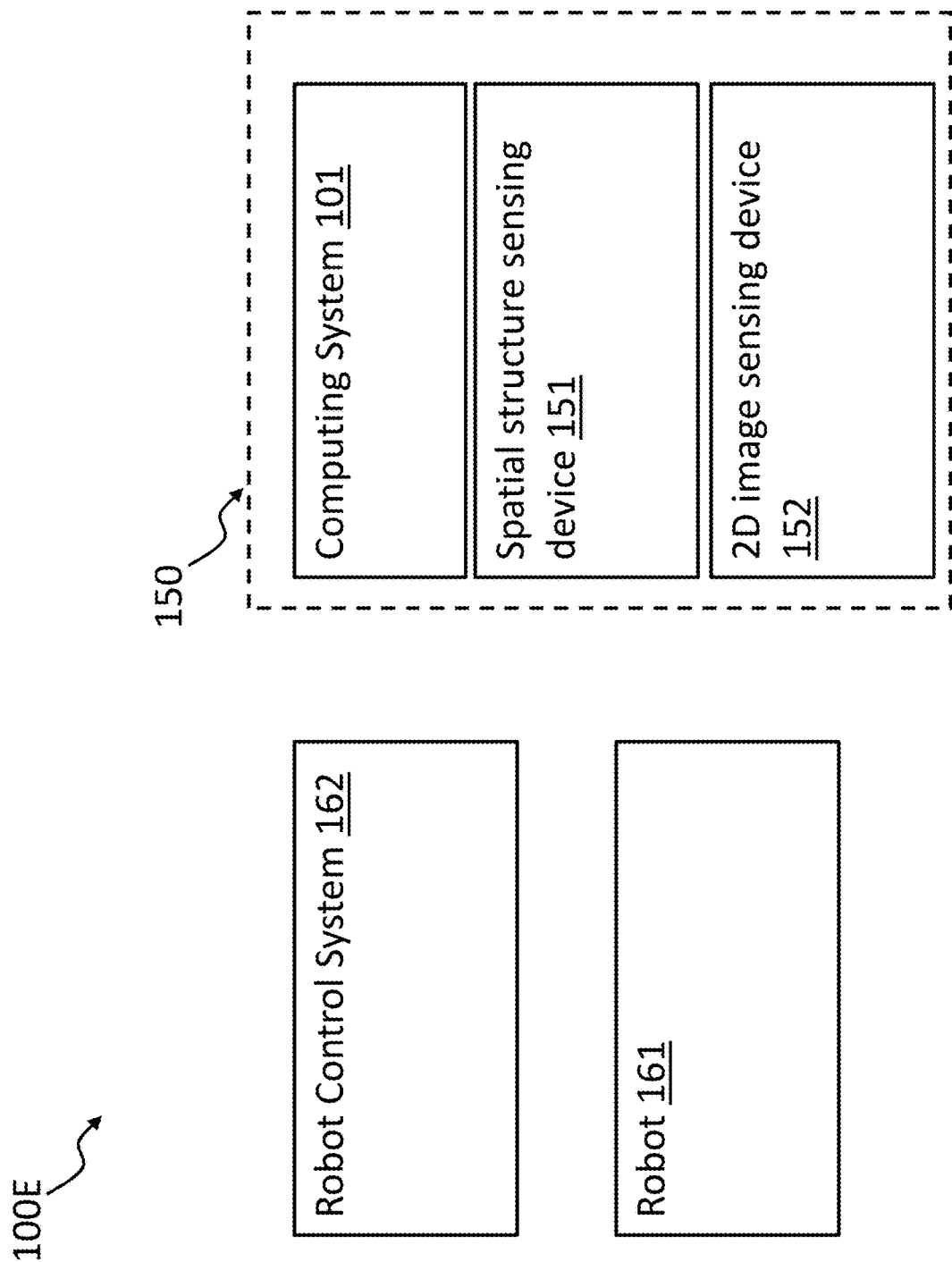

In another embodiment, the computing system 101 may be configured to communicate the determined information to a robot control system that is separate from the computing system 101, and the robot control system may be configured to control movement of the robot 161 (e.g., by generating one or more movement commands) based on the determined information. For instance, FIG. 1F depicts a robot operation system 100E (which is an embodiment of the system 100 of FIG. 1A and the system 100D of FIG. 1E) that includes a robot control system 162. More specifically, the computing system 101, the spatial structure sensing device 151, and the 2D image sensing device 152 in FIG. 1F may form a vision system 150 that is configured to provide to the robot control system 162 information about an environment of the robot 161, and more specifically about objects in that environment that the robot 161 is to manipulate, or to interact with in some other manner. The computing system 101 may function as a vision controller that is configured to process spatial structure information and/or 2D image information to determine that information, which may include, e.g., a classification that indicates a type of the object, a shape or size of the objects, and/or a location of the objects relative to the robot 161 (e.g., relative to a robot arm of the robot 161). The computing system 101 may be configured to communicate the determined information to the robot control system 162, which may be configured to generate one or more movement commands based on the information received from the computing system 101.

As stated above, the spatial structure sensing device 151 of FIGS. 1A through 1F may be configured to generate spatial structure information which describes respective structures of one or more objects in an environment of the spatial structure sensing device 151. As used herein, spatial structure information refers to any type of information that describes a physical structure of a physical object (also referred to as a structure of the object), and more specifically may include information about the shape, orientation, arrangement, size, a corner, and/or an edge of the physical object. In an embodiment, the spatial structure information may include location data that describes a location of the structure relative to the spatial structure sensing device 151, relative to the robot 161, or relative to some other element. As stated above, the spatial structure information may be used to describe a 3D structure of an object. Thus, the spatial structure information may also be referred to as 3D information.

In an embodiment, the spatial structure information may comprise image data, and any and all systems, methods, and techniques described herein with respect to spatial structure information, unless explicitly stated otherwise, may be applied equally to the image data, which is a form of the spatial structure information. For instance, the spatial structure information may comprise an image that is or includes a depth map. The depth map may be an image having a plurality of pixels and that further includes depth information. The depth information may include, e.g., respective depth values assigned to or included with some or all of the pixels. The depth value for a particular pixel may indicate depth of a location represented by or otherwise corresponding to that pixel.

More specifically, the depth information represents information indicative of distances along an axis that is orthogonal to an imaginary plane on which the spatial structure sensing device 151 is located. In some cases, if the spatial structure sensing device 151 is a camera having an image sensor, the imaginary plane may be an image plane defined by the image sensor. In an embodiment, depth information, as used herein may be indicative of a distance away from the spatial structure sensing device 151. In an embodiment, depth information may be manipulated to represent relative distances from any suitable plane parallel to the imaginary plane on which the spatial structure sensing device 151 is located. For instance, the suitable plane may be defined by a ceiling, floor, or wall of a room, or a platform on which one or more objects are located. In an example, if the spatial structure sensing device 151 is located above one or more objects, depth information may be representative of a height of various points and surfaces of the one or more objects relative to a surface on which the one or more objects are disposed. In another example, if one or more objects are displaced or otherwise offset horizontally from the spatial structure sensing device 151, depth information may be indicative of how far horizontally the one or more objects extend away from the spatial structure sensing device 151.

In an embodiment, the spatial structure information may be a point cloud. As used herein, a point cloud may identify a plurality of points that describe object structure (i.e., describe a structure of an object). The plurality of points may be, e.g., respective locations on one or more surfaces of the object structure. In some cases, the point cloud may include a plurality of coordinates that identify or otherwise describe the plurality of points. For instance, the point cloud may include a series of Cartesian or polar coordinates (or other data values) that specify respective locations or other features of the object structure. The respective coordinates may be expressed with respect to a reference frame (e.g., coordinate system) of the spatial structure sensing device 151, or with respect to some other reference frame. In some cases, the respective coordinates are discrete and spaced apart from each other but may be understood to be representative of a contiguous surface of the object structure. In an embodiment, the point cloud may be generated from a depth map or other information (e.g., by the computing system 101).

In some embodiments, the spatial structure information may further be stored according to any appropriate format, such as polygon or triangular mesh models, non-uniform rational basis spline models, CAD models, parameterization of primitives (e.g., a rectangle may be defined according to a center and extensions in the x, y, and z directions, a cylinder can be defined by a center, a height, an upper radius, and a lower radius, etc.), etc.

As stated above, the spatial structure information is captured or otherwise generated via the spatial structure sensing device 151. In an embodiment, the spatial structure sensing devices may be or include a 3D camera or any other 3D image sensing device. The 3D camera may be a depth-sensing camera, such as a time-of-flight (TOF) camera or a structured light camera, or any other type of 3D camera. In some cases, the 3D camera may include an image sensor, such as a charge coupled devices (CCDs) sensor and/or complementary metal oxide semiconductors (CMOS) sensor. In an embodiment, the spatial structure sensing device 151 may include lasers, a LIDAR device, an infrared device, a light/dark sensor, a motion sensor, a microwave detector, an ultrasonic detector, a RADAR detector, or any other device configured to capture spatial structure information.

In an embodiment, as stated above, the 2D image sensing device may be a 2D camera, such as a color camera or grayscale camera. The 2D camera may also include, e.g., an image sensor, such as a charge coupled devices (CCDs) sensor and/or complementary metal oxide semiconductors (CMOS) sensor. In some cases, the 2D image information may include a plurality of pixels that form a 2D image. Each pixel of the 2D image information may represent, e.g., an intensity or other property of light reflecting off a location corresponding to the pixel. In an embodiment, the spatial structure sensing device 151 and the 2D image sensing device 152 may be integrated into a single device. For instance, they may be enclosed by a single housing, and may have a fixed relative location and relative orientation. In some cases, they may share a single communication interface and/or a single power supply. In an embodiment, the spatial structure sensing device 151 and the 2D image sensing device 152 may be two separate devices that can have locations and/or orientations that are independent of each other.

As further stated above, the spatial structure information and/or 2D image information generated by the spatial structure sensing device 151 may be processed by the computing system 101. In an embodiment, the computing system 101 may include or be configured as a server (e.g., having one or more server blades, processors, etc.), a personal computer (e.g., a desktop computer, a laptop computer, etc.), a smartphone, a tablet computing device, and/or other any other computing system. In an embodiment, any or all of the functionality of the computing system 101 may be performed as part of a cloud computing platform. The computing system 101 may be a single computing device (e.g., a desktop computer), or may include multiple computing devices.

FIG. 2A provides a block diagram that illustrates an embodiment of the computing system 101. The computing system 101 includes a processing circuit 110 and a non-transitory computer-readable medium (or media) 120. In an embodiment, the processing circuit 110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit. In an embodiment, the non-transitory computer-readable medium 120 may be a storage device, such as an electronic storage device, a magnetic storage device, an optical storage device, an electromagnetic storage device, a semiconductor storage device, or any suitable combination thereof, for example, such as a computer diskette, a hard disk, a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium may include multiple storage devices. In certain cases, the non-transitory computer-readable medium 120 is configured to store spatial structure information received from the spatial structure sensing device 151 and/or 2D image information received form the 2D image sensing device 152. In certain cases, the non-transitory computer-readable medium 120 further stores computer readable program instructions that, when executed by the processing circuit 110, causes the processing circuit 110 to perform one or more methodologies described here, such as the operation described with respect to FIGS. 3A and 3B.

Figure 2B:
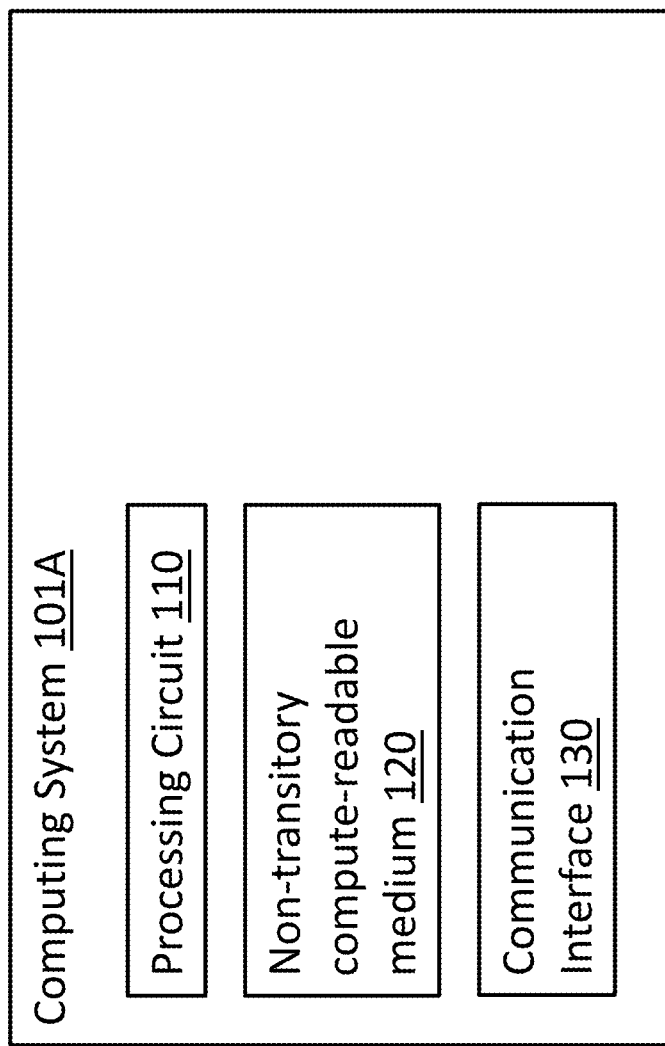

FIG. 2B depicts a computing system 101A that is an embodiment of the computing system 101 and includes a communication interface 130. The communication interface 130 may be configured to, e.g., receive spatial structure information from the spatial structure sensing device 151 and/or 2D image information from the 2D image sensing device 152, such as via the storage device 198 of FIG. 1B, the network 199 of FIG. 1C, or via a more direct connection. In an embodiment, the communication interface 130 may be configured to communicate with the robot 161 of FIG. 1E or the robot control system 162 of FIG. 1F. The communication interface 130 may include, e.g., a communication circuit configured to perform communication over a wired or wireless protocol. As an example, the communication circuit may include a RS-232 port controller, a USB controller, an Ethernet controller, a Bluetooth® controller, a PCI bus controller, any other communication circuit, or a combination thereof.

Figure 2C:
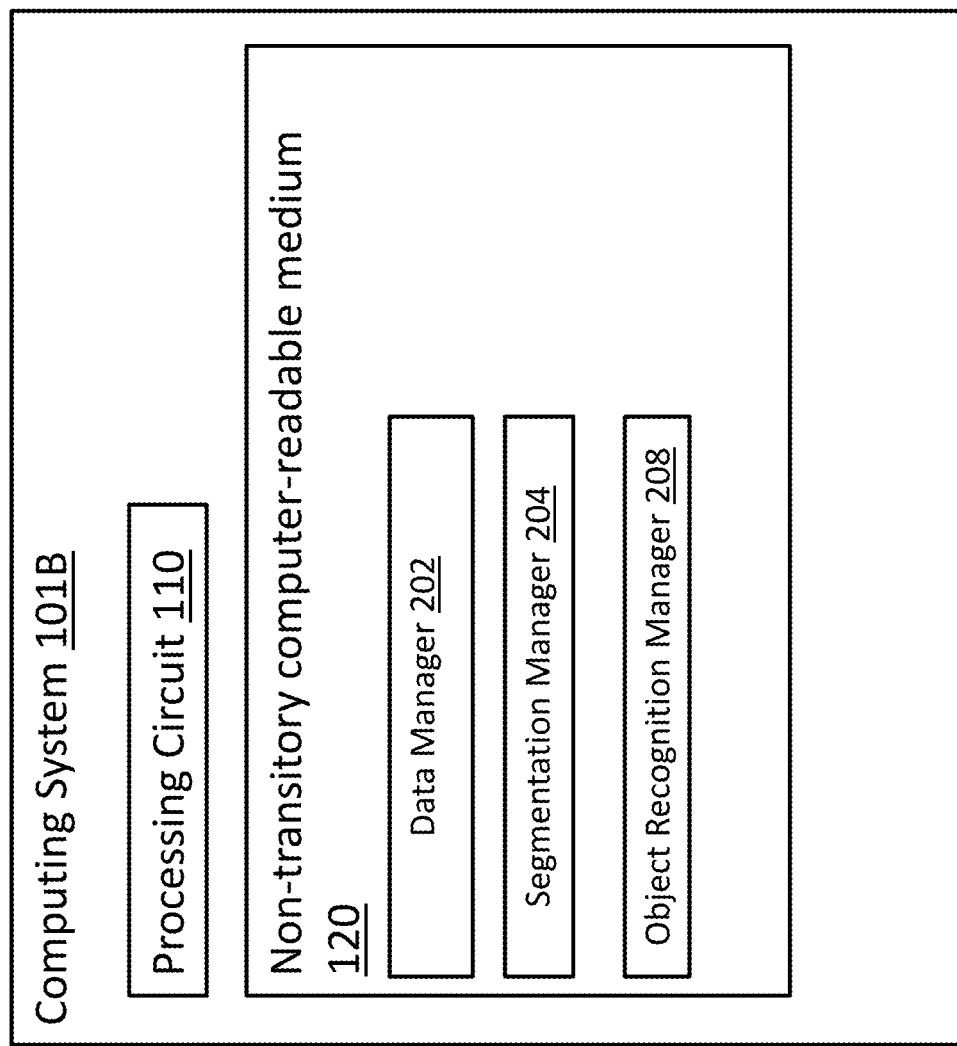

In an embodiment, the processing circuit 110 may be programmed by one or more computer-readable program instructions stored on the storage device 120. For example, FIG. 2C illustrates a computing system 101B, which is an embodiment of the computing system 101, in which the processing circuit 110 is programmed by a data manager 202, a segmentation manager 204, and an object recognition manager 208. It will be understood that the functionality of the various managers as discussed herein is representative and not limiting.

In various embodiments, the terms "software protocol," "software instructions," "computer instructions," "computer-readable instructions," and "computer-readable program instructions" are used to describe software instructions or computer code configured to carry out various tasks and operations. As used herein, the term "manager" refers broadly to a collection of software instructions or code configured to cause the processing circuit 110 to perform one or more functional tasks. For convenience, the various managers, computer instructions, and software protocols will be described as performing various operations or tasks, when, in fact, the managers, computer instructions, and software protocols program hardware processors to perform the operations and tasks. Although described in various places as "software" it is understood that the functionality performed by the "managers," "software protocols," and "computer instructions," may more generally be implemented as firmware, software, hardware, or any combination thereof. Furthermore, embodiments herein are described in terms of method steps, functional steps, and other types of occurrences. In an embodiment, these actions occur according to computer instructions or software protocols executed by processing circuit 110.

In an embodiment, the data manager 202 is a software protocol operating on the computing system 101B. The data manager 202 is configured to access (e.g., receive, retrieve, store) spatial structure information and/or 2D image information, and perform any other suitable operation related to spatial structure information and/or 2D image information being received or processed (e.g., analyzed) by the computing system 101B. For example, the data manager 202 may be configured to access spatial structure information and/or 2D image information stored in non-transitory computer-readable medium 120 or 198, or via the network 199 and/or the communication interface 130 of FIG. 2B. The data manager 202 may also be configured to interact with other devices through the network 199, with the data storage unit 198, with the non-transitory computer-readable medium 120, with the spatial structure sensing device 151, and/or with the 2D image sensing device 152 to request, retrieve, access, send, store, or otherwise perform operations with the spatial structure information and/or 2D image information.

In embodiments, the data manager 202 is further configured to provide access tools to a user to manage and manipulate spatial structure information and/or 2D image information. For example, the data manager 202 may be configured to generate and/or provide access to databases, tables, file repositories, and other data storage structures. In embodiments, the data manager 202 may provide data retention capabilities. The data manager 202 is configured to access storage device 120, data storage unit 198, and other memory units to archive, store, and/or otherwise retain spatial structure information and any other information generated during processes of computer system 101B.

In an embodiment, the segmentation manager 204 may be configured to divide spatial structure information into a plurality of segments. For instance, if the spatial structure information represents a structure for a group of individual objects, such as a group of individual boxes placed next to each other, the segmentation manager 204 may be configured to identify respective portions of the spatial structure information that correspond to the individual objects. In another example, the segmentation manager 204 may be configured to identify a portion of the spatial structure information that corresponds to one of the individual objects, and to extract that portion from the spatial structure information. In an embodiment, the segmentation manager 204 may be a software protocol operating on control system 101B.

In an embodiment, the object recognition manger 208 may be configured to perform object recognition based on the spatial structure information. For example, if the segmentation manager 204 extracts a portion of the spatial structure information that corresponds to an individual object of a group of objects, the object recognition manager 208 may be configured to perform object recognition based on the extracted portion of the spatial structure information. In an embodiment, the object recognition manager 208 may be a software protocol operating on the computing system 101. In an embodiment, the object recognition manager 208 may be configured to generate a detection hypothesis based on the spatial structure information, as discussed below in more detail.

Figure 3A:
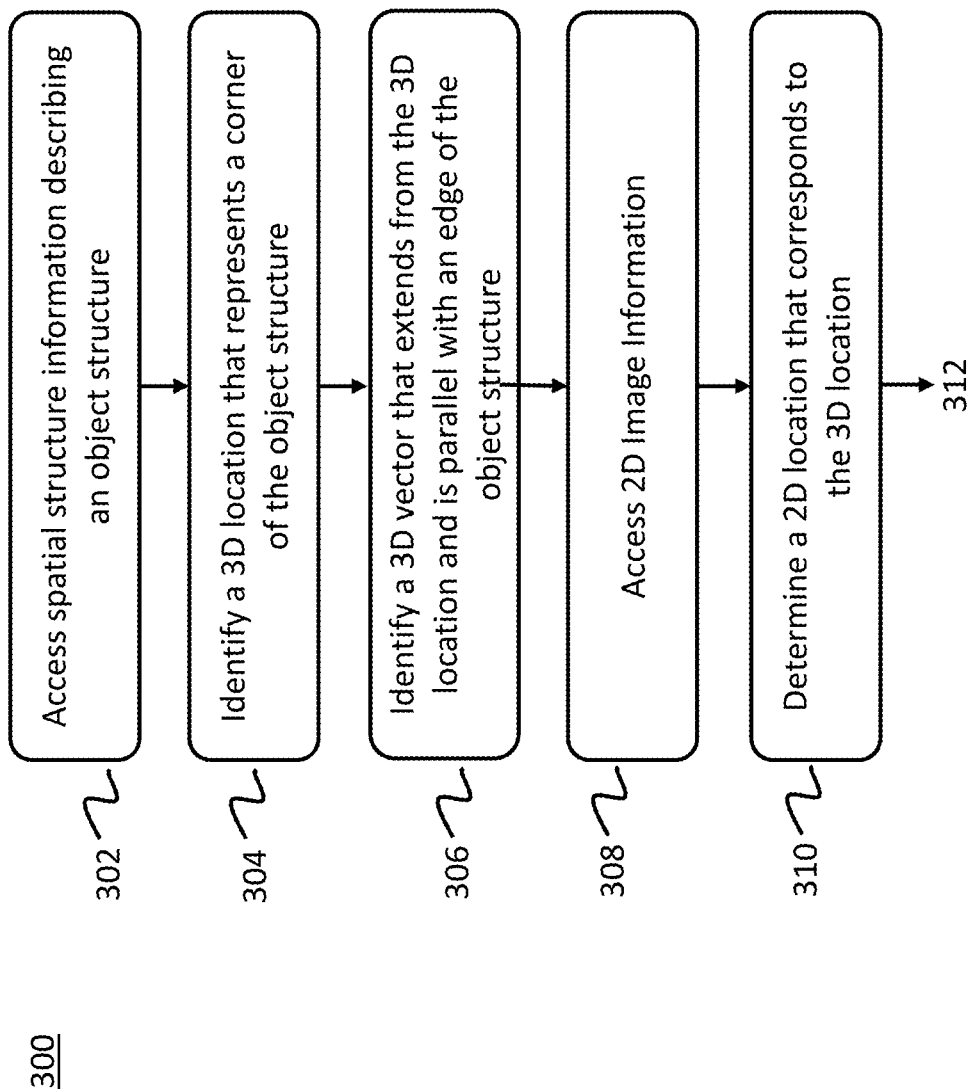
FIGS. 3A and 3B provides a flow diagram that illustrates a method of processing spatial structure information and candidate edges in 2D image information, according to an embodiment hereof.
Figure 3B:
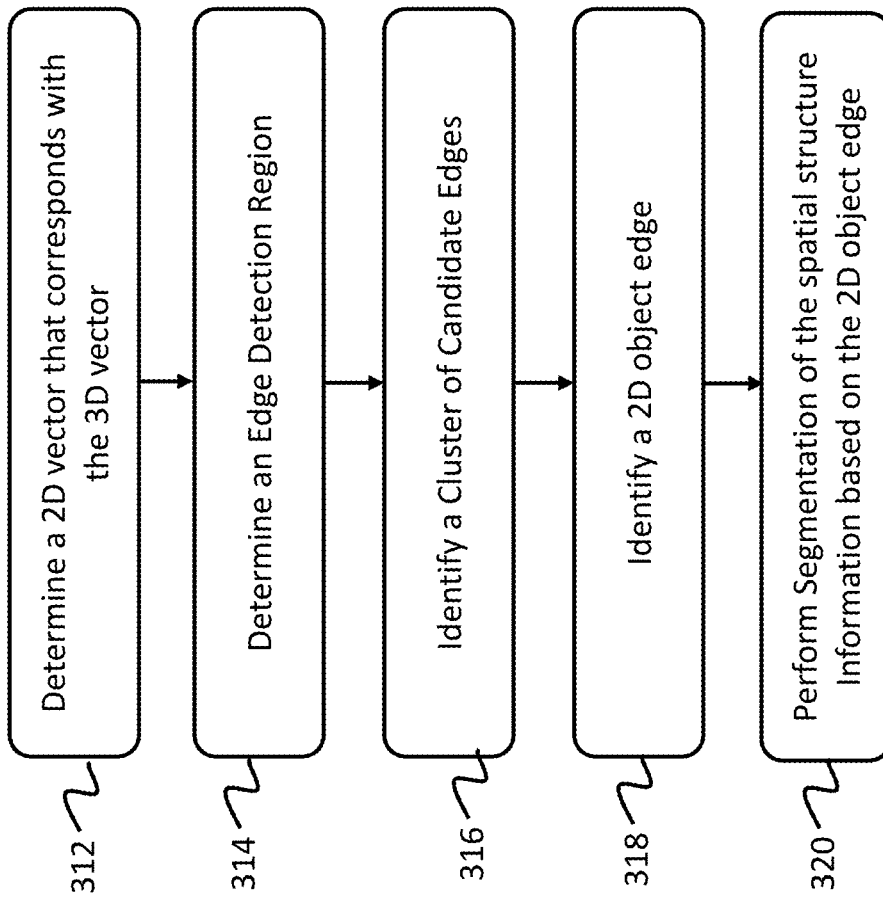
Figure 4A:
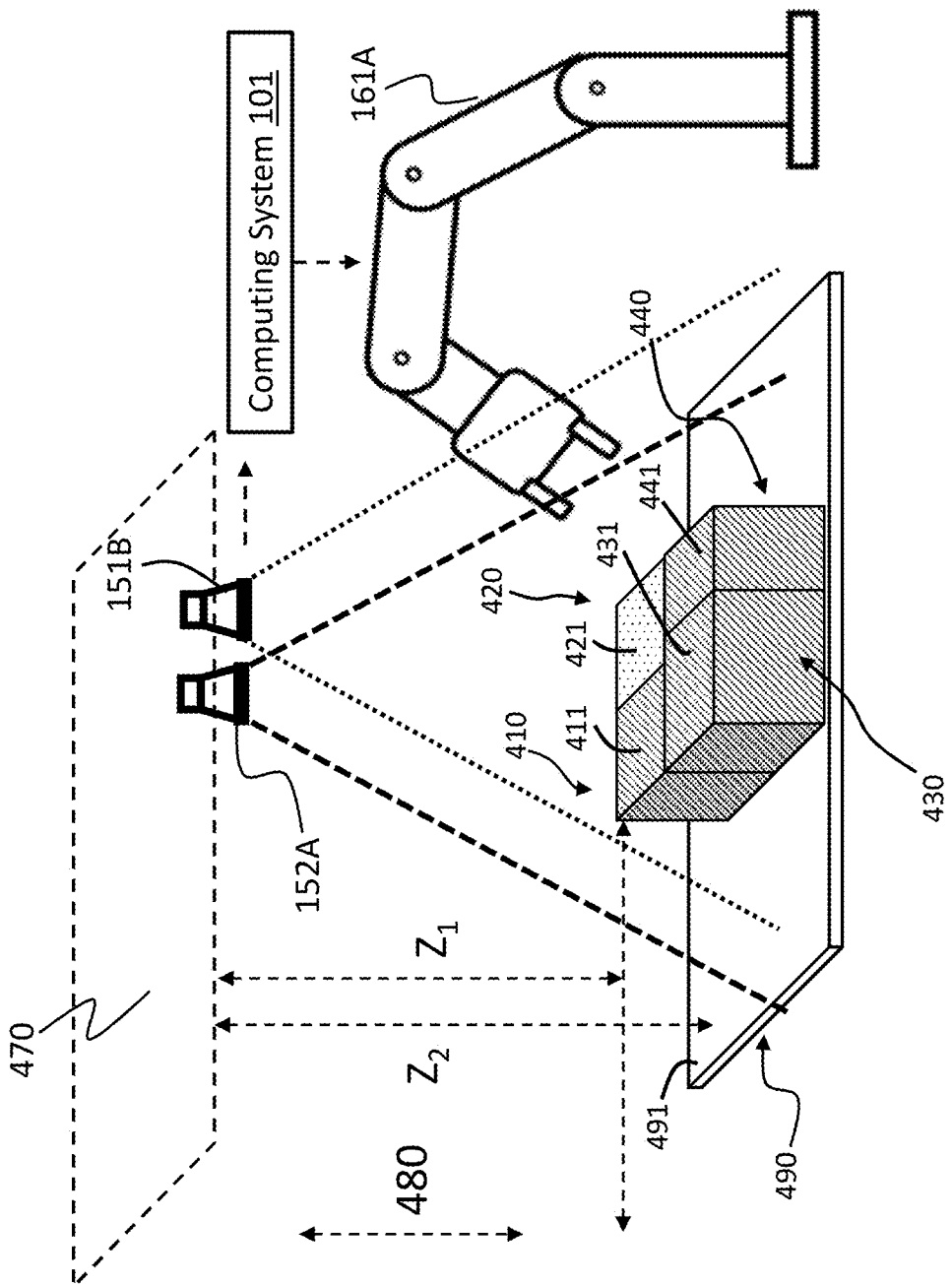
FIG. 4A illustrates an example of a system for processing spatial structure information and 2D image information consistent with an embodiment hereof.

FIGS. 3A and 3B provide a flow chart that illustrates example operations for a method 300 for processing spatial structure information. In one example, method 300 may be part of a procedure in which a robot interacts with a plurality of objects (e.g., a group of boxes or other packages). For instance, FIG. 4A illustrates an embodiment in which spatial structure information is generated for a series of physical objects 410, 420, 430, 440 (also referred to as a series of objects 410-440) disposed on a surface 491 of a platform 490 (e.g., a floor of a warehouse). The objects 410-440 may be, e.g., a group of boxes or other packages to be picked up or otherwise moved by a robot 161A (which may be an embodiment of the robot 161 of FIGS. 1E and 1D).

In an embodiment, the spatial structure information is an informational representation of the structure of the objects 410-440 (which may also be referred to as respective object structures for the objects 410-440). The spatial structure information may be sensed, captured, or otherwise generated by the spatial structure sensing device 151A (e.g., a 3D camera). In some instances, the spatial structure information may describe respective depth values (e.g., relative to the spatial structure sensing device 151A) for a plurality of locations on one or more surfaces (e.g., top surfaces which are facing the camera or otherwise within the field of view of the spatial structure sensing device 151A and/or the 2D image information sensing device 152A) of the objects 410-440, such as surface 411 of the object 410 (also referred to as surface 411 of the object structure for the object 410), surface 421 of the object 420, surface 431 of the object 430, and surface 441 of the object 440 (also referred to as the surfaces 411-441). The spatial structure information is explained in further detail with respect to FIG. 4D-4G.

In an embodiment, the 2D image information sensing device 152A (which may be an embodiment of the 2D image sensing device 152 of FIG. 1A) may be configured to sense, capture, or otherwise generate 2D image information that describes, e.g., an appearance of respective surfaces 411-441 of objects 410-440. As stated above, the 2D image sensing device 152A may be, e.g., a 2D camera. The 2D image information is explained in further detail with respect to FIGS. 4B and 4C.

Figure 4B:
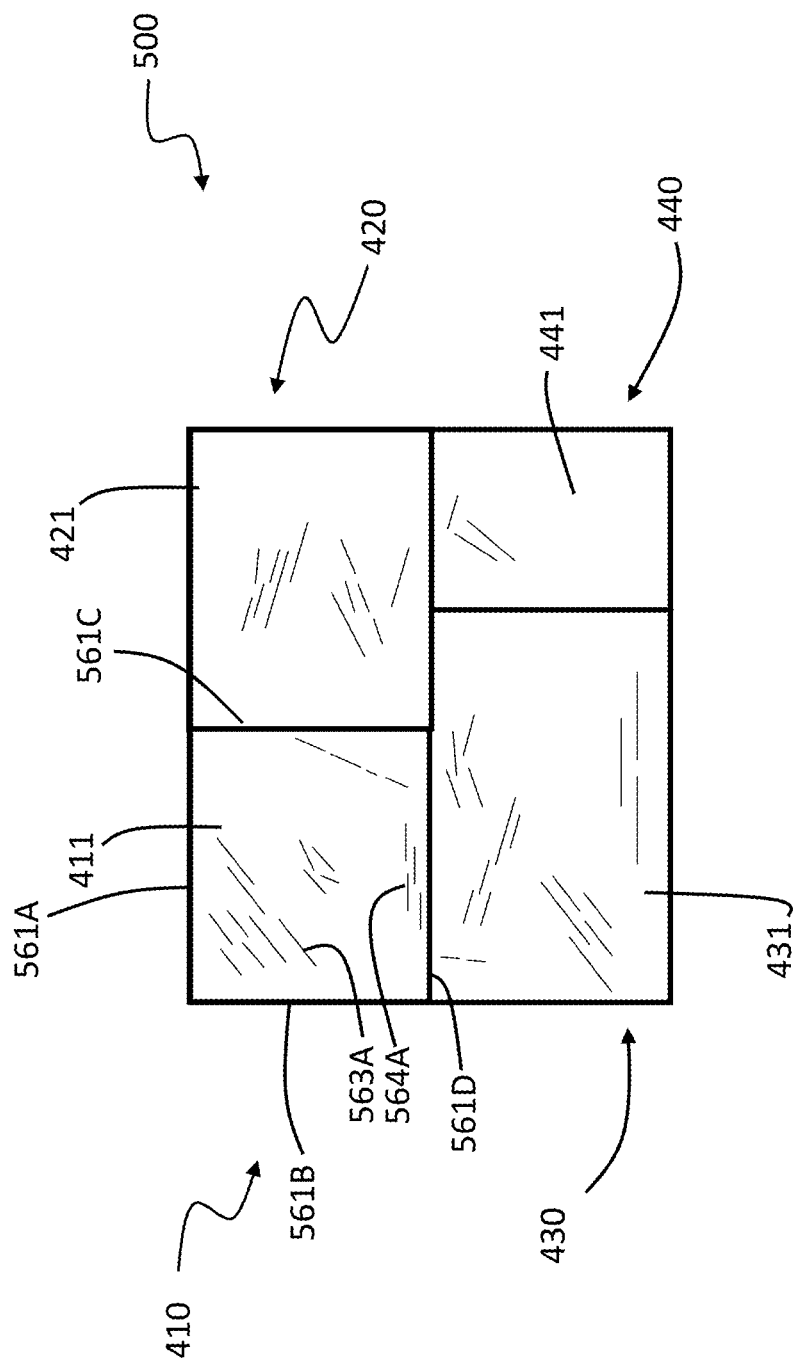
FIGS. 4B-4C illustrate an example of 2D image information consistent with an embodiment hereof.

FIG. 4B illustrates 2D image information 500 that describes or otherwise represents the physical surfaces 411-441 of the physical objects 410-440 of FIG. 4A (also referred to as surfaces 411-441 of the objects 410-440). More particularly, FIG. 4B illustrates a 2D image that forms or is described by the 2D image information 500, wherein the 2D image represents an appearance of the objects 410-440. As depicted in FIG. 4B, the 2D image information 500 includes information about visual features on surfaces of the objects 410-440, such as surfaces 411-441, or more generally about visual features sensed by the 2D image sensing device 152A. The visual features may include, e.g., a visual texture, which may refer to a visual pattern, a visual marking, or other visual detail. The visual texture may also be referred to as a 2D texture. Thus, in some cases, the 2D image information 500 may be referred to as being or including 2D textural information (also referred to as 2D textural data). In embodiments, the 2D image information 500 contains no depth information.

In an embodiment, the visual texture may include or be formed from one or more visual markings printed or otherwise disposed on one or more surfaces 411-441 of the objects 410-440, such as visual markings that form a logo on one of the surfaces 411-441, visual markings that form text on one of the surfaces 411-441, or any other visual markings. In an embodiment, the visual texture may include or be formed from one or more visual markings that are artifacts in the 2D image information 500 caused by image noise. In an embodiment, the visual texture in the 2D image information may represent 3D texture on the one or more surfaces 411-441, such as in an example in which the one of the surfaces 411-441 each has a corrugated structure.

Figure 4C:
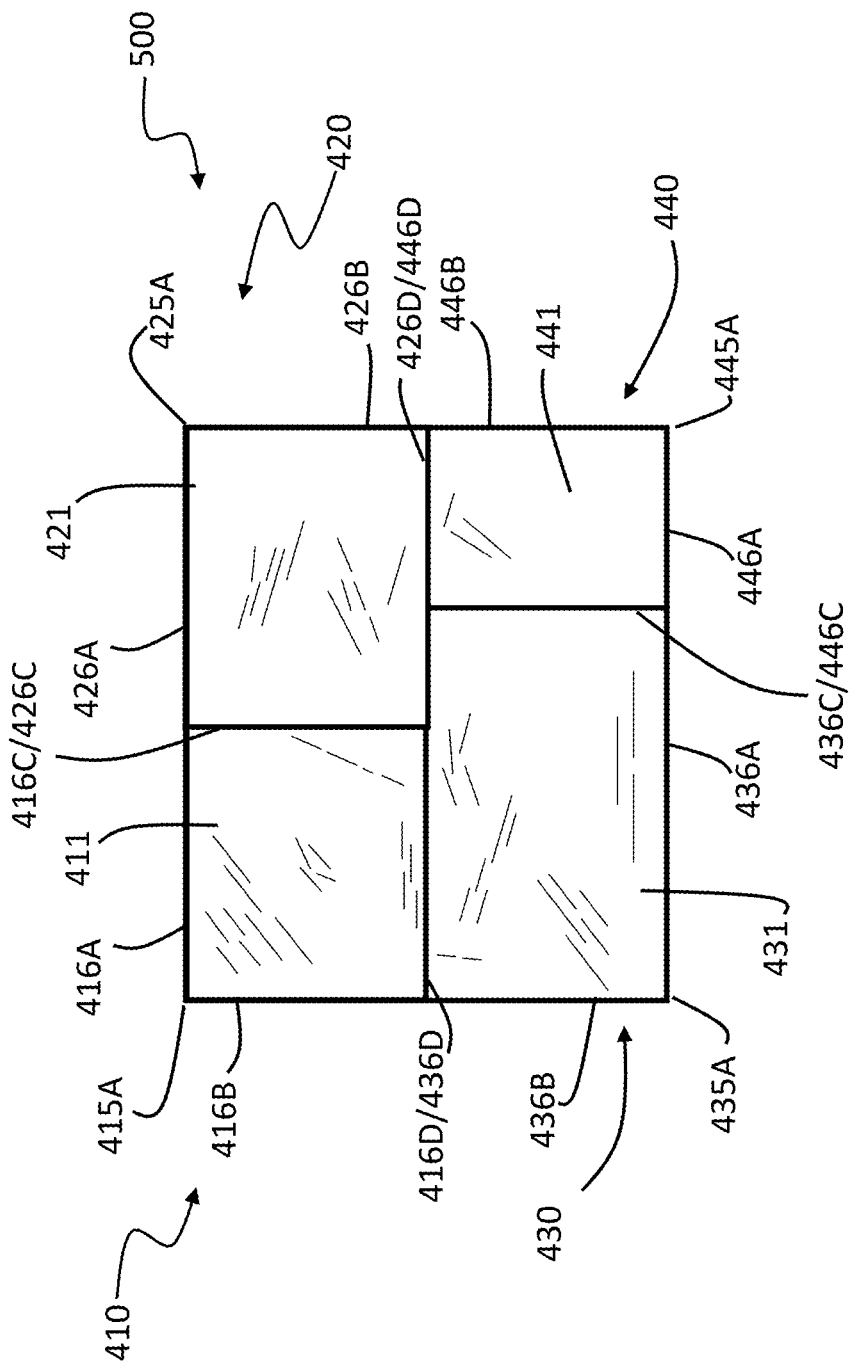

As depicted in FIGS. 4B and 4C, the 2D image information 500 may capture or otherwise represent physical features of the objects 410-440. For instance, the physical features may include one or more physical corners and/or physical edges (also referred to as one or more corners and one or more edges). More particularly, the 2D image information 500 includes portions (e.g., pixels) which capture or otherwise represent a corner 415A of the object 410 (also referred to as a corner of the object structure for the object 410), a corner 425A of the object 420, a corner 435A of the object 430, and a corner 445A of the object 440. The 2D image information 500 further includes portions (e.g., pixels) which capture or otherwise represent edges 416A-416D of the object 410, edges 426A-426D of the object 420, edges 436A-436D of the object 430, and edges 446A-446D of the edge 440. As depicted in FIG. 4C, some of the edges may be an outer edge, while other edges may be an inner edge. For instance, edge 416A and edge 416B may be an outer edge of the object 410, while edges 416C and 416D may be an inner edge of the object 410.

In an embodiment, the 2D image information 500 may further capture or otherwise include candidate edges, such as candidate edges 561A, 561B, 561C, 561D, 563A, and 563B in FIG. 4B. In some cases, a candidate edge may be a visual marking which is consistent with how a physical edge should appear for an object described by the 2D image information 500. That is, the candidate edge may have a property which makes it a candidate or otherwise eligible for being recognized as representing a physical edge of the object. For instance, if the objects 410-440 are known to have straight edges, then a visual marking that forms a straight line in the 2D image information 500 may be a candidate edge. As an example, FIG. 4B depicts candidate edges 561A, 561B, and 561C that represent physical edges 416A, 416B, and 416C of FIG. 4C, respectively, of the object 410. In some cases, the 2D image information 500 may include candidate edges that are false edges. A false edge may be a candidate edge that does not actually represent a physical edge of any object described by the 2D image information. For example, FIG. 4B depicts candidate edges 563A and 564A as examples of false edges appearing in the 2D image information 500. In some cases, candidate edges in the 2D image information 500 may form at least part of its visual texture. As discussed below in more detail, one aspect of the embodiments herein relates to identifying, individually or as a cluster, candidate edges that are likely false edges, and filtering out the false edges, or removing the likely false edges from consideration, so as to improve the chance of correctly identifying, from among the remaining candidate edges, a candidate edge which does actually represent a physical edge of an object. This latter candidate edge may be used to perform segmentation of the spatial structure information 400/400A discussed below and may be referred to as a segmentation edge.

Figure 4D:
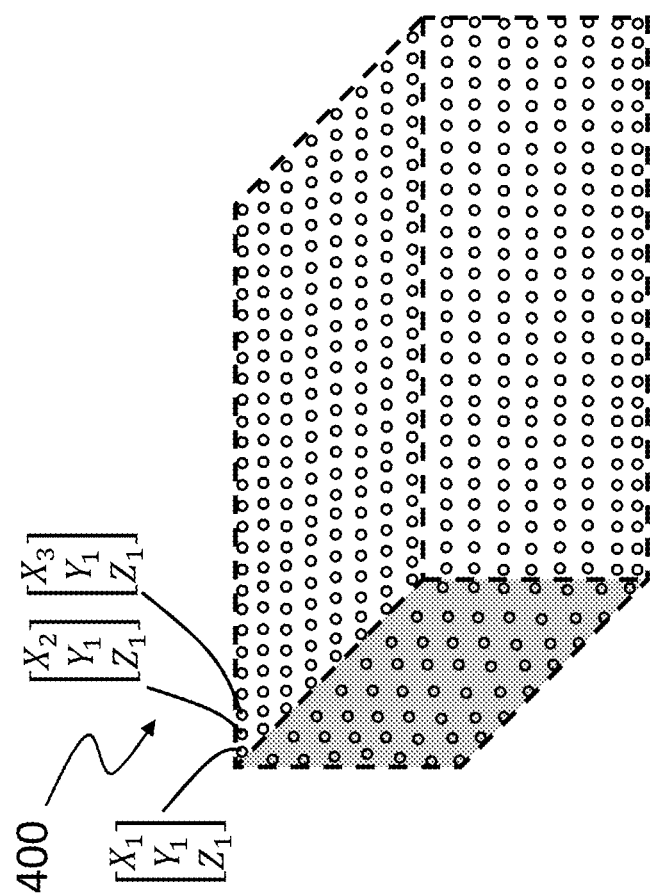

FIG. 4D illustrates an example of spatial structure information 400 that describes respective structures of the physical objects 410-440 of FIG. 4A (also referred to as respective object structures for the objects 410-440). More specifically, the figure illustrates a plurality of physical points (also referred to as points) on one or more of the surfaces 411-441 of FIG. 4A the objects 410-440 that are represented by the spatial structure information 400. A point cloud is one example of spatial structure information 400 consistent with embodiments hereof. In an embodiment, the plurality of points may be locations (also referred to as physical locations) on one or more surfaces (e.g., 411, 421, 431, and 441) of the objects 410-440. For example, the spatial structure information 400 may be a point cloud that includes or otherwise indicates a respective coordinate (e.g., $[X\ Y\ Z]^T$ coordinate) for each of the plurality of points in FIG. 4D. In some cases, one component of the coordinate (e.g., Z-component) for a particular point may represent a depth value of that point relative to the spatial structure sensing device 151/151A. For example, the depth value for a particular point may be a distance, as measured along axis 480 in FIG. 4A, between that point and the spatial structure sensing device 151A. The axis 480 may be, e.g., an optical axis that is orthogonal to an image plane 470 of the spatial structure sensing device 151A. The density of the physical points that are represented by the spatial structure information 400 may be greater or less than what is illustrated in FIG. 4D, depending on a resolution of the spatial structure sensing device 151/151A. For illustrative purposes, FIGS. 4D and 4E depict the spatial structure information 400 is shown with the plurality of points on the surfaces 411-441 and portions of the spatial structure information 400 corresponding to the sides of the objects 410-440 that are perpendicular to the surfaces 411-441 (also referred to as perpendicular surfaces). However, it is understood that spatial structure information 400 may not include the points corresponding to depth measurements on the perpendicular surfaces, such as due to line of sight or field of view for the spatial structure sensing device 151/151A.

As depicted in FIG. 4E, the spatial structure information 400 of FIG. 4D may include a first portion 410A that represents physical points belonging to the first object 410 (or, more specifically, belonging to surfaces of an object structure for the first object 410), a second portion 420A that represents physical points belonging to the second object 420, a third portion 430A that represents physical points belonging to the third object 430, and a fourth portion 440A that represents physical points belonging to the fourth object 440. FIG. 4E further depicts the spatial structure information 400 as representing physical corners 415A, 415B of the object 410 (also referred to as corners 415A, 415B), corner 425A of the object 420, corners 435A, 435B of the object 430, and corners 445A, 445B of the object 440. More particularly, the spatial structure information 400 may include coordinates which are exactly equal to respective locations of the corners (e.g., 415A, 415B, 425A, 435A, 435B, 445A, 445B), or which approximate the respective locations of the corners. In some instances, the spatial structure information 400 may not include complete information about all corners in the objects 410, 420, 430, 440. For example, corners 415B, 435B, and 445B may not be captured accurately due to being obscured from spatial structure sensing device 151A. For example, as illustrated in FIGS. 4D and 4E, the spatial structure information 400 may include a coordinate $[X_1\ Y_1\ Z_1]^T$ which represents the corner 415A. The coordinate may be a closest coordinate, among all coordinates of the spatial structure information 400, to a location of the corner 415A. This coordinate $[X_1\ Y_1\ Z_1]^T$ may be exactly equal to the location of the corner 415A or may be substantially equal to the location of the corner 415A.

FIG. 4E further depicts the spatial structure information 400 as representing the physical edges 416A, 416B, 416E (also referred to as edges 416A, 416B, 416E) of the object 410, edges 426A and 426B of the object 420, edges 436A, 436B of the object 430, and edges 446A, 446B of the object 440. In some instances, the spatial structure information 400 may not include complete information about all physical edges in the objects 410, 420, 430, 440. More particularly, the spatial structure information 400 may include coordinates which fall exactly on the edges (e.g., 416A, 416B, 426A, 426B, 436A, 436B, 446A, 446B), or which fall approximately on the edges. For example, as illustrated in FIGS. 4D and 4E, the spatial structure information 400 may include coordinates $[X_1\ Y_1\ Z_1]^T$, $[X_2\ Y_1\ Z_1]^T$, and $[X_3\ Y_1\ Z_1]^T$ that represent the edge 416A of the object 410. The coordinates may be among the closest coordinates in the spatial structure information 400 to the edge 416A.

Figure 4F:
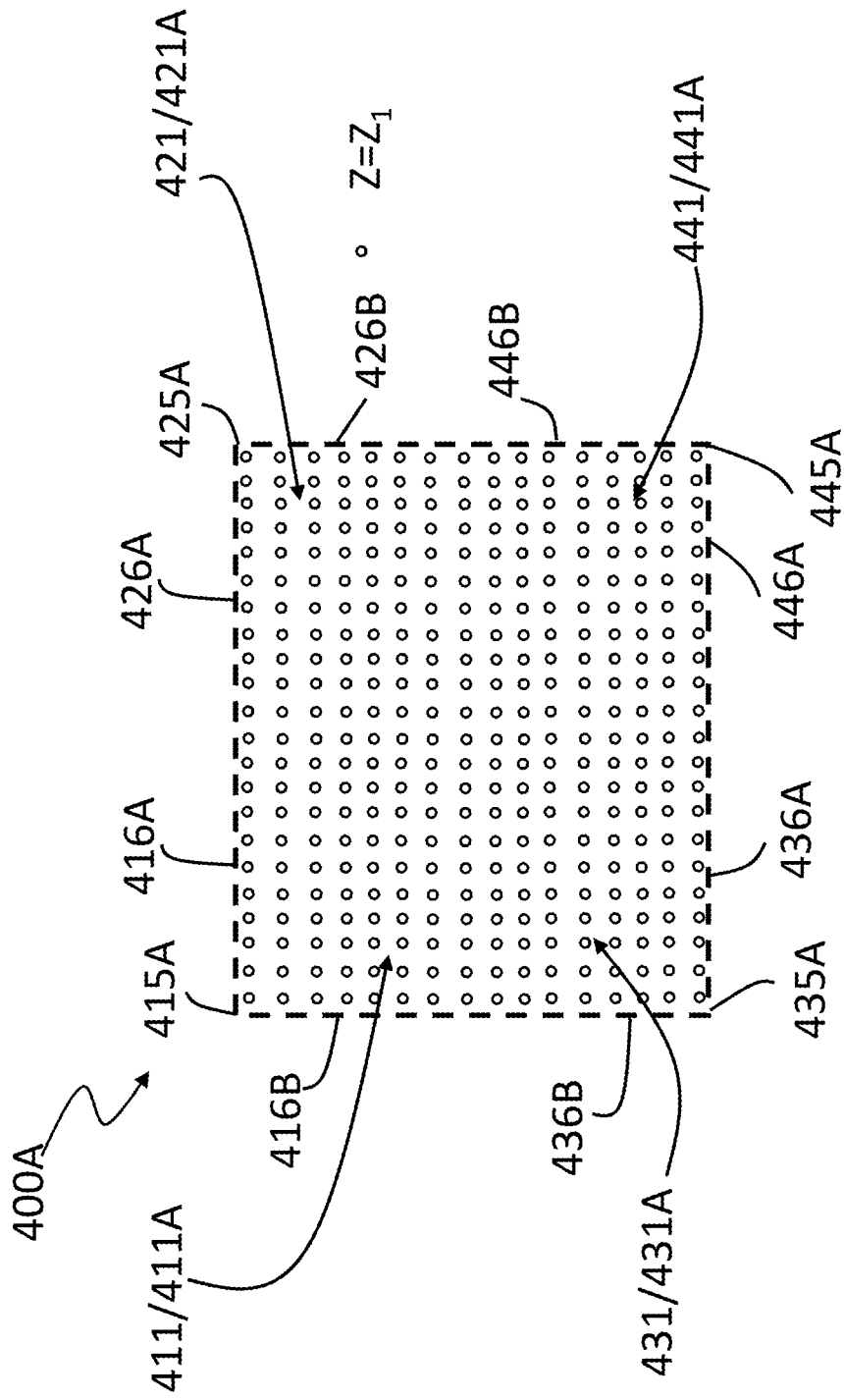
Figure 4G:
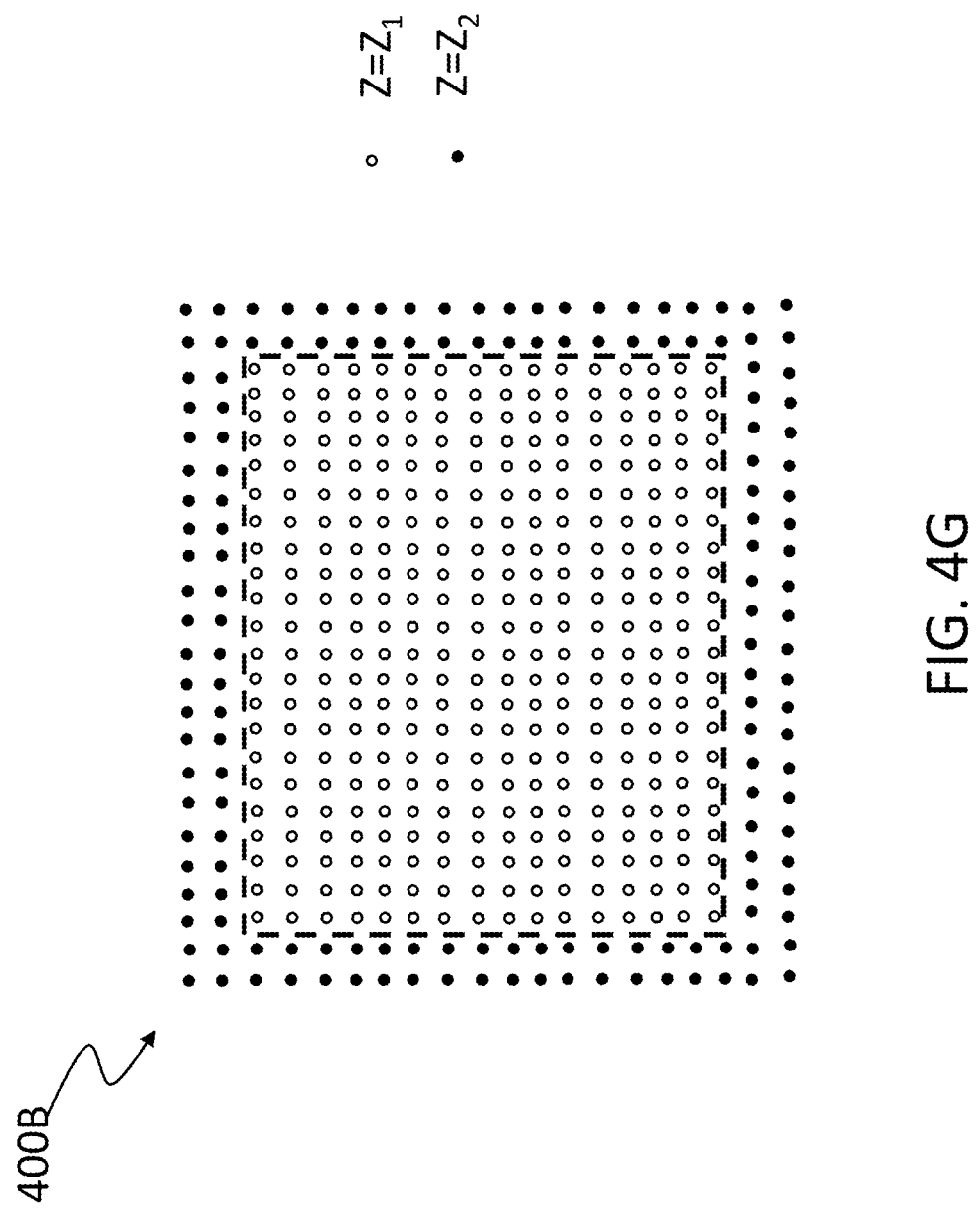

FIG. 4F provides an example of spatial structure information 400A which may represent specifically points that have a same depth value. More particularly, the spatial structure information 400A may represent a plurality of points that are on the surfaces 411-441 (e.g., top surfaces) of the objects 410-440 of FIG. 4A, wherein the plurality of points represented by the spatial structure information 400A may all have a depth value of $Z_1$. As depicted in FIG. 4F, the spatial structure information 400A may include a first portion 411A that represents points on the surface 411 of the object 410, a second portion 421A that represents points on the surface 421 of the object 420, a third portion 431A that represents points on the surface 431 of the object 430, and a fourth portion 441A that represents points on the surface 441 of the object 440. Like the spatial structure information 400 of FIGS. 4D and 4E, the spatial structure information 400A of FIG. 4F may also represent, e.g., corners 415A, 425A, 435A, 445A, and edges 416A, 416B, 426A, 426B, 436A, 436B, 446A, and 446B of the objects 410-440. In some instances, the spatial structure information 400A of FIG. 4F may be a portion of the spatial structure information 400 of FIGS. 4D and 4E and may be extracted from the spatial structure information 400. In some instances, the spatial structure information 400A may be a portion of spatial structure information 400B depicted in FIG. 4G and may be extracted from the spatial structure information 400B. More particularly, the spatial structure information 400B of FIG. 4G may represents points on the surfaces 411-441 of the objects 410-440, and points on the surface 491 of the platform 490 of FIG. 4A. In the example of FIG. 4G, the spatial structure information 400B may indicate a depth value of $Z=Z_1$ for physical points on the surfaces 411-441 for the objects 410-440 and indicate a depth value of $Z=Z_2$ for physical points on the surface 491 of the platform 490.

In an embodiment, the spatial structure information 400/400A may include a depth map, which may have a plurality of pixels [u, v], and wherein some or all of which may have a depth value. Each of the pixels in the depth map may correspond to a respective physical point (also referred to as physical location) captured or otherwise represented by the pixel, and the depth value may indicate a distance from the spatial structure sensing device (e.g., 151A of FIG. 4A) and the particular physical point. The physical point may be on, e.g., the one or more surfaces 411-441 of the objects 410-440. In some cases, the distance may be measured along the axis 480. In some cases, the depth value assigned to a pixel [u, v] may represent a Z-component of coordinate of the corresponding physical point. For instance, the spatial structure sensing device 151A may be a depth-sensing camera. In such an instance, a particular pixel [u, v] in the depth map may correspond to a physical point on the surfaces 411-440 of the objects 410-440, or on the surface 491 of the platform 490, wherein the physical point has a coordinate $[X, Y, Z]^T$. The X-component and Y-component of the coordinate may be based on an inverse projection matrix of the depth-sensing camera, and the Z-component of the coordinate may be equal to or otherwise based on the depth value assigned to the pixel [u v] (the coordinate $[X\ Y\ Z]^T$ may be in a reference frame (e.g., coordinate system) of the depth-sensing camera).

In an embodiment, the spatial structure information 400 may include a point cloud. As stated above, the point cloud may include a plurality of coordinates that identify a plurality of points on an object structure, or more specifically on a surface of an object structure, such as the surface 411 on an object structure for the object 410. In an embodiment, if the spatial structure information 400 includes the point cloud, it may in some scenarios be generated (e.g., by the spatial structure sensing device 151 or computing system 101 of FIGS. 1A-2C) based on the depth map discussed above.

Returning to FIGS. 3A and 3B, the method may be performed by the computing system 101 of FIGS. 2A through 2C, and more specifically by the processing circuit 110, when spatial structure information (e.g., 400) describing respective object structures of one or more objects is stored on a non-transitory computer-readable medium 120 of the computing system 101, and when 2D image information (e.g., 500) describing the one or more objects is stored in the non-transitory computer-readable medium (e.g., 120) of the computing system 101. The respective object structures for the one or more objects may also be referred to as respective structures of the one or more objects. In an embodiment, the non-transitory computer-readable medium 120 of FIGS. 2A through 2C may further store a plurality of instructions (e.g., computer program instructions) that, when executed by the processing circuit 110, causes the processing circuit 110 to execute the method 300.

In an embodiment, method 300 of FIGS. 3A and 3B includes an operation 302, in which the processing circuit 110 of the computing system 101 (of FIGS. 2A-2C) accesses spatial structure information (e.g., 400/400A of FIGS. 4D-4F), which describes structure of an object (also referred to as object structure). In some cases, the operation 302 may be performed by the data manger 202 FIG. 2C. In an embodiment, accessing the spatial structure information (e.g., 400/400A) may involve retrieving (or, more generally, receiving) the spatial structure information (e.g., 400/400A) from the non-transitory computer-readable medium 120 or from any other device. In some situations, the spatial structure information (e.g., 400/400A) may have been generated by the spatial structure sensing device 151/151A and received by the computing system 101 from the spatial structure sensing device 151/151A, such as via the communication interface 130 of FIG. 2B, and may have been stored in the non-transitory computer-readable medium 120, which may provide a temporary buffer or long-term storage for the spatial structure information. For instance, the spatial structure information (e.g., 400/400A) may include a point cloud received from the spatial structure sensing device 151 and stored in the non-transitory computer-readable medium 120. The point cloud may then be accessed by the processing circuit 110 in the operation 302.

In some situations, the spatial structure information (e.g., 400/400A) that is accessed may be stored in the non-transitory computer-readable medium 120 and may have been generated beforehand by the processing circuit 110 itself based on information received from the spatial structure sensing device 151/151A. For instance, the processing circuit 110 may be configured to generate a point cloud based on raw sensor data received from the spatial structure sensing device 151/151A and may be configured to store the generated point cloud in the non-transitory computer-readable medium 120. The point cloud may then be accessed by the processing circuit 110 in operation 302 (e.g., by retrieving the data from the non-transitory computer-readable medium 120).

Referring back to FIGS. 3A and 3B, the method 300 may further include an operation 304 in which the processing circuit 110 of the computing system 101 identifies, based on the spatial structure information (e.g., 400/400A), a 3D location that represents a corner of an object structure, which may be a structure of an object (e.g., 410/420/430/440) represented by the spatial structure information. The 3D location that represents the corner may also be referred to as a 3D corner location, or a 3D object corner. For instance, referring now to FIGS. 5A and 5B, the processing circuit 110 in operation 304 may identify, based on the spatial structure information 400/400A, a first 3D location 405A that represents the corner 415A of the object 410, a second 3D location 405B that represents the corner 425A of the object 420, a third 3D location 405C that represents the corner 435A of the object 430, and a fourth 3D location 405D that represents the corner 445A of the object 440 (which may also be collectively referred to as 3D locations 405A-405D).

Figure 5A:
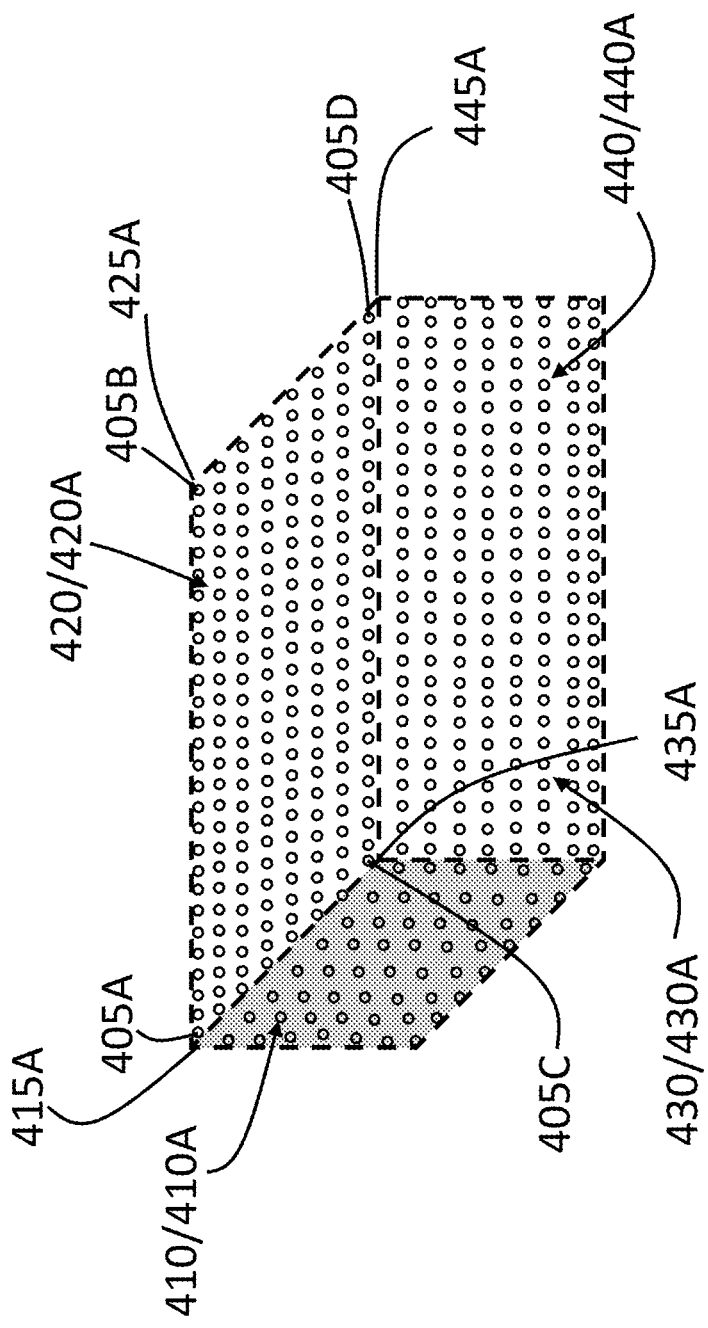
FIGS. 5A-5E illustrate examples of spatial structure information consistent with embodiments hereof.
Figure 5B:
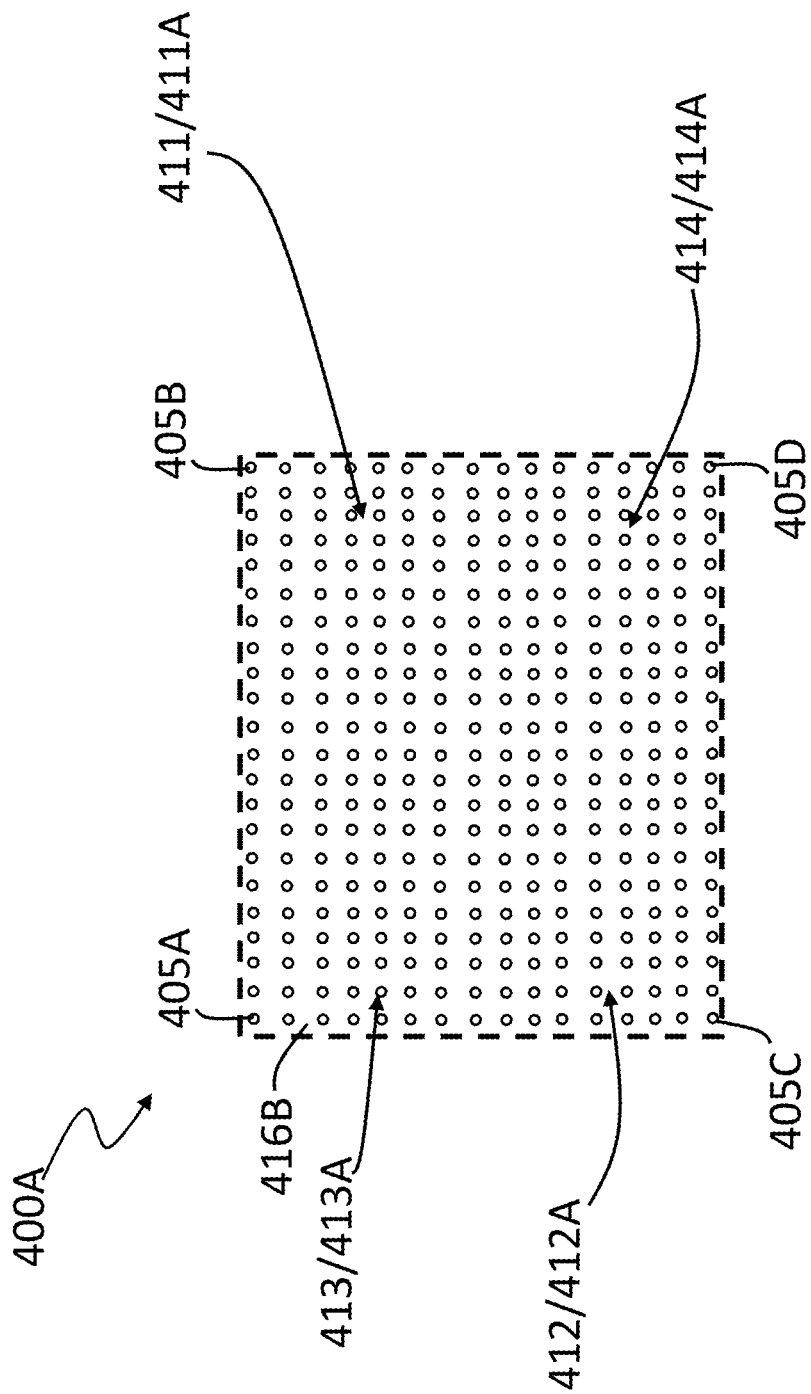

In the example of FIGS. 5A and 5B, each of the 3D locations 405A-405D may be described by a 3D coordinate, such as a $[X\ Y\ Z]^T$ coordinate. For example, the 3D location 405A in FIGS. 5A and 5B may have a 3D coordinate of $[X_1\ Y_1\ Z_1]^T$, as depicted in FIG. 4D. In some cases, the 3D coordinate for a 3D location (e.g., 405A) may be expressed relative to a reference frame (e.g., coordinate system) of the spatial structure information 400/400A, which may also be a reference frame of the spatial structure sensing device 152/152A. In an embodiment, a 3D location (e.g., 405A) that is determined from the spatial structure information 400/400A and that represents a corresponding physical corner of an object (e.g., physical corner 415A) may identify exactly where the physical corner is located, or may approximate where the physical corner is located. For instance, the 3D coordinate $[X_1\ Y_1\ Z_1]^T$ of the 3D location 405A may represent an exact location of the physical corner 415A of the object structure for the object 410 or may approximate where the physical corner 415A is located. In some instances, the 3D location (e.g., 405A) may be a location that which, among other locations described in the spatial structure information 400/400A, is closest to a corresponding physical corner (e.g., 415A). The 3D locations, which may also be referred to as 3D object corners (e.g., 405A-405D) may be identified from the spatial structure information (e.g., 400/400A) by any suitable means. For example, in an embodiment, a 3D location that represents a corner of an object structure may be identified according to an analysis of a plurality of vertices identified from among the layers in the spatial structure information, as described in U.S. patent application Ser. No. 16/578,900, filed on Sep. 23, 2019, and incorporated herein by reference in its entirety. For example, the 3D location determined in operation 304 may be a location of a convex corner, as discussed in U.S. patent application Ser. No. 16/578,900. In an embodiment, the 3D location (e.g., 405A) may be a corner of a contour for points (e.g., locations) described by the spatial structure information (e.g., 400/400A).

Figure 5C:
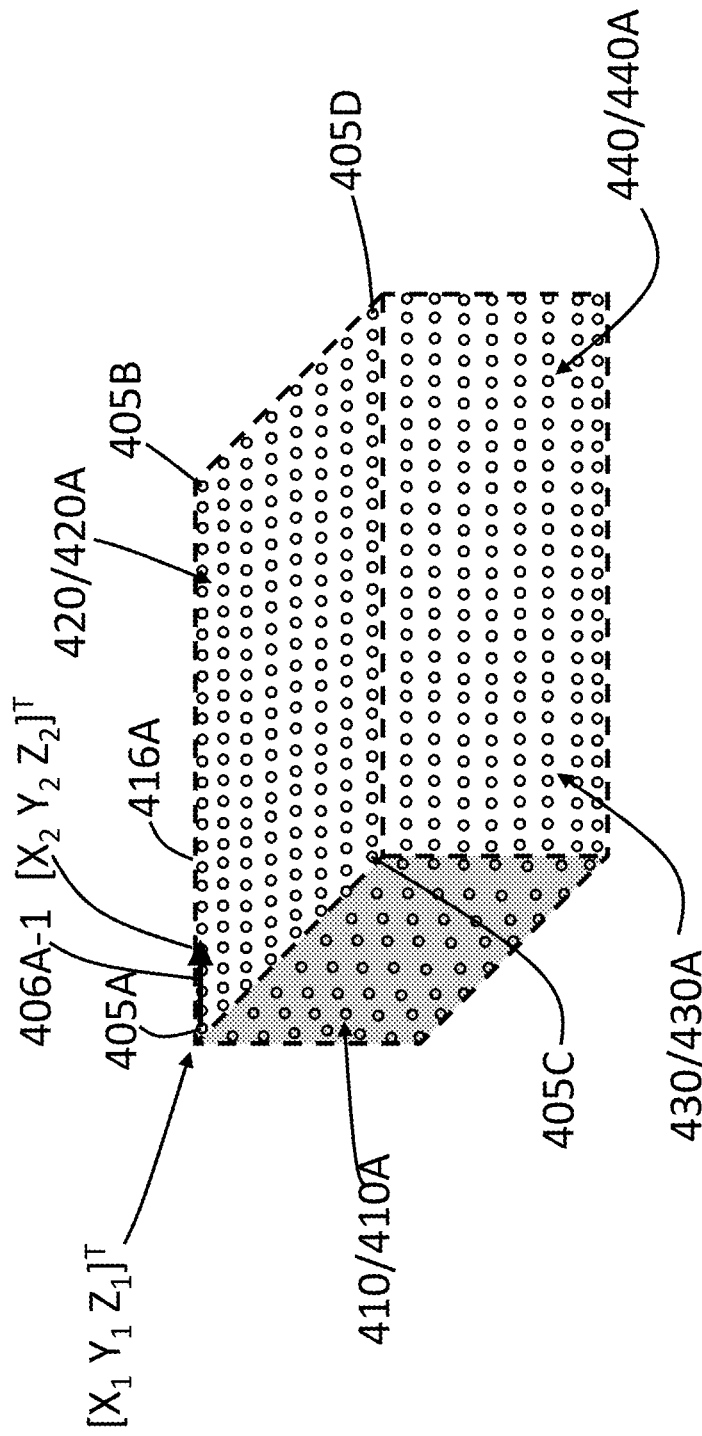
Figure 5D:
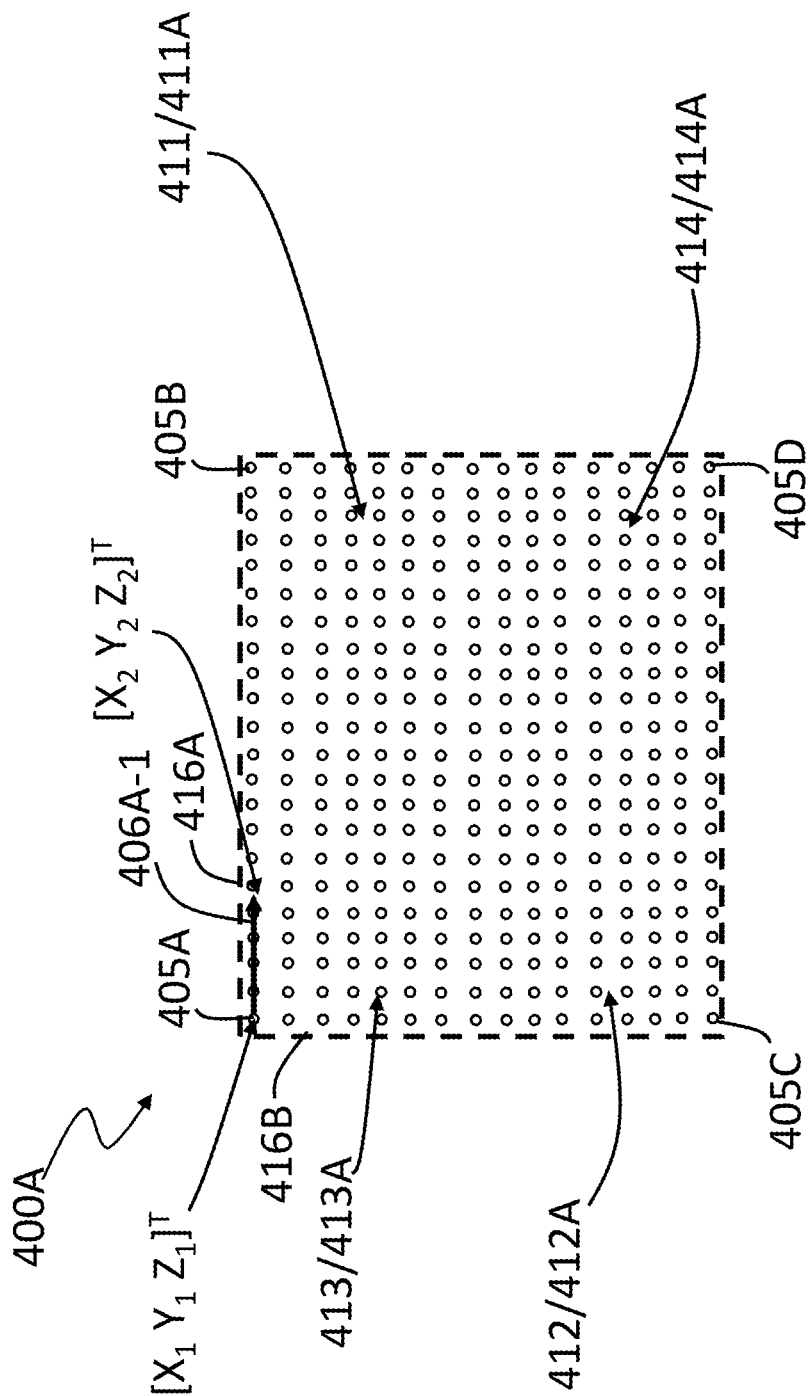

Referring back to FIGS. 3A and 3B, the method 300 may further include an operation 306 in which the processing circuit 110 of the computing system 101 identifies, based on the spatial structure information (e.g., 400/400A), a 3D vector that extends from the 3D location and is parallel with a physical edge of an object structure (also referred to as edge of the object structure). More particularly, the 3D location may represent a corner of a structure of an object, and the 3D vector may be parallel with an edge of the object. The 3D vector may represent the edge, and thus may be referred to as a 3D edge or 3D object edge. For example, FIGS. 5C and 5D depict an example in which the processing circuit 110 identifies a 3D vector 406A-1 that extends from the 3D location 405A and is parallel with the edge 416A of the object 410. In some cases, the 3D vector may be defined by at least two 3D coordinates (e.g., exactly two 3D coordinates). For example, the 3D vector 406A-1 may be defined by $[X_1\ Y_1\ Z_1]^T$ and $[X_2\ Y_2\ Z_2]^T$. The 3D vector (e.g., 406A-1) may indicate, e.g., an orientation. In some cases, the 3D vector may further indicate directionality (e.g., from $[X_1\ Y_1\ Z_1]^T$ to $[X_2\ Y_2\ Z_2]^T$) and/or magnitude (e.g., a magnitude defined by a distance between $[X_1\ Y_1\ Z_1]^T$ to $[X_2\ Y_2\ Z_2]^T$). In some cases, the 3D vector 406A-1 may be used to define a line having a particular orientation and/or location, and may have no indication of directionality, and/or no indication of magnitude.

In an embodiment, the 3D vector 406A-1 may include points (e.g., locations) that are on an outermost periphery of points described by the spatial structure information 400/400A. For example, the coordinates $[X_1\ Y_1\ Z_1]^T$ and $[X_2\ Y_2\ Z_2]^T$ that form the 3D vector 406A-1 may belong to points that form an outermost periphery of all the points described by the spatial structure information 400/400A, and thus represent an edge of the points described by the spatial structure information 400/400A. In some cases, the 3D vector (e.g., 406A-1) may fall exactly on the edge (e.g., 416A) that it represents, and thus indicate exactly where the edge is located, or may approximate where the edge is located. Further, the 3D vector (e.g., 406A-1) may indicate an orientation of the edge (e.g., 416A), which may also be referred to as a 3D edge orientation.

Figure 5E:
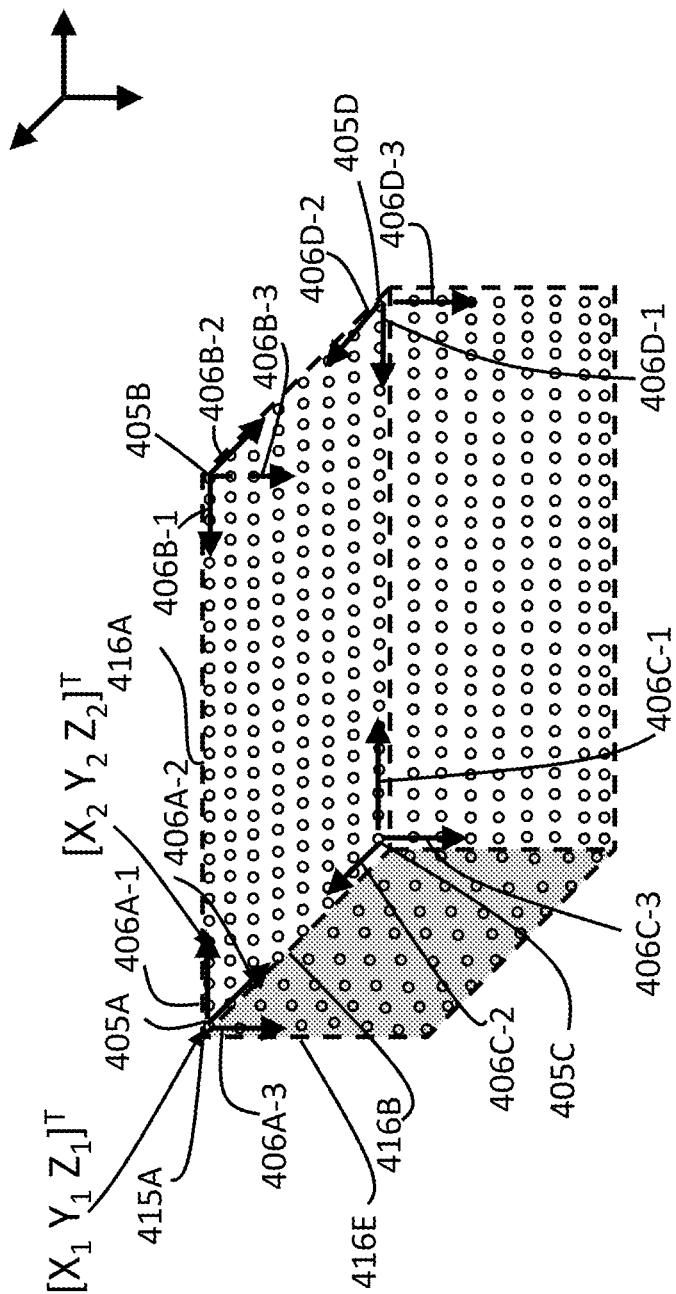

In an embodiment, determining the 3D vector (e.g., 406A-1) may be part of determining a 3D corner orientation. The 3D corner orientation may refer to an orientation (e.g., direction) of a physical corner represented by a 3D location, and/or of a shape of an object forming the corner. In some cases, the 3D corner orientation may be defined by multiple vectors. More particularly, a physical corner may be an intersection of two or more physical edges. For example, FIG. 5E depicts the corner 415A of object 410 as being an intersection of edges 416A and 416B, or of edges 416A, 416B, and 416E. In this example, a 3D location 405A representing the physical corner 415A may be represented by a plurality of 3D vectors, such as vectors 406A-1 and 406A-2, or by vectors 406A-1, 406A-2, and 406A-3 in FIG. 5E. The vector 406A-1 may be parallel with edge 416A, as discussed above, while vector 406A-2 may be parallel with edge 416B, and vector 406A-3 may be parallel with edge 416E. Further, the vectors 406A-1, 406A-2, and 406A-3 may point away from the 3D location 405A representing the corner 415A, in respective directions that correspond with the corresponding edges 416A, 416B, 416E. In an embodiment, the vectors 406A-1, 406A-2, and 406A-3 may point inward, toward other points represented by the spatial structure information 400. In this example, a 3D corner orientation of the corner 415A represented by the 3D location 405A may be defined by at least two of the 3D vectors 406A-1, 406A-2, 406A-3. For instance, the 3D corner orientation may be defined by all three of the vectors. If the three vectors 406A-1, 406A-2, 406A-3 are orthogonal, the resulting 3D location may represent a square corner.

In an embodiment, the control circuit 110 may perform operations 304 and 306 multiple times to identify multiple 3D locations that represent respective corners of one or more objects, or more specifically respective corners of one or more object structures. For instance, as illustrated in FIGS. 5E and 4E, the control circuit 110 may identify the 3D location 405B that represents the corner 425A of the object 420, the 3D location 405C that represents the corner 435 of the object 430, and/or the 3D location 405D that represents the corner 445A of the object 440. In some instances, the control circuit 110 may further identify a 3D corner orientation for each of the corners. For example, the control circuit 110 may identify 3D vectors 406B-1 through 406B-3, which define a 3D corner orientation for the corner 425A represented by the 3D location 405B. It may also identify 3D vectors 406C-1 through 406C-3, which may define a 3D corner orientation for the corner 435A represented by the 3D location 405C. The control circuit 110 may further identify 3D vectors 406D-1 through 406D-3, which may define a 3D corner orientation for the corner 445A represented by the 3D location 405D.

In an embodiment, the 3D vectors (e.g., 406A-1 through 406A-3) discussed above may represent corresponding physical edges (e.g., 416A, 416B, 416E), and may be referred to as 3D edges or 3D object edges. As stated above, the 3D vectors may indicate an exact location of their corresponding physical edges or may approximate a location of their corresponding physical edges.

Referring back to FIGS. 3A and 3B, the method 300 may further include an operation 308 in which the processing circuit 110 of the computing system 101 obtains, accesses, or otherwise receives 2D image information (e.g., 2D image information 500). As stated above, 2D image information 500 may include information detected from visual features on object surfaces (e.g., surfaces 411-441 of objects 410-440). The visual feature may include a visual texture, which may be formed from a visual pattern, a visual marking, or other visual detail. In an embodiment, the 2D image information may include or otherwise describe candidate edges, which may be formed from, e.g., some or all of the visual markings, as discussed above. In some cases, operation 308 may be performed by the data manger 202 of FIG. 2C. In an embodiment, obtaining or accessing the 2D image information 500 may involve retrieving (or, more generally, receiving) the 2D image information 500 from the non-transitory computer-readable medium 120 of FIGS. 2A-2C or from any other device. In some situations, the 2D image information 500 may have been received by the computing system 101 from the 2D image sensing device 152/152B of FIGS. 1A-1F, such as via the communication interface 130 of FIG. 2B, and may have been stored in the non-transitory computer-readable medium 120, which may provide a temporary buffer or long-term storage for the 2D image information. For instance, the 2D image information 500 may include an image storing pattern, texture, and other visual information received from the 2D image sensing device 152 and stored in the non-transitory computer-readable medium 120. The 2D image information may then be accessed by the processing circuit 110 in operation 308.

In some situations, the 2D image information that is accessed may be stored in the non-transitory computer-readable medium 120 and may have been generated beforehand by the processing circuit 110 itself based on information received from the 2D image sensing device 152. For instance, the processing circuit 110 may be configured to generate a 2D image based on raw sensor data received from the 2D image sensing device 152 and may be configured to store the generated 2D image in the non-transitory computer-readable medium 120. The 2D image may then be accessed by the processing circuit 110 in subsequent operations (e.g., by retrieving the data from the non-transitory computer-readable medium 120).

Referring back to FIGS. 3A and 3B, the method 300 may further include an operation 310 in which the processing circuit 110 of the computing system 101 determines a 2D location within the 2D image information (e.g., 500) that corresponds to the 3D location of the object of the step 304. In some cases, the 2D location may be a projection of the 3D location of step 304, as discussed below in more detail, and may be referred to as a projected 2D corner. In some cases, the 2D location may include or may be defined by a 2D coordinate, such as a pixel coordinate $[u\ v]^T$ within the 2D image information. In such cases, the 2D image information may be or may include a plurality of pixels that form a 2D image. As an example, referring now to FIG. 5F, the processing circuit 110 may identify a 2D location 505A which corresponds to the 3D location 405A of FIGS. 5A through 5D. The 2D location 505A may also represent a corner 415A of the object 410. More particularly, the 2D location 505A may indicate exactly where the corner 415A is located or may approximate where the corner 415A is located.

In an embodiment, the 2D location 505A may be determined by projecting the 3D location 405A from a reference frame of the spatial structure information 400/400A (which may be referred to as 3D space) to a reference frame of the 2D image information 500 (which may be referred to as 2D space). In some instances, the reference frame of the spatial structure information 400/400A may be, e.g., a 3D physical coordinate system defined relative to the spatial structure sensing device 151/151A, and the reference frame of the 2D image information 500 may be, e.g., a pixel coordinate system defined relative to the 2D image sensing device 152/152A. As an example, the projecting operation may be based on a spatial relationship (e.g., relative location and/or relative orientation) between the spatial structure sensing device 151/151A and the 2D image sensing device 152/152A, and based on a projection matrix of the 2D image sensing device 152/152A. The spatial relationship may be represented by a transformation function (e.g., a matrix) that is configured to convert a 3D coordinate (e.g., $[X\ Y\ Z]^T$) which expresses the 3D location 405A in a 3D coordinate system of the spatial structure sensing device 151/151A to another 3D coordinate (e.g., $[X'\ Y'\ Z']^T$) which expresses the same 3D location 405A in a 3D coordinate system of the 2D image sensing device 152/152A. More particularly, the conversion may be expressed as:

$$\begin{bmatrix} X' \\ Y' \\ Z' \\ 1 \end{bmatrix} = T_{152}^{151} \begin{bmatrix} X \\ Y \\ Z \\ 1 \end{bmatrix} \quad \text{(Equation 1)}$$

In this example, $T_{152}^{151}$ may be the transformation function, and more specifically may be a matrix that describes the spatial relationship (e.g., relative location and/or relative orientation) between the spatial structure sensing device 151/151A and the 2D image sensing device 152/152A. In some cases, the transformation function may be stored in the non-transitory computer-readable medium 120, and may have been manually determined, or determined via, e.g., a stereo calibration operation.

In the above example, the processing circuit 110 may be configured to determine a pixel coordinate $[u\ v]^T$ that defines the 2D location 505A based on a projection matrix of the 2D image sensing device 152/152A. The determination may be expressed as:

$$\begin{bmatrix} u \\ v \\ 1 \end{bmatrix} = K \begin{bmatrix} X'/Z' \\ Y'/Z' \\ 1 \end{bmatrix} \quad \text{(Equation 2)}$$

Figure 5F:
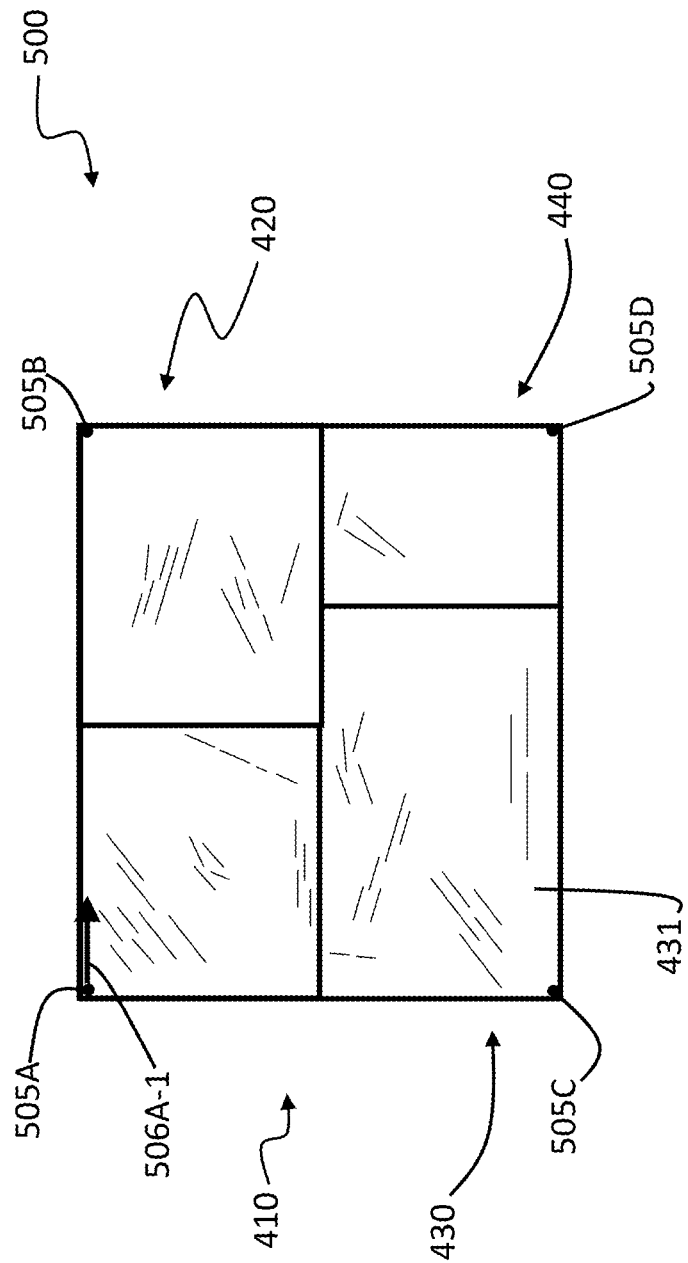
FIGS. 5F-5G illustrate examples of 2D image information consistent with embodiments hereof.

In the above example, K may be a projection matrix of the 2D image sensing device 152/152A. The projection matrix may be, e.g., stored in the non-transitory computer-readable medium 120, and may have been determined from a camera calibration operation. In some cases, determining the pixel coordinate may further take into account any lens distortion introduced by the 2D image sensing device 152/152A. In an embodiment, the control circuit 110 may perform operation 310 multiple times, so as to identify multiple 2D locations that correspond to multiple 3D locations. For instance, as depicted in FIG. 5F, the control circuit 110 may identify 2D location 505B, which corresponds to a 3D location 405B that represents the corner 425A of the object 420. The control circuit 110 may also identify 2D locations 505C/505D, which correspond to 3D locations 405C/405D that represent corners 435A/445A of the objects 430/440.

Referring back to FIGS. 3A and 3B, the method 300 may further include an operation 312 in which the processing circuit 110 of the computing system 101 determines a 2D vector that corresponds to the 3D vector of operation 306. In an embodiment, the 2D vector may be a projection of the 3D vector, as discussed below in more detail, and thus may be referred to as a projected 2D edge or projected 2D object edge. As an example, referring to FIG. 5F, the processing circuit 110 may identify a 2D vector 506A-1 that corresponds to the 3D vector 406A-1 of FIGS. 5C-5E. In an embodiment, the 2D vector 506A-1 may be defined by at least two 2D coordinates (e.g., exactly two 2D coordinates), such as at least two pixel coordinates $[u_1\ v_1]^T$ and $[u_2\ v_2]^T$. The 2D vector 506A-1 may indicate, e.g., an orientation. In some cases, the 2D vector 506A-1 may further indicate directionality (e.g., from $[u_1\ v_1]^T$ to $[u_2\ v_2]^T$) and/or magnitude (e.g., a magnitude defined by a distance between $[u_1\ v_1]^T$ to $[u_2\ v_2]^T$). In some cases, the 2D vector 506A-1 may be used to define a line having a particular orientation and/or location, and may have no indication or directionality, and/or no indication of magnitude.

In an embodiment, the processing circuit 110 may identify the 2D vector 506A-1 by projecting the 3D vector 406A-1 from a reference frame of the spatial structure information 400/400A to a reference frame of the 2D image information 500, as discussed above. For example, the projecting operation may involve projecting the 3D coordinates $[X_1\ Y_1\ Z_1]^T$ and $[X_2\ Y_2\ Z_2]^T$, which partially or completely define the 3D vector 406A-1, to obtain 2D pixel coordinates $[u_1\ v_1]^T$ and $[u_2\ v_2]^T$, respectively. The projecting operation may be similar to or the same as that described above with respect to determining a 2D location in step 310. In an embodiment, the 2D vector 506A-1 may be defined at least in part by the two 2D pixel coordinates. In some cases, the 2D vector 506A-1 may represent an orientation of a projection of the 3D vector 406A-1, which may also be referred to as a projected edge orientation or projected 2D edge orientation.

Figure 5G:
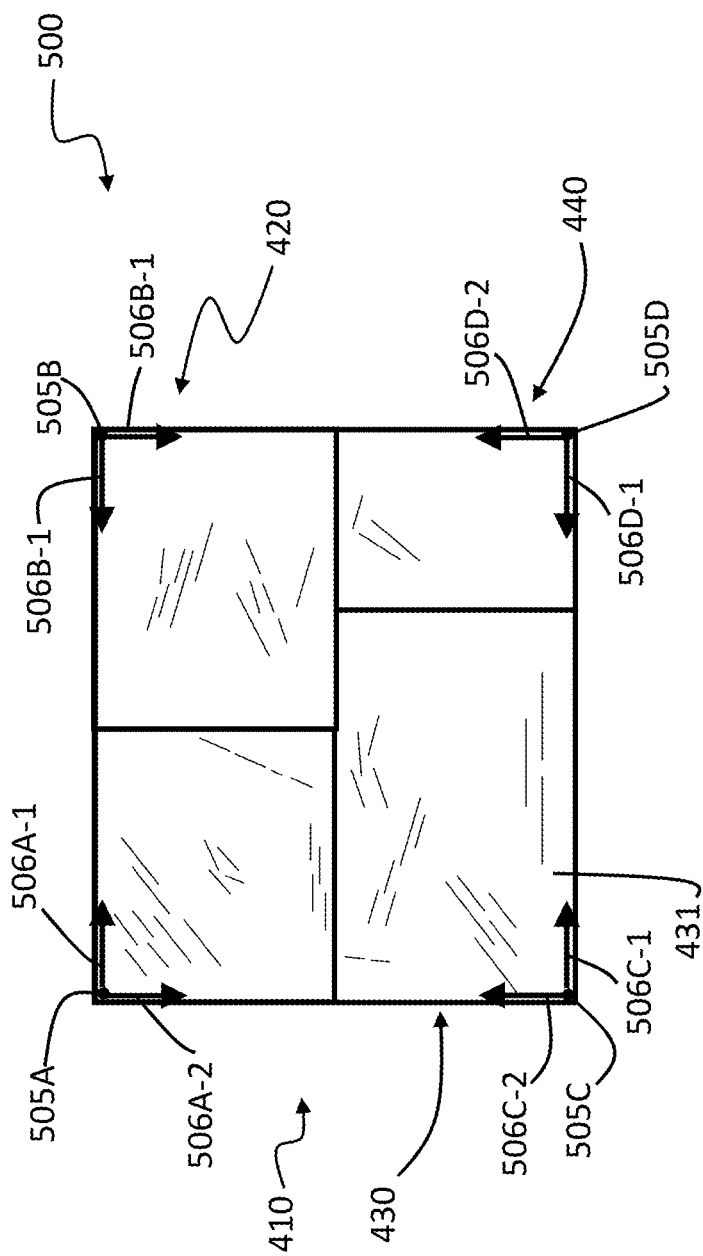

In an embodiment, determining the 2D vector 506A-1 may be part of determining a 2D corner orientation for a corner represented by the 2D location of step 310 and/or the 3D location of step 304. In some cases, the 2D corner orientation may be a projection of the 3D corner orientation, from a reference frame of the spatial structure information 400/400A to a reference frame of the 2D image information 500. As stated above, the 3D corner orientation for a corner represented by a 3D location (e.g., 405A) may refer to, e.g., an orientation of an object structure with respect to the corner, and may be defined by multiple vectors (e.g., 406A-1, 406A-2, 406A-3). In an embodiment, the 2D corner orientation for a corner (e.g., 415A) represented by a 2D location (e.g., 505A) may refer to how a surface of an object (e.g., surface 411 for object 410) is oriented with respect to the corner. In some instances, a 2D corner orientation may be defined by two or more 2D vectors. For example, as illustrated by FIGS. 4C and 5G, a 2D corner orientation for the corner 415A of the object 410 (as depicted in FIG. 4C), which is represented by 2D location 505A, may be defined by vectors 506A-1 and 506A-2 (as depicted in FIG. 5G). Further in this example, a 2D corner orientation for the corner 425A of object 420, which is represented by the 2D location 505B, may be defined by vectors 506B-1 and 506B-2. A 2D corner orientation for the corner 435A of object 430, which is represented by the 2D location 505C, may be defined by the vectors 506C-1 and 506C-2. A 2D corner orientation for the corner 445A of the object 440, which is represented by the 2D location 505D, may be defined by the vectors 506D-1 and 506D-2. For convenience purposes, the object structures for the objects 410-440 may be referred to as extending inward from the corners 415A-445A, and the 2D vectors (e.g., 506A-1, 506A-2 through 506D-1, 506D-2) may also be referred to as extending inward.

In an embodiment, the processing circuit 110 may be configured to project the 3D corner orientation discussed above to obtain the 2D corner orientation by projecting one or more of the 3D vectors which define the 3D corner orientation to determine one or more respective 2D vectors which will define the 2D corner orientation. For instance, as depicted in FIGS. 5E and 5G, the processing circuit may determine a 2D orientation for a corner 415A represented by the 2D location 505A by projecting at least two 3D vectors (e.g., 406A-1 and 406A-2) which define a 3D corner orientation for that corner. The projecting operation may yield two respective 2D vectors (e.g., 506A-1 and 506A-2) which define a 2D corner orientation of the corner 415A represented by the 2D location 505A. In some cases, if the two 2D vectors are orthogonal, they may be representing a square corner. In an embodiment, the processing circuit 110 may be configured to project 3D corner orientations for other corners (e.g., 425A, 435A, 445A of FIG. 4C) to determine corresponding 2D corner orientations. For example, the processing circuit 110 may be configured to determine 2D vectors 506B-1 and 506B-2, which may define a 2D corner orientation for a corner represented by 2D location 505B, by projecting two corresponding 3D vectors, such as 406B-1 and 406B-2 in FIG. 5E from 3D space into 2D space. The processing circuit 110 may further determine 2D vectors 506C-1 and 506C-2, and/or 2D vectors 506D-1 and 506D-2 in a similar manner. These vectors may define respective 2D corner orientations for corners represented by 2D locations 505C and 505D, respectively.

Figure 5H:
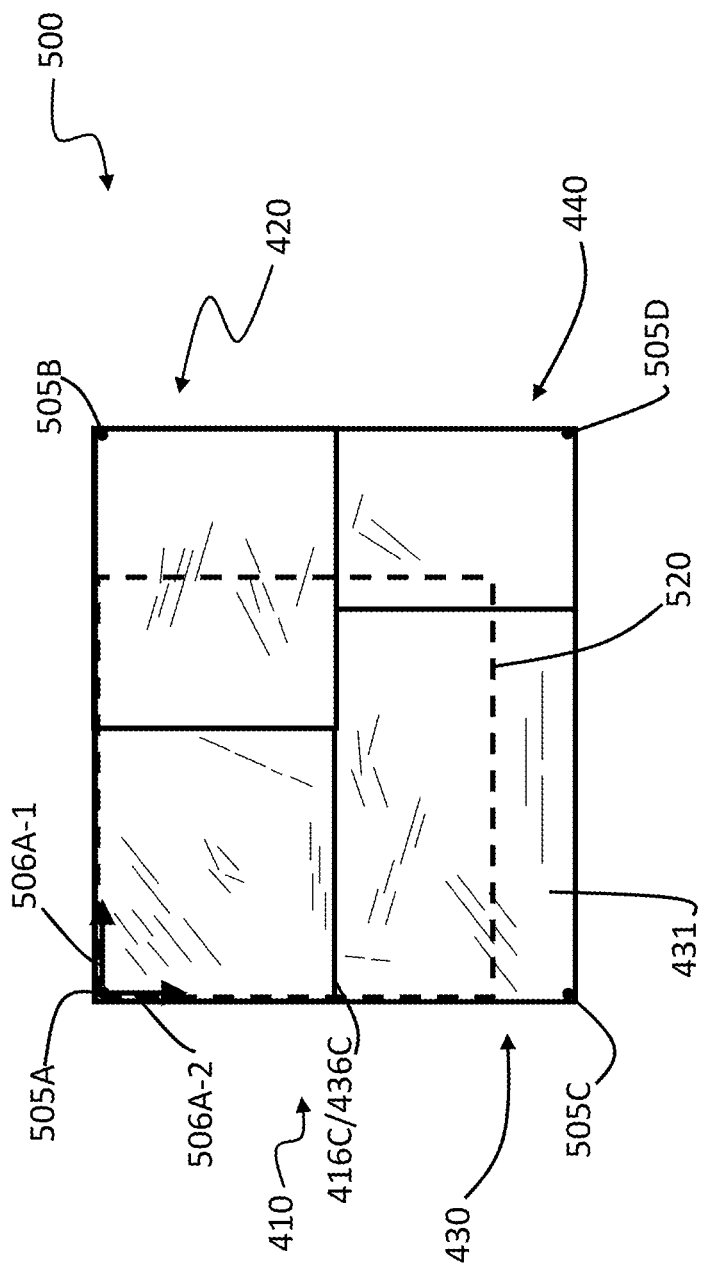
FIG. 5H-5J illustrate examples of an edge detection region consistent with an embodiment hereof.
Figure 5I:
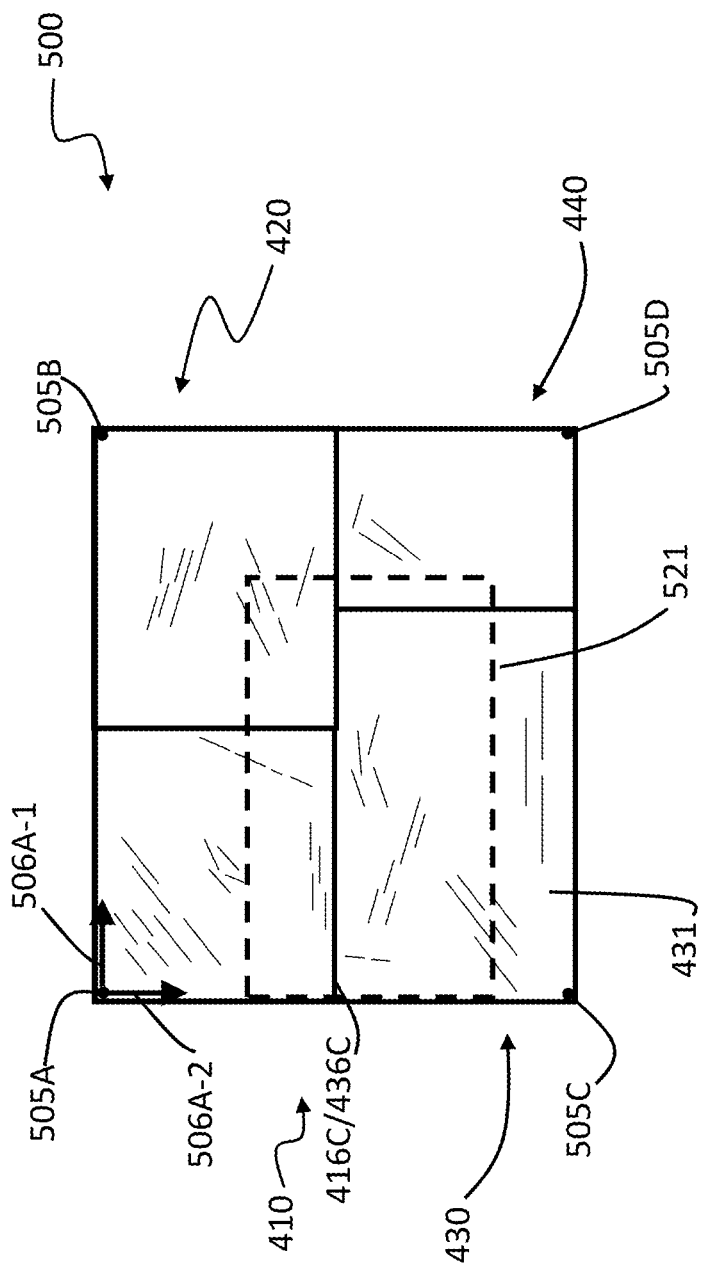

Referring back to FIGS. 3A and 3B, the method 300 may further include an operation 314 in which the processing circuit 110 of the computing system 101 determines an edge detection region, such as an edge detection region 520 in FIG. 5H or an edge detection region 521 in FIG. 5I. In an embodiment, the edge detection region (e.g., 520/521) may be a region of the 2D image information 500 in which the processing circuit 110 may attempt to identify an object edge for an object, such as the object edge 416C/436C. That is, the processing circuit 110 may search for one or more edges of individual physical object(s) represented by the 2D image information in the edge detection region 520/521. In an embodiment, the processing circuit may attempt to identify the object edge from among candidate edges that appear or are otherwise included in the edge detection region 520/521.

In embodiments, determining the edge detection region 520/521 within the 2D image information 500 is based on the 2D location identified in step 310, the 2D vector identified in step 312, and/or the 2D corner orientation discussed above. For example, with reference to FIG. 5H, the edge detection region 520 may be a region of the 2D image information 500 which has a corner located at the 2D location (e.g., 505A) determined in step 310. In some cases, this region may have an orientation which matches the 2D corner orientation. For instance, a border of the region 520 (also referred to as an edge of the region 520) may have a same orientation as the 2D vector 506A-1 that defines the 2D corner orientation.

In an embodiment, the processing circuit may determine a size and/or location of the edge detection region 520 based on a defined maximum object size. The size of the edge detection region 520 may refer to, e.g., one or more dimensions of the edge detection region 520, such as its length and width (e.g., in pixels). The defined maximum object size (which may also be referred to as maximum candidate size) may refer to, e.g., one or more dimensions, such as length and width (e.g., in cm) of a largest object that is expected to be placed in a field of view of the spatial structure sensing device 151/151A and/or 2D image sensing device 152/152A. In some cases, the defined maximum object size may have a value(s) that is predefined and stored in the non-transitory computer-readable medium 120. In one example, the processing circuit 110 may determine, based on a projection matrix of the 2D image sensing device 152/152A or based on a focal length and image sensor size indicated by the projection matrix, a first count which indicates how many pixels correspond to a length of the defined maximum object size, and a second count which indicates how many pixels correspond to a width of the defined maximum object size. In this example, the edge detection region 520 may have length equal to the first count, and a width equal to the second count. In this embodiment, any physical object which has a size that is equal to or smaller than the defined maximum object size should project to a region of the 2D image information 500 that fits within the edge detection region 520. Thus, the processing circuit 110 may search for object edges within the edge detection region 520, and not search for object edges outside of the edge detection region 520. In an embodiment, the edge detection region 520 may be a rectangular region having a corner that coincides at the 2D location 505A, and that extends in a direction indicated by the 2D corner orientation. More particularly, the edge detection region 520/521 may extend in a direction (e.g., an inward direction) that matches a direction of 2D vector 506A-1 and/or a direction of 2D vector 506A-2, if the 2D vectors indicate directionality.

Figure 5J:
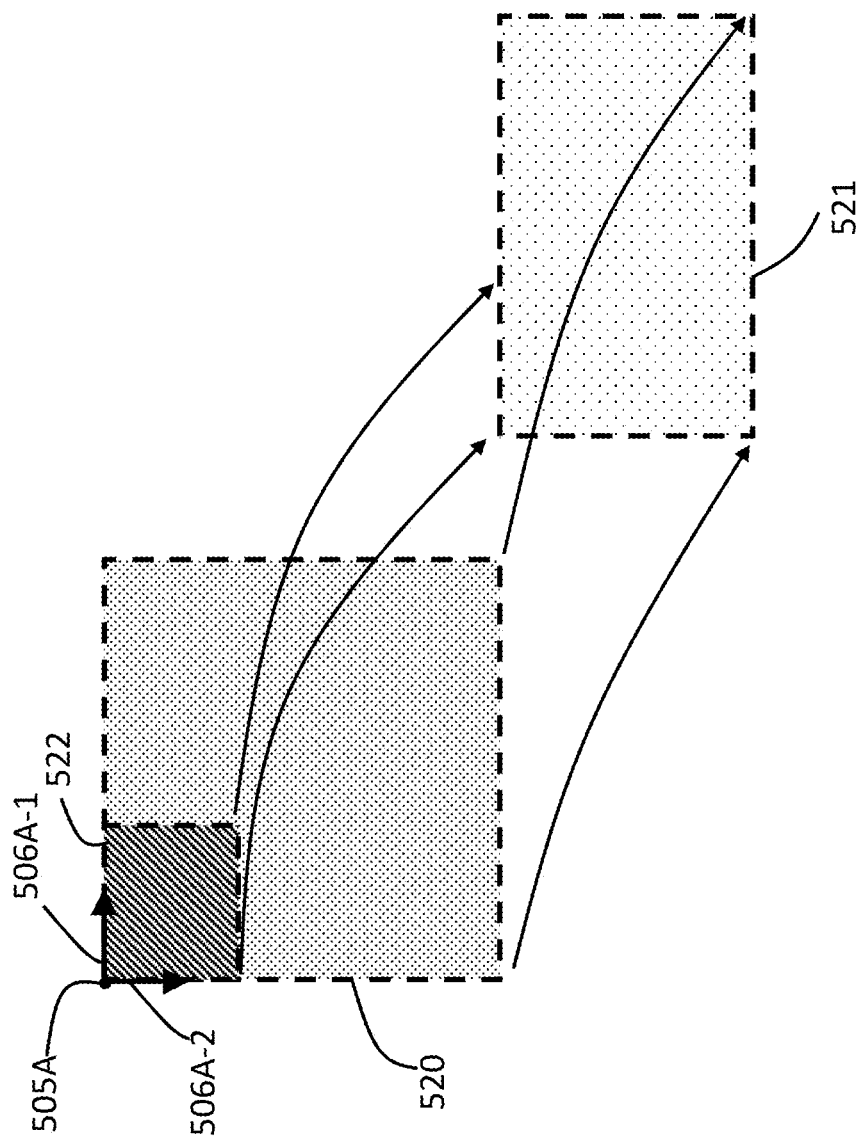

In an embodiment, the processing circuit may determine a size and/or location of the edge detection region 521 of FIG. 5I based on a defined minimum object size and/or the defined maximum object size. The defined minimum object size (which may also be referred to as a minimum candidate size) may refer to, e.g., one or more dimensions, such as length and width (e.g., in cm) of a smallest object that is expected to be placed in a field of view of the spatial structure sensing device 151/151A and/or 2D image sensing device 152/152A. In some cases, the defined maximum object size and/or the defined minimum object size may be defined in a template (e.g., object recognition template) that is stored on the non-transitory computer-readable medium 120. In some cases, the defined minimum object size may have a value(s) that is predefined and stored in the non-transitory computer-readable medium 120. In one example, as illustrated in FIG. 5J, the defined minimum object size may correspond to a first region 522 in the 2D image information 500. For example, the first region 522 may be a projection of the defined minimum object size (e.g., based on a focal length and/or image sensor size). The first region 522 may have a corner that is at location 505A and may have an orientation that matches vector 506A-1 and/or 506A-2. In this example, any physical object which has a size that is equal to or bigger than the defined minimum object size should project to locations that extend beyond the first region 522. As further depicted in FIG. 5J, the defined maximum object size may correspond to a second region 520, which may be the same as the edge detection region 520 of FIG. 5H. In some situations, the processing circuit 110 may search for object edges outside the first region 522, but within the second region 520. In such situations, the processing circuit 110 may be using an edge detection region 521, which is a region that is outside of the first region 522, and within the second region 520.

Figure 6A:
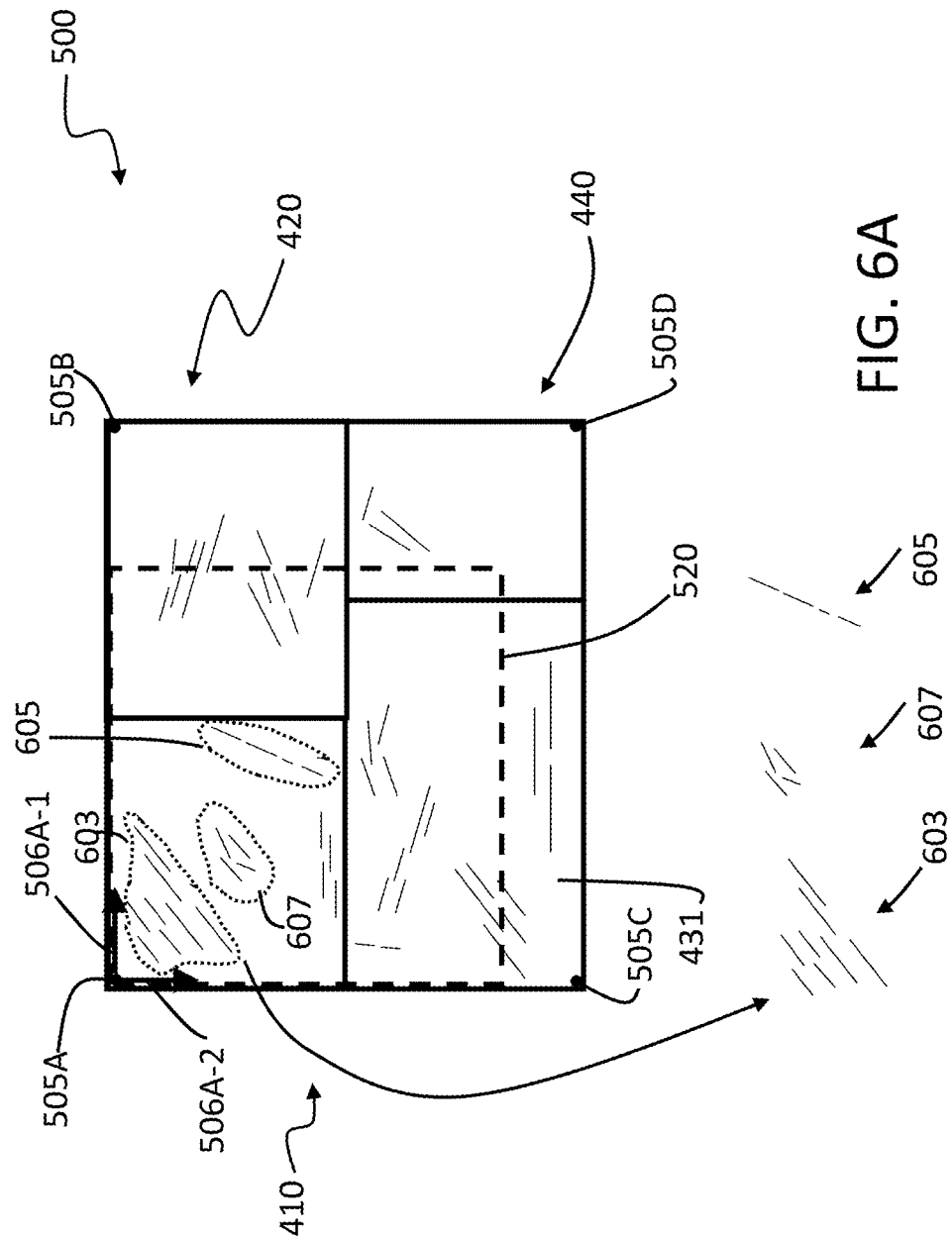

Referring back to FIGS. 3A and 3B, the method 300 may further include an operation 316 in which the processing circuit 110 of the computing system 101 identifies one or more clusters of candidate edges within the edge detection region (e.g., 520/521) that does not represent any object edge of the object structures represented by the 2D image information (e.g., 500). For instance, FIG. 6A depicts an example of clusters 603, 605, 607 of candidate edges in the edge detection region 520 that do not represent any object edge of the object structure for the object 410 represented in the 2D image information 500. Determining which candidate edges belong to the clusters 603, 605, 607 is discussed below in more detail. In an embodiment, the processing circuit 110 may determine that the candidate edges belonging to the clusters 603, 605, 607 do not represent any object edge of an object structure based on a comparison between the candidate edges and the 2D vector (e.g., 506A-1) determined in operation 314. For instance, the processing circuit 110 may be configured to compare respective orientations of the candidate edges of cluster 603 against an orientation of the 2D vector, which may also be referred to as a projected edge orientation. As stated above, the 2D vector (e.g., 506A-1) may define at least part of a 2D corner orientation for a corner represented by a 2D location (e.g., 505A) from which the 2D vector extends. Thus, the comparison of orientation discussed above may be part of a comparison of the respective orientations of the candidate edges with a 2D corner orientation for the corner represented by the 2D location (e.g., 505A). If the comparison indicates that the candidate edges of the clusters 603, 605, 607 do not sufficiently match an orientation of the 2D vector (e.g., 506A-1), then the processing circuit 110 may determine that the candidate edges in the clusters 603, 605, 607 likely do not represent an object edge. For instance, if the candidate edges in the clusters 603, 605, 607 are not sufficiently parallel with the vector 506A-1, nor with the vector 506A-2 (which may also define part of the 2D corner orientation), then the candidate edges may have a high likelihood of being false edges. Thus, the processing circuit 110 may filter out the candidate edges from the 2D image information 500, or more generally ignore the candidate edges when searching for an object edge for the object 410, so as to decrease a likelihood of identifying a false edge as the object edge.

In an embodiment, grouping candidate edges into one or more clusters may provide more efficient processing of candidate edges in 2D image information (e.g., 500), such as by allowing the computing system 101 to consolidate the processing of the candidate edges into fewer steps. For example, the clustering operation may allow candidate edges to be processed (e.g., filtered out) on a cluster-by-cluster basis, rather than on the basis of individual candidate edges.

In some cases, operation 316 may involve identifying which candidate edges should be grouped into a cluster or clusters, and then determining which of those cluster or clusters do not represent any object edge of the objects (e.g., 410-440) represented in the 2D image information (e.g., 500). The one or more clusters may be identified from the 2D image information 500. The computing system 101 may identify the clusters of candidate edges by any one or any combination of several clustering techniques.

In an embodiment, the computing system 101 may identify a cluster of candidate edges by an orientation clustering technique that groups the candidate edges together based on similarity between respective orientations of the candidate edges. For instance, the computing system 101 in this embodiment may determine a degree of parallelism shared by candidate edges and may identify candidate edges which are parallel or nearly parallel to each other as belonging to a same cluster. For example, FIG. 6A depicts an instance in which the computing system 101 identified, as belonging to the cluster 603, candidate edges that are parallel or substantially parallel with one of the candidate edges in the cluster 603, such as candidate edge 563A of FIG. 6B. In an embodiment, identifying candidate edges that are similar in orientation may involving grouping together candidate edges whose orientations are within a defined angle threshold (e.g., a selected number of degrees) when compared to a target vector for the cluster. The cluster target vector may be, for example, the 2D vector (e.g., 506A-1) determined in step 312. Each candidate edge may be compared in orientation to the cluster target vector to determine the angle of that candidate edge. Where the angle is lower than the angle threshold, the candidate edge may be included in the cluster. In some cases, identifying a cluster based on orientation similarity to the cluster target vector may result in an absolute clustering, in which all candidate edges that are within a predefined region and whose respective angles with the 2D vector (e.g., 506A-1) are within a defined threshold of the cluster target vector are grouped together into a cluster. In these cases, candidate edges having an orientation within the defined threshold of the cluster target vector may be considered to have substantially the same orientation as the cluster target vector. The defined threshold, also referred to as an angle threshold, may be, for example, within 5°, 4°, 3°, 2°, or 1°. For those comparisons resulting in an angle below the angle threshold, the respective candidate edges may be clustered together. If the angle threshold can be adjusted or otherwise defined dynamically, the resulting clustering may have fluid cluster boundaries. The size of the clusters may be controlled based on the size of the angle threshold. Larger angle thresholds may result in large clusters while smaller angle thresholds may result in smaller clusters. Selecting an appropriate angle threshold may be important in controlling the total range of angles in each cluster. Candidate edges having angle differences within the angle threshold may be considered to have substantially the same orientation. Appropriate angle thresholds may include within 5°, 4°, 3°, 2°, or 1°.

In an embodiment, determining a degree of similarity between respective orientations of two candidate edges may be based on a dot product or cross product of the two candidate edges. For instance, to determine a degree of similarity between respective orientations of candidate edges 563A and 563B in FIG. 6B, a cross product may be determined between two respective vectors, such as vectors $v_1$ and $v_2$ in FIG. 6B, which are parallel with the two candidate edges 563A and 563B. A magnitude of the cross product may indicate the degree of similarity between respective orientations of the two candidate edges. For example, the cross product for two candidate edges that are exactly parallel with each other may be zero. In some cases, if the magnitude of the cross product is below the defined angle threshold discussed above, the two candidate edges may be considered to be sufficiently parallel with each other to belong to the same cluster.

In an embodiment, the computing system 101 may identify a cluster of candidate edges based on an alignment clustering technique which groups together candidate edges that are co-linear with each other. Grouping the candidate edges together based on co-linearity may refer to grouping together candidate edges that are aligned or substantially aligned with each other. For instance, FIGS. 6A and 6C depict a cluster 605 that includes candidate edges 565A-565D that are co-linear. In other words, the candidate edges 505A-505D may be aligned or substantially aligned (within a specified threshold) with each other (the candidate edges 565A-565D may also be grouped together based on having similar orientation). In an embodiment, as illustrated in FIG. 6C, the alignment clustering technique may be performed based on determining an extrapolated vector (e.g., line) 605A from at least one of the candidate edges 565A-565D. The extrapolated vector 605A may be co-linear with the at least one candidate edge (e.g., 565A) by, e.g., extrapolating the at least one candidate edge outward to, e.g., the boundaries of the edge detection region 520 of FIG. 6A. In this embodiment, the alignment clustering technique may be based on determining which other candidate edges (e.g., 565B-565D) fall on the extrapolated vector 605A. In an embodiment, the alignment clustering technique may involve determining respective extrapolated vectors for the candidate edges 503A-503D and determining whether the extrapolated vectors overlap. For example, if two candidate edges, when extrapolated in length, overlap, the computing system 101 may consider them to be in alignment.

In an embodiment, substantial co-linearity (also referred to as substantially similar alignment) may be defined according to a predefined angle threshold and/or a predetermined offset threshold. The angle threshold for two candidate edges may require, e.g., that an angle between the two candidate edges be within the angle threshold (e.g., a certain number of degrees, such as 5°, 4°, 3°, 2°, or 1°), or that the respective angles formed by each of the two candidate edges with the 2D vector of step 312 be within the angle threshold. The offset threshold for two candidate edges may require, e.g., that the candidate edges have a smaller offset than an offset threshold. In an embodiment, an offset between two candidate edges may be defined by a distance between respective lines extending or otherwise extrapolated from the candidate edges. In an embodiment, the offset may be measured as a distance between respective center points of the extrapolated lines.

In an embodiment, the computing system 101 may identify a cluster of candidate edges based on a proximity clustering technique that groups together candidate edges that satisfy a proximity condition. The proximity condition may refer to, e.g., candidate edges that are in proximity to each other. For instance, FIGS. 6A and 6D depict a cluster 607 that includes candidate edges 567A-567D that are in proximity to each other. In an embodiment, the computing system 101 may determine whether the proximity condition is satisfied based on determining whether a distance between positions of candidate edges, or between lines extrapolated from the candidate edges, satisfy a defined distance threshold. In an embodiment, the distance between the positions of candidate edges (also referred to as candidate edge positions) may be a distance between respective center points of the candidate edges, such as the center points 568A-568D illustrated in FIG. 6D. In an embodiment, the distance between candidate edge positions for two candidate edges may be a maximum distance between the candidate edges, which may be a distance between respective positions on the two candidate edges that are farthest from each other.

As stated above, multiple clustering techniques may be combined to identify which candidate edges belong to a particular cluster. For example, the cluster 603 of FIG. 6B may be grouped into a cluster based on a combination of the orientation clustering technique and the proximity clustering technique. More particularly, the cluster 603 may include candidate edges which have respective orientations that are sufficiently similar to each other, and whose distances between each other are within a defined distance threshold. In some cases, the computing system 101 may identify a candidate edge as belonging to more than one cluster.

FIG. 6E depicts an example in which the computing system 101 identifies clusters 611, 613, and 609 based on, e.g., the orientation clustering technique discussed above. In some cases, the clusters 609, 611, and 613 may be excluded from being identified as the cluster of operation 316, because the cluster of operation 316 may include candidate edges which have a high likelihood of being false edges, while the candidate edges of clusters 609, 611, and 613 may have a lower (e.g., zero) likelihood of being false edges. For example, the cluster 611 may include candidate edges 561B and 561C, while the cluster 613 may include candidate edges 561A and 561D. These candidate edges 561A-561D do actually represent physical edges of the object 410. In some implementations, a 2D object edge of step 318 (which is discussed below) may be identified from among the clusters 609, 611, 613.

In an embodiment, the computing system 101 may exclude from a cluster (e.g., 603, 607, 605, 609, 611, 613) a candidate edge that has a length which is below a defined minimum length threshold. Accordingly, the clusters in this embodiment may each consist of candidate edges that exceed the defined minimum length threshold.

While operation 316 involves identifying a cluster of candidate edges that do not represent any object edge, it may in some embodiments additionally or alternatively identify one or more individual candidate edges that do not represent any object edge. Such a determination may be based on a comparison between an orientation of an individual candidate edge and an orientation of the 2D vector (e.g., 506A-1) of operation 314, or more generally between the orientation of the individual candidate edge and the 2D corner orientation, as discussed above.

Referring back to FIGS. 3A and 3B, the method 300 may further include an operation 318 in which the processing circuit 110 of the computing system 101 identifies, as a 2D object edge, a candidate edge that is not part of the cluster of candidate edges identified in operation 316. The 2D object edge that is identified may also be referred to as a segmentation edge, because it may be used to perform a segmentation operation, as discussed below. Further, because the computing system 101 ignores the cluster of edges of operation 316 when identifying the 2D object edge, wherein the cluster of edges of operation 316 may have a high likelihood of being false edges, the 2D object edge that is identified in operation 318 may have a higher likelihood of being verified as a correctly identified 2D object edge. Thus, the 2D object edge may also be referred to as a verifiable edge. As an example, operation 318 may involve identifying candidate edge 561D as a 2D object edge in the 2D image information (e.g., 500). The 2D object edge may represent, e.g., physical edge 416D of the object 410 (as illustrated in FIG. 4C). In an embodiment, the edge (e.g., 416A) with which the vector (e.g., 406A-1) of operation 306 is parallel may be a first edge of the corresponding object structure (e.g., the object structure for object 410), while the 2D object edge may represent another edge of the object structure, such as edge 416D or edge 416C.

Figure 6F:
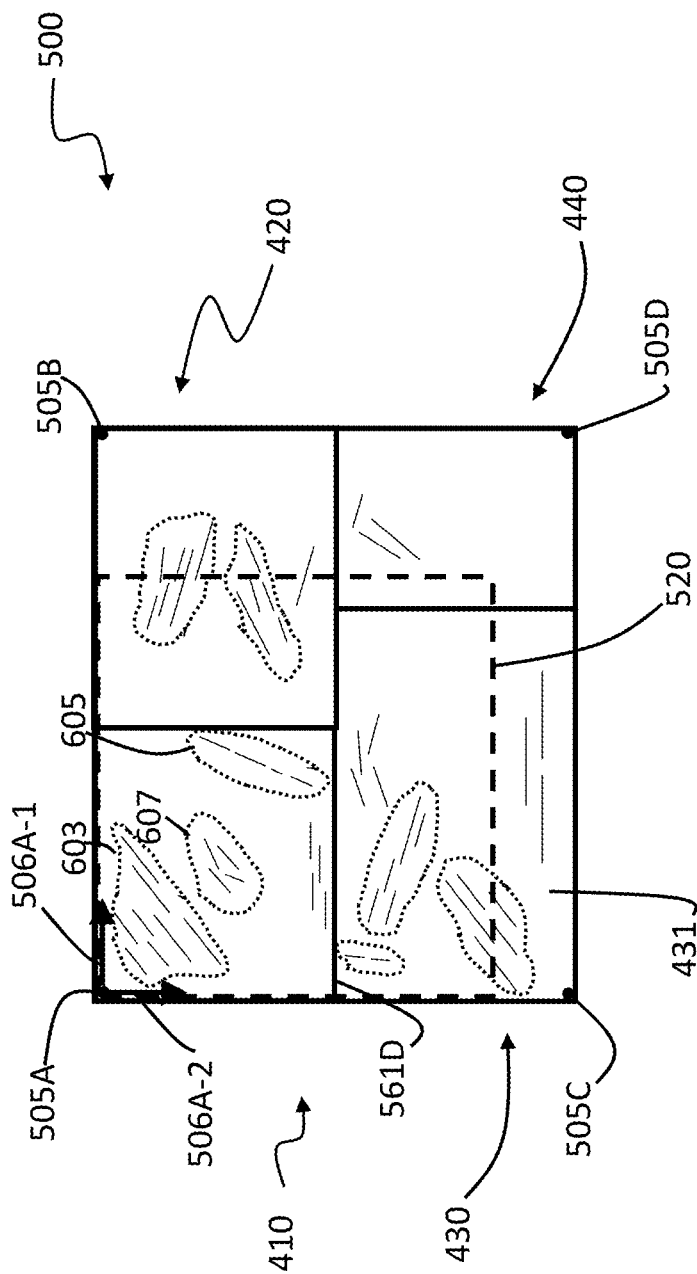
Figure 6G:
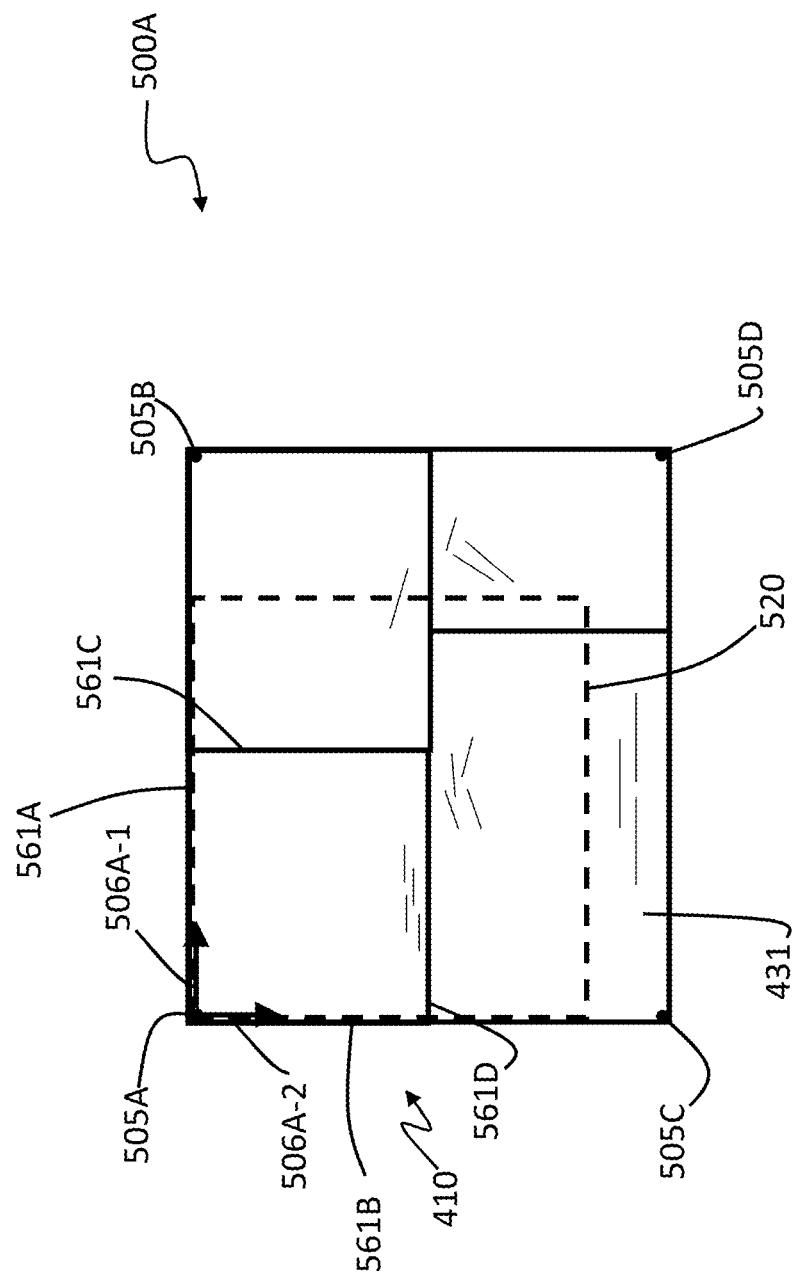
FIG. 6G illustrates an example of updated 2D image information consistent with an embodiment hereof.

In an embodiment, operation 318 may involve filtering the 2D image information to generate updated 2D image information which removes the clusters identified in operation 316. In this embodiment, the 2D object edge may be identified from among candidate edges that remain in the updated 2D image information (e.g., that still appear in the updated 2D image information). For example, FIG. 6F depicts an example of clusters that are identified in operation 316. The clusters include clusters 603, 605, 607, as well as other clusters (which are depicted with dashed boundaries), which may be completely or partially within the edge detection region 520. FIG. 6G depicts updated 2D image information 500A in which the clusters identified in FIG. 6F have been removed. In this example, operation 318 may involve identifying the candidate edge 561D as a 2D object edge from the updated 2D image information 500A. In an embodiment, the 2D image information 500 of FIG. 6F may be updated by marking or flagging the candidate edges of the clusters of FIG. 6F to indicate that they should be ignored for operation 318. In an embodiment, operation 318 may involve identifying (or may be performed multiple times to identify) multiple 2D object edges. For instance, operation 318 may involve identifying candidate edge 561D as a first 2D object edge of an object structure for an object represented by the 2D image information 500, and identifying candidate edge 561C as a second object edge of the object structure.

In an embodiment, the computing system 101 may filter out a cluster of candidate edges or filter out individual candidate edges from 2D image information, either as part of operation 318, or as part of some other operation. In some cases, filtering or otherwise eliminating candidate edges from consideration as a 2D object edge (also referred to as a segmentation edge), may be performed according to respective orientations of the candidate edges. For instance, any cluster in the edge detection region (e.g., 520) or in the 2D image information whose candidate edges have respective orientations that do not sufficiently match (within a specified threshold) an orientation of the 2D vector determined in operation 312, or that more generally do not sufficiently match a 2D corner orientation associated with the 2D vector, may be eliminated from consideration as a segmentation edge. In this example, the orientation of the 2D vector may be a projected 2D edge orientation.

In an embodiment, the filtering may be according to an orientation of the 3D vector determined in step 306. The orientation of the 3D vector may be a 3D edge orientation. In this embodiment, any cluster in the edge detection region (e.g., 520) or in the 2D image information which has candidate edges whose respective orientations do not sufficiently match the 3D edge orientation, or that do not sufficiently match a 3D corner orientation associated with the 3D edge orientation, may be eliminated from consideration as a segmentation edge. As stated above, the candidate edges that are filtered out may have a high likelihood of being false edges, and thus may have a low likelihood of actually representing a physical edge of an object represented in the 2D image information.

In an embodiment, filtering may be performed according to a position of a candidate edge. For example, a candidate edge that is too far from the 2D location determined in operation 310 (which represents a corner of an object structure) or too far from the 2D vector determined in step 312 (which is a projected 2D object edge) may be filtered out. In some cases, the candidate edge may be considered too far away if it falls outside the edge detection region (e.g., 520). In some cases, the candidate edge may be considered too far away if a distance between a position of the candidate edge and the 2D location or 2D vector exceeds a value of the defined maximum object size discussed above. The position of the candidate edge may be, e.g., a center point of the candidate edge or of an extrapolated line, as discussed above. In an embodiment, any combination of the filtering techniques discussed above may be employed by the computing system 101. For example, the candidate edge clusters may be filtered according to orientation alone, or a combination of orientation and position.

Referring back to FIGS. 3A and 3B, the method 300 may further include an operation 320 in which the processing circuit 110 of the computing system 101 performs segmentation of the spatial structure information (e.g., 400/400A) based on the 2D object edge (which may be referred to as a segmentation edge) identified in operation 318. In an embodiment, operation 320 may be performed by the segmentation manager 204 of FIG. 2C.

Figure 7A:
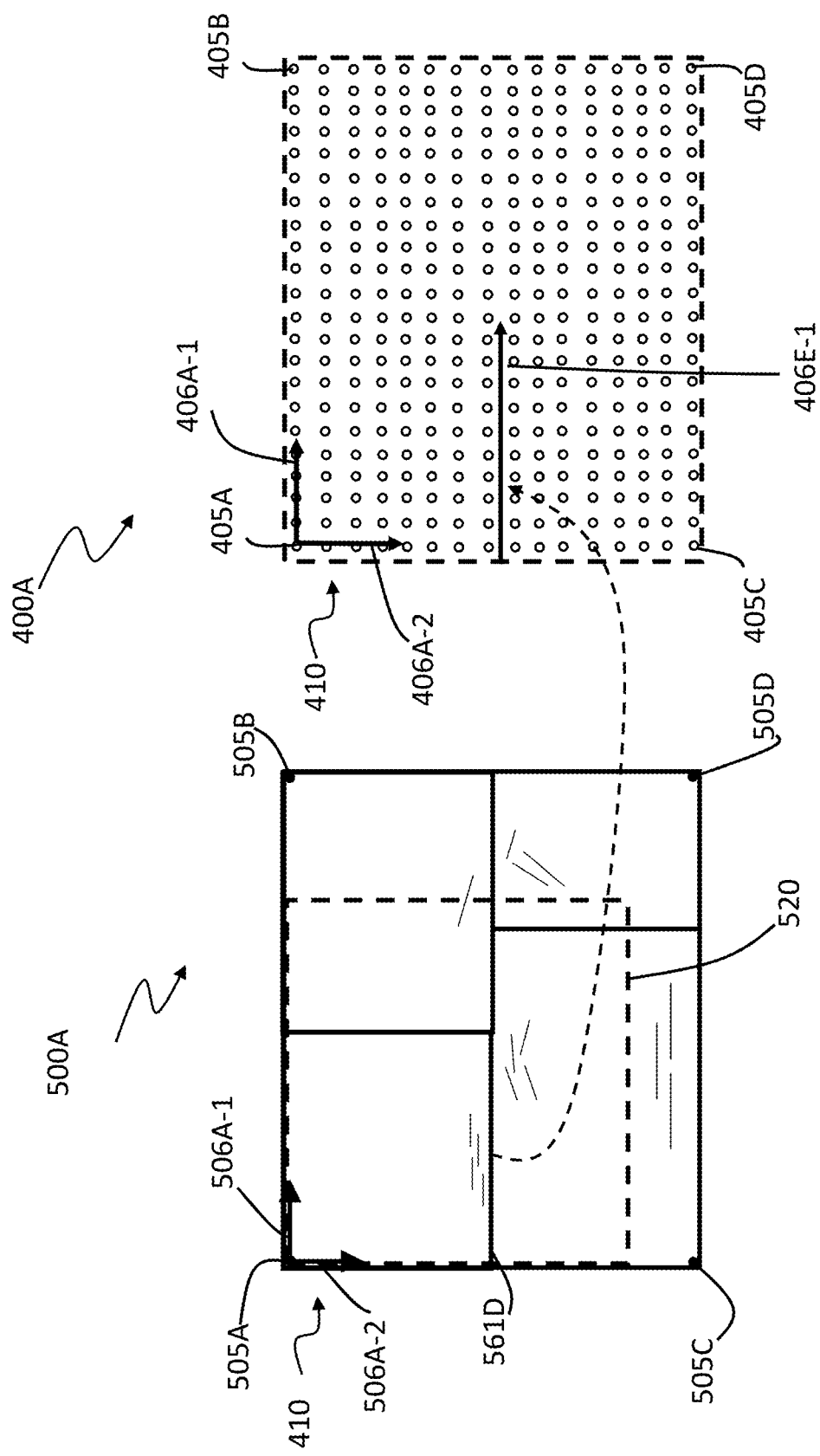
FIGS. 7A-7D illustrate examples of segmentation of spatial structure information consistent embodiments hereof.

In an embodiment, operation 320 may involve determining a 3D vector which corresponds to the 2D object edge. In this embodiment, the 3D vector identified in operation 306 may be a first 3D vector that represents a first edge of an object structure, while the 3D vector identified in operation 320 may represent a second edge of the object structure. The segmentation in such an embodiment may involve extracting a portion of the spatial structure information (e.g., 400/400A) that represent points which are between the first 3D vector and the second 3D vector. For example, FIG. 7A depicts an example in which the vector 406A-1 (determined in operation 306) is a first 3D vector, in which the candidate edge 561D identified as a 2D object edge in operation 318 may be used to determine a second 3D vector 406E-1. Operation 320 may involve extracting a portion of the spatial structure information 400A that represents points between the first vector 406A-1 and the second vector 406A-1 (including the points which fall on the two vectors). The vector 406A-1 may represent a first edge of the object structure for the object 410, as discussed above, while the vector 406E-1 may represent another edge (e.g., a second edge) of the object structure.

In an embodiment, the 3D vector 406E-1 may be determined by projecting the candidate edge 561D that was identified as the 2D object edge from a reference frame of the 2D image information 500/500A (which may be referred to as 2D space) to a reference frame of the spatial structure information 400/400A (which may be referred to as 3D space). In some cases, the projecting operation may involve converting at least two 2D pixel coordinates ([u v]$^T$ coordinates) that are on the candidate edge 561D to respective 3D coordinates [X' Y' Z']$^T$, wherein the 3D coordinates are expressed with respect to the 2D image sensing device 152/152A. The conversion may be based on, e.g., an inverse projection matrix of the 2D image sensing device 152/152A:

$$\begin{bmatrix} X'/Z' \\ Y'/Z' \\ 1 \end{bmatrix} = K^{-1} \begin{bmatrix} u \\ v \end{bmatrix} \quad \text{(Equation 3)}$$

In some cases, the above expression may be modified to account for any lens distortion introduced by the 2D image sensing device 152/152A. The 3D coordinates [X' Y' Z']$^T$ may be converted from being expressed in a coordinate system of the 2D image sensing device 152/152A to being expressed in a coordinate system of the spatial structure sensing device 151/151A, such as based on the following formula:

$$\begin{bmatrix} X \\ Y \\ Z \\ 1 \end{bmatrix} = Z' T_{151}^{152} \begin{bmatrix} X'/Z' \\ Y'/Z' \\ 1 \\ 1/Z' \end{bmatrix} \quad \text{(Equation 4)}$$

In this example, $T_{151}^{152}$ may be a matrix or other transformation function that is an inverse of $T_{152}^{151}$, which is discussed above. Two or more of the 3D coordinates [X Y Z]$^T$ in this example may define the 3D vector 406E-1.

Figure 7B:
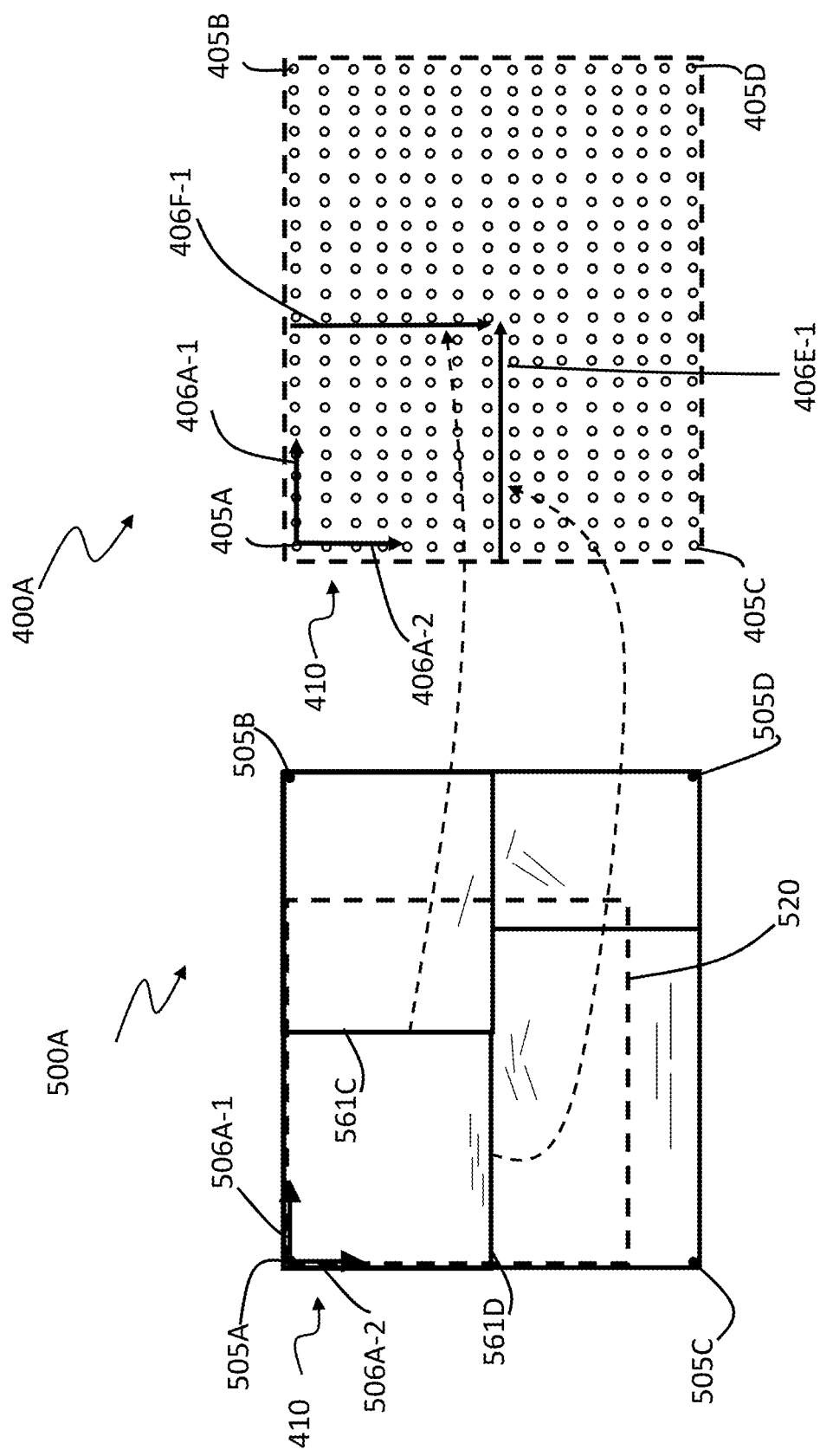

As stated above, operation 318 may in an embodiment involve identifying multiple candidate edges, such as candidate edges 561C and 561D, as respective 2D object edges. In an embodiment, operation 320 may involve determining multiple 3D vectors that correspond to the 2D object edges. For example, FIG. 7B illustrates the computing system 101 identifying the 3D vector 406E-1, which corresponds to the candidate edge 561D, and identifying an additional 3D vector 406F-1, which corresponds to the candidate edge 561C. In this example, the computing system 101 may extract a portion of the spatial structure information 400/400A which represents points that are between the 3D vector(s) (e.g., 406A-1) determined in operation 306 and the 3D vectors (e.g., 406E-1 and 406F-1) determined in operation 320. In some cases, the 3D vector(s) determined in operation 306 and used for the segmentation may include both the vector 406A-1 and the vector 406A-2 (the two vectors may have been determined as part of determining 3D corner orientation).

Figure 7C:
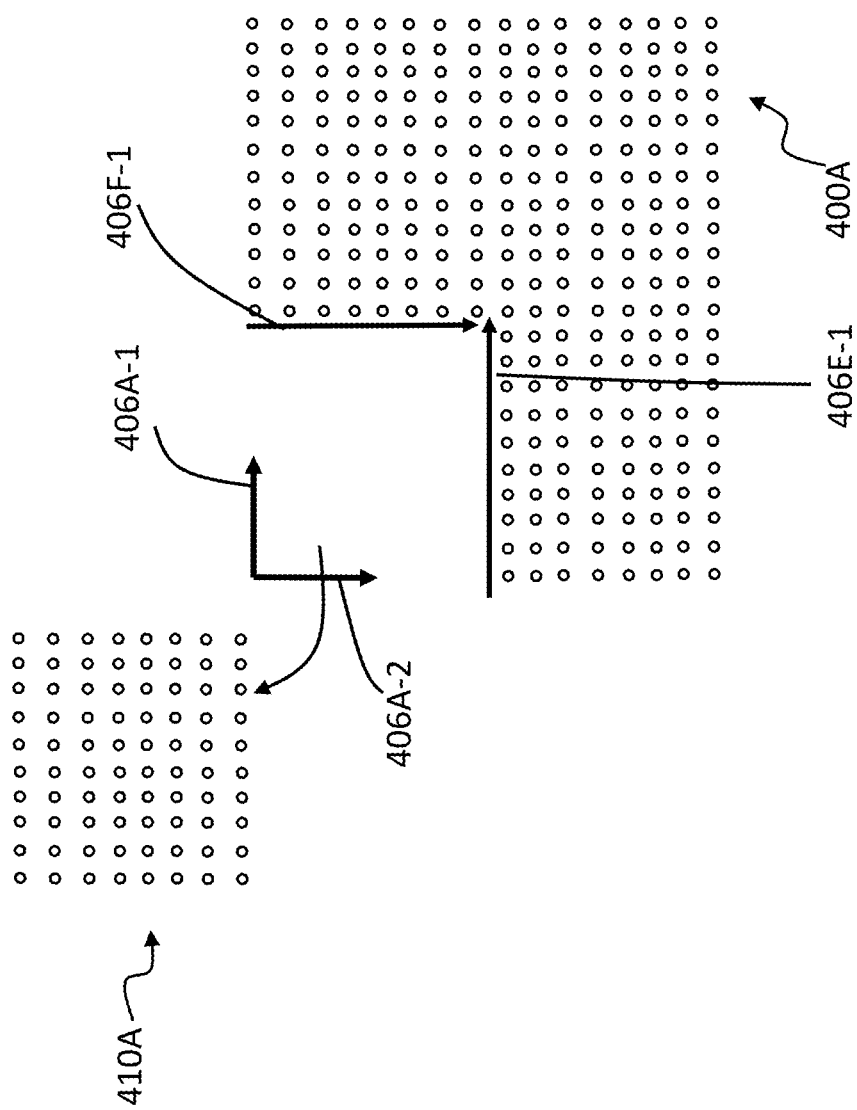
Figure 7D:
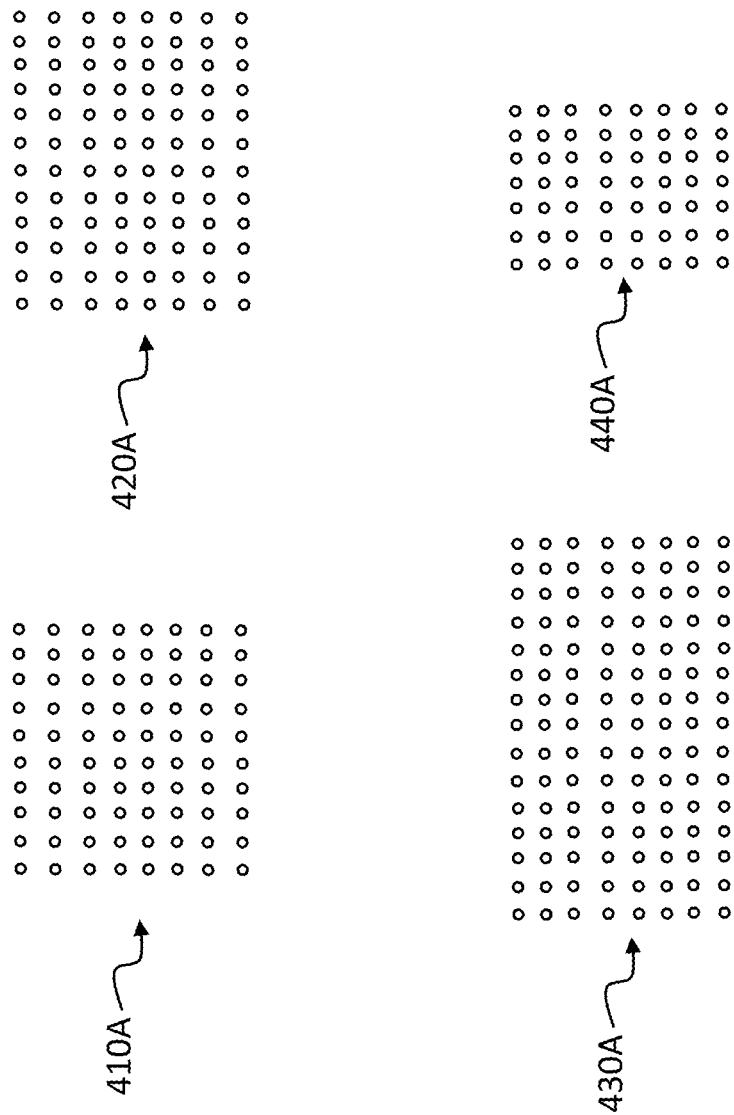

FIG. 7C depicts an example in which the computing system 101 extracts the portion 410A from the spatial structure information 400/400A, wherein the portion 410A represents the object structure for the object 410 of FIG. 4A. In an embodiment, operation 320 may be repeated multiple times to extract additional portions from the spatial structure information 400/400A. The extraction may divide or otherwise segment the spatial structure information 400/400A into portions that correspond to, e.g., respective objects or object structures represented by the spatial structure information 400/400A. For example, FIG. 7D illustrates the spatial structure information 400/400A being segmented into portions 410A-440A, which represent object structures for the objects 410-440, respectively.

In an embodiment, a portion that is extracted in operation 320 may be used to perform object recognition, such as by the object recognition manager 208 of FIG. 2C. In some instances, the object recognition manager 208 may be configured to generating a detection hypothesis, modifying a detection hypothesis, and/or filter a detection hypothesis based on the portion of the spatial structure information 400/400A extracted in operation 320. Detection hypothesis is discussed in more detail in U.S. patent application Ser. No. 16/578,900, filed on Sep. 23, 2019, and incorporated herein by reference in its entirety.

Further embodiments consistent with the disclosure include at least the following.

One aspect of the present disclosure relates to Embodiment 1, which includes a computing system comprising a non-transitory computer-readable medium and a processing circuit. The processing circuit may be configured, when spatial structure information which describes respective one or more object structures for one or more objects is stored on the non-transitory computer-readable medium, and when 2D image information describing the one or more objects is stored on the non-transitory computer-readable medium, to perform the following: identify, based on the spatial structure information, a 3D location that represents a corner of an object structure of the one or more object structures; identify, based on the spatial structure information, a 3D vector that extends from the 3D location and is parallel with an edge of the object structure; determine a 2D location within the 2D image information that corresponds to the 3D location; determine a 2D vector within the 2D image information that corresponds to the 3D vector; determine an edge detection region within the 2D image information based on the 2D location; identify a cluster of candidate edges within the edge detection region that does not represent any object edge of the one or more object structures according to a comparison between the candidate edges and the 2D vector; identify, as a 2D object edge, a candidate edge that is not part of the identified cluster of candidate edges; and perform segmentation of the spatial structure information based on the 2D object edge.

Embodiment 2 includes the computing system of embodiment 1. In embodiment 2, the edge of the object structure with which the 3D vector is parallel is a first edge of the object structure, and wherein the 2D object edge that is identified from the 2D image information represents a second edge of the object structure.

Embodiment 3 includes the computing system of embodiment 1 or 2. In embodiment 3, the spatial structure information includes a point cloud that describes depth information for a plurality of locations on the object structure, and wherein the 2D image information is a 2D image that has no depth information.

Embodiment 4 includes the computing system of any one of embodiments 1-3. In embodiment 4, the processing circuit is further configured to filter out the cluster of candidate edges from the 2D image information to generate updated 2D image information, wherein the 2D object edge is identified from among candidate edges that are described by in the updated 2D image information.

Embodiment 5 includes the computing system of any one of embodiments 1-4. In embodiment 5, the processing circuit is configured to identify the cluster of candidate edges as candidate edges whose respective orientations do not match an orientation of the 2D vector.

Embodiment 6 includes the computing system of any one of embodiments 1-5. In embodiment 6, the processing circuit is configured to identify the cluster of candidate edges as a set of candidate edges in the edge detection region whose respective orientations are substantially the same.

Embodiment 7 includes the computing system of any one of embodiments 1-6. In embodiment 7, the processing circuit is configured to identify the cluster of candidate edges as a set of candidate edges in the edge detection region which have respective locations that satisfy a defined proximity condition.

Embodiment 8 includes the computing system of any one of embodiments 1-7. In embodiment 8, the processing circuit is configured to identify the cluster of candidate edges as set of candidate edges in the edge detection region which are substantially co-linear.

Embodiment 9 includes the computing system of any one of embodiments 1-8. In embodiment 9, the processing circuit is further configured to identify a set of candidate edges in the edge detection region which have respective lengths that are less than a defined length threshold, and to filter out the set of candidate edges from the 2D image information.

Embodiment 10 includes the computing system of any one of embodiments 1-9. In embodiment 10, the processing circuit is configured to identify the edge detection region by: identifying a first region of the 2D image information that extends from the 2D location and that represents a defined minimum object size; identifying a second region of the 2D image information that extends from the 2D location and that represents a defined maximum object size; and determining the edge detection region as a region which is outside the first region and is within the second region.

Embodiment 11 includes the computing system of any one of embodiments 1-10. In embodiment 11, the 3D vector is a first 3D vector and represents a first edge of the object structure, wherein the processing circuit is configured to perform segmentation of the spatial structure information by: identifying a second 3D vector that corresponds to the 2D vector and that represents a second edge of the object structure; and extracting a portion of the spatial structure information which corresponds with locations on the object structure that are between the first 3D vector and the second 3D vector.

Embodiment 12 includes the computing system of any one of embodiments 1-11. In embodiment 12, the spatial structure information is received from a spatial structure sensing device or is based on information generated by the spatial structure sensing device, and the 2D image information is received from a 2D image sensing device second camera or is based on information generated by the 2D image sensing device.

Embodiment 13 includes the computing system of any one of embodiments 1-12. In embodiment 13, the comparison between the candidate edges of the cluster and the 2D vector includes a comparison between respective orientations of the candidate edges and an orientation of the 2D vector.

It will be apparent to one of ordinary skill in the relevant arts that other suitable modifications and adaptations to the methods and applications described herein can be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising
a non-transitory computer-readable medium; and
a processing circuit configured, when 2D image information describing one or more objects is stored on the non-transitory computer-readable medium, to:
determine an edge detection region within the 2D image information,
identify a cluster of candidate edges within the edge detection region that does not represent any object edge of one or more object structures, and
perform segmentation of spatial structure information based on a segmentation edge that corresponds to a candidate edge that is not part of the identified cluster of candidate edges.

2. The computing system of claim 1, wherein the processing circuit is further configured to filter out the cluster of candidate edges from the 2D image information to generate updated 2D image information, wherein the segmentation edge is identified from among candidate edges that are described by in the updated 2D image information.

3. The computing system of claim 1, wherein the processing circuit is configured to identify the cluster of candidate edges as a set of candidate edges in the edge detection region whose respective orientations are substantially the same.

4. The computing system of claim 1, wherein the processing circuit is configured to identify the cluster of candidate edges as a set of candidate edges in the edge detection region which have respective locations that satisfy a defined proximity condition.

5. The computing system of claim 1, wherein the processing circuit is configured to identify the cluster of candidate edges as set of candidate edges in the edge detection region which are substantially co-linear.

6. The computing system of claim 1, wherein the processing circuit is further configured to identify a set of candidate edges in the edge detection region which have respective lengths that are less than a defined length threshold, and to filter out the set of candidate edges from the 2D image information.

7. The computing system of claim 1, wherein the processing circuit is further configured to:
   identify a first region of the 2D image information that represents a defined minimum object size;
   identify a second region of the 2D image information-that represents a defined maximum object size; and
   determine the edge detection region as a region which is outside the first region and is within the second region.

8. A non-transitory computer-readable medium having instructions stored thereon that, when executed by a processing circuit and when the non-transitory computer-readable medium is storing 2D image information of one or more object structures, causes the processing circuit to:
   determine an edge detection region within the 2D image information;
   identify a cluster of candidate edges within the edge detection region that does not represent any object edge of the one or more object structures; and
   perform segmentation of spatial structure information based on a segmentation edge that corresponds to a candidate edge that is not part of the identified cluster of candidate edges.

9. The non-transitory computer-readable medium of claim 8, further including instruction to cause the processing circuit to filter out the cluster of candidate edges from the 2D image information to generate updated 2D image information, wherein the segmentation edge is identified from among candidate edges that are described by in the updated 2D image information.

10. The non-transitory computer-readable medium of claim 8, further including instruction to cause the processing circuit to identify the cluster of candidate edges as a set of candidate edges in the edge detection region whose respective orientations are substantially the same.

11. The non-transitory computer-readable medium of claim 8, further including instruction to cause the processing circuit to:
   identify a first region of the 2D image information that represents a defined minimum object size;
   identify a second region of the 2D image information that represents a defined maximum object size; and
   determine the edge detection region as a region which is outside the first region and is within the second region.

12. The non-transitory computer-readable medium of claim 8, wherein the instructions further cause the processing circuit to identify the cluster of candidate edges as a set of candidate edges in the edge detection region which have respective locations that satisfy a defined proximity condition.

13. The non-transitory computer-readable medium of claim 8, further including instruction to cause the processing circuit to identify the cluster of candidate edges as set of candidate edges in the edge detection region which are substantially co-linear.

14. The non-transitory computer-readable medium of claim 8, further including instruction to cause the processing circuit to identify a set of candidate edges in the edge detection region which have respective lengths that are less than a defined length threshold, and to filter out the set of candidate edges from the 2D image information.

15. A method performed by a computing system, the method comprising:
   determining an edge detection region within a 2D image information, wherein the computing system comprises a non-transitory computer-readable medium configured to store the 2D image information that represents one or more objects;
   identifying a cluster of candidate edges within the edge detection region that does not represent any object edge of one or more object structures; and
   performing segmentation of spatial structure information based on a segmentation edge that corresponds to a candidate edge that is not part of the identified cluster of candidate edges.

* * * * *